US012663989B1

(12) United States Patent
Song et al.

(10) Patent No.: US 12,663,989 B1
(45) Date of Patent: Jun. 23, 2026

(54) NEURAL PROCESSING UNIT FOR PERFORMING RMS NORM OPERATION AND CONTROL METHOD THEREOF

(71) Applicant: DEEPX CO., LTD., Seongnam-si (KR)

(72) Inventors: Jin Gun Song, Seongnam-si (KR); Ho Chul Lee, Gwangmyeong-si (KR); Hyung Suk Kim, Seongnam-si (KR)

(73) Assignee: DEEPX CO., LTD., Seongnam-si (KR)

( * ) Notice: Subject to any disclaimer, the term of this patent is extended or adjusted under 35 U.S.C. 154(b) by 0 days.

(21) Appl. No.: 19/370,748

(22) Filed: Oct. 28, 2025

(30) Foreign Application Priority Data

Sep. 23, 2025 (KR) ........................ 10-2025-0137579

(51) Int. Cl.
| | |
|---|---|
| *G06F 9/30* | (2018.01) |
| *G06F 5/01* | (2006.01) |
| *G06F 17/16* | (2006.01) |
| *G06N 3/045* | (2023.01) |
| *G06N 3/063* | (2023.01) |

(52) U.S. Cl.
CPC .............. *G06F 9/3001* (2013.01); *G06F 5/01* (2013.01); *G06F 9/30036* (2013.01); *G06F 17/16* (2013.01); *G06N 3/045* (2023.01); *G06N 3/063* (2013.01)

(58) Field of Classification Search
CPC .................................................... G06N 3/063
See application file for complete search history.

(56) References Cited

U.S. PATENT DOCUMENTS

| | | | | |
|---|---|---|---|---|
| 2018/0095935 | A1* | 4/2018 | Ben-Dayan Rubin | .. G06F 17/16 |
| 2025/0315667 | A1* | 10/2025 | Klein | G06N 3/063 |
| 2025/0348732 | A1* | 11/2025 | Mohammed | G06N 3/045 |
| 2025/0371104 | A1* | 12/2025 | Klein | G06F 17/16 |
| 2025/0378311 | A1* | 12/2025 | Sabeti | G06N 3/0464 |
| 2025/0390757 | A1* | 12/2025 | Watanabe | G06N 3/096 |

* cited by examiner

*Primary Examiner* — Michael J Metzger
(74) *Attorney, Agent, or Firm* — INVENSTONE PATENT, LLC

(57) ABSTRACT

A neural processing unit for performing inference operations of a large-scale language model based on an artificial neural network is disclosed. The neural processing unit according to the present disclosure includes a processing element core configured to perform an attention mechanism-based operation based on input data in vector format to output an operation result, a special function unit comprising a plurality of arithmetic circuits including at least one vector-dedicated arithmetic circuit that exclusively performs vector operations and at least one mixed arithmetic circuit capable of performing both vector and scalar operations, and configured to perform a special function operation on the operation result, and a controller configured to, upon receiving an RMS normalization operation execution command, activate at least one of the plurality of arithmetic circuits to control the special function unit to perform an operation of converting at least one of the operation result or the input data into a normalized vector whose magnitude is adjusted based on a root mean square (RMS), wherein the operation result may include an attention score for the input data.

17 Claims, 26 Drawing Sheets

1000

100 npu is an AI accelerator ⟶ NPU ⟶ yes, I am the AI accelerator

| Operation | Energy(pj) |
|---|---|
| 8b Add | 0.03 |
| 16b Add | 0.05 |
| 32b Add | 0.1 |
| 16b FP Add | 0.4 |
| 32b FP Add | 0.9 |
| 8b Mult | 0.2 |
| 32b Mult | 3.1 |
| 16b FP Mult | 1.1 |
| 32b FP Mult | 3.7 |
| 32b SRAM Read | 5 |
| 32b DRAM Read | 640 |

NEURAL PROCESSING UNIT FOR PERFORMING RMS NORM OPERATION AND CONTROL METHOD THEREOF

CROSS-REFERENCE TO RELATED APPLICATIONS

This application claims the priority of Korean Patent Application No. 10-2025-0137579, filed on Sep. 23, 2025 in the Korean Intellectual Property Office, the disclosure of which is incorporated herein by reference.

TECHNICAL FIELD

The present disclosure relates to a neural processing unit for performing an RMS NORM operation and a control method thereof.

BACKGROUND ART

Humans possess intelligence that enables them to perform tasks such as recognition, generation, classification, inference, prediction, and control/decision making. Artificial intelligence (AI) refers to the artificial imitation of human intelligence.

The human brain is composed of numerous nerve cells called neurons, and each neuron is connected to hundreds to thousands of other neurons through connections called synapses. A model that simulates the operational principles of biological neurons and the connections between them to mimic human intelligence is called a neural network (ANN) model. In other words, a neural network is a system in which nodes that mimic neurons are connected in a layer structure.

As neural network technology advances, the application of neural network inference services that utilize big data-based training is becoming increasingly diverse. Such inference services can train a neural network on a vast dataset and subsequently infer diverse and complex data through the learned model. However, as the required functionality and accuracy for neural network inference services continue to increase, the parameter size, computational complexity, and memory bandwidth demands of neural network models are growing exponentially. Consequently, the performance requirements for processors and memory capable of supporting these inference tasks are also increasing. To address these demands, neural network inference services are increasingly being deployed on cloud computing-based servers that provide efficient processing capabilities for large-scale data operations.

Generative artificial intelligence models are increasingly being developed to operate in various environments. These models include various neural network models, including language models for interactive systems, stable diffusion models that generate images from text input, and transformer models that predict and determine future activities based on a series of events in specific situations. The computational cost of generating a response to an input query based on these generative artificial intelligence models is very high. For example, among generative artificial intelligence models, the commercialization of large language models (LLM) has gained significant momentum.

Generative artificial intelligence models are very diverse, and new models are continuously being released to the market. Representative generative artificial intelligence models include, for example, GPT, LLaMA, DeepSeek, Mistral, DBRX, Qwen, Nova, Jamba, PaLM, PanGu, OPT, Gemini, Falcon, BLOOM, CLIP, RoBERTa, ALBERT, ELECTRA, LXNet, BERT, BART, CTRL, DALL-E, Stable Diffusion, Midjourney, Imagen, DeepFloyd, Runway Gen, DreamBooth, StyleGAN, BigGAN, Sora, Pika Labs, Stable Video Diffusion, Imagen Video, Make-A-Video, Phenaki, Dreamix, VideoPoet, Text2Video-Zero, and CogVideo.

However, providing generative artificial intelligence services requires a high-performance general-purpose graphics processing unit (GPGPU). However, the total power consumption of GPGPUs operating worldwide to process these LLMs has reached a level comparable to the power consumption of an entire country, and this excessive energy demand is posing a serious problem for the commercialization of LLMs. Building a GPGPU-based data center to provide LLM services requires a careful evaluation of power plant capacity to determine whether the necessary energy can be supplied, and the difficulty of meeting the energy demands of these data centers in many urban areas can be a major barrier to the widespread deployment of large-scale AI models.

SUMMARY OF THE DISCLOSURE

Neural networks are classified into 'single-layer neural networks' and 'multi-layer neural networks' according to the number of layers. A general multi-layer neural network is composed of an input layer, a hidden layer, and an output layer. (1) The input layer is a layer that receives input values. The number of input layers is the same as the number of input variables. (2) The hidden layer is located between the input layer and the output layer and is a layer that receives a signal from the input layer, extracts features, and transmits them to the output layer. (3) The output layer is a layer that receives a signal from the hidden layer and outputs it to the outside.

To implement higher artificial intelligence, a deep neural network (DNN) with an increased number of hidden layers has been disclosed. Among DNNs, a transformer artificial neural network is a DNN based on attention technology. A transformer utilizes numerous matrix multiplication operations. A transformer may obtain an attention score Q, K, V, which is an operation value, by using parameters such as an input value and a query Q, a key K, and a value V. A transformer may process various inference operations based on an operation value (e.g., attention score Q, K, V). The transformer has shown excellent performance in the field of generative artificial intelligence.

The transformer is being utilized in various large-scale language models. For example, a language model receives a query in text form and generates a response. The response generated by the language model may be generated by re-inputting the tokens generated as part of the response generated by the language model back into the language model. The cost of generating a response for such a language model is proportional to the number of parameters of the language model. Therefore, the computational cost of generating a response using a language model with a large number of parameters is high. Conversely, reducing the number of parameters can lower the computational cost and improve the response speed, but a problem may arise in that the quality of the generated response is degraded.

Furthermore, the inference accuracy of a neural network model may vary depending on the characteristics of the activation function implemented in the neural processing unit. In other words, the performance and efficiency of the neural network model are determined by the hardware implementation characteristics of the processing circuit for the activation function of the neural processing unit. In addition, a neural network model that processes an activation function with a complex formula may be processed by a hardware accelerator. When a dedicated processor for a neural network model is implemented in hardware, the dedicated processor for the neural network model may require a significant chip area (i.e., a large number of logic gates). Furthermore, such a chip may consume a considerable amount of power.

Most of the complex functions that neural network models aim to solve have non-linearity. To solve this problem, most activation functions are non-linear functions.

The performance and efficiency of a neural network model processed in hardware can vary depending on the non-linear characteristics of the activation function applied to at least one neural network model processed by the neural processing unit.

Activation functions used in neural network models, especially non-linear functions including logarithmic or exponential operations, have the problem of significantly increasing the complexity of digital logic design when implemented in hardware. This directly complicates the structure of the hardware operator, which in turn increases the power consumption of the chip and degrades the operation processing speed.

To solve this problem, there is an approach of implementing a specific activation function as a hard-wired dedicated circuit, but this faces the following fundamental limitations.

First, the lack of flexibility. The hard-wired method can only process pre-defined fixed functions, so it is impossible to independently process newly emerged or modified activation functions according to the development of AI technology without hardware changes. Ultimately, these functions are replaced by inefficient software processing or act as a serious constraint that makes the application of new AI models themselves difficult.

Second, the inefficiency of resources. Depending on the operational complexity of the activation function to be processed, the number of gates in the dedicated circuit increases exponentially, which has the disadvantage of increasing the chip area and manufacturing cost. In particular, the RMS normalization operation, which is repeatedly performed in the transformer model, includes various types of operations, making hardware implementation difficult, and it was difficult to secure both precision and stability with LUT-based approximation alone. In addition, in the conventional structure, the SFU has separate dedicated operation circuits for vectors and scalars, so it was necessary to sequentially pass through multiple circuits or store intermediate results in memory to perform the RMS normalization operation step, which was a major cause of increased power consumption and processing latency.

Furthermore, in the conventional structure, since data transfer between operation circuits relies only on a fixed flow according to the arrangement order of multiple operation circuits, it was virtually impossible to transfer partial operation results for a set of operations to another path or to configure various operation paths. This resulted in a problem of reduced resource utilization and difficulty in securing a balance between power consumption and performance.

Against this backdrop, the inventor of the present disclosure conceived the idea of a neural processing structure that can maximize hardware resource efficiency and minimize power consumption by hard-wiring the function to selectively perform integer-based scalar operations in certain sections and floating-point-based vector operations in other sections, depending on the characteristics of the neural network operation. Through this, they came to develop a new neural processing unit structure that can overcome the limitations of existing ASICs and dramatically improve the power, performance, and area (PPA) ratio.

In particular, the inventors sought to develop a neural processing unit having a special function unit including an operation block capable of performing both vector and scalar operations.

More specifically, the inventors of the present invention were able to recognize that by arranging a dedicated operation block that performs only vector operations together with an integrated operation block that supports both vector and scalar operations, it is possible to minimize both chip area and power consumption simultaneously.

At this time, the inventors of the present invention were able to recognize that by including a selector circuit that distinguishes between vector/scalar operation modes within the integrated operation block, the integrated operation block automatically switches to the required operation mode according to the characteristics of the input data, thereby securing the flexibility of dedicated circuit implementation, and that various operations such as RMS normalization operations can be effectively processed with a single operation block.

However, the problems of the present disclosure are not limited to the problems mentioned above, and other unmentioned problems will be clearly understood by those of ordinary skill in the art from the following description.

A neural processing unit that performs inference operations of a large-scale language model based on an artificial neural network is disclosed. The neural processing unit according to the present disclosure comprises a processing element core configured to perform an attention mechanism-based operation based on input data in a vector format to output an operation result, a special function unit comprising a plurality of operational circuits including at least one vector-dedicated operational circuit that exclusively performs vector operations and at least one mixed operational circuit capable of performing both vector and scalar operations, and configured to perform a special function operation on the operation result, and a controller configured to, upon receiving an RMS normalization operation command, activate at least one of the plurality of operational circuits to perform an operation of converting at least one of the operation result or the input data into a normalized vector whose magnitude is adjusted based on the root mean square (RMS), wherein the operation result may include an attention score for the input data.

The at least one vector-dedicated operational circuit may be configured to sum the squared values of the input data in vector format or to calculate an average thereof.

The at least one mixed operational circuit may be configured to calculate a normalization coefficient based on the sum or average of the squared values, or to normalize the input data based on the normalization coefficient.

Furthermore, the plurality of operational circuits may be configured to be connected in series.

Furthermore, the controller may be configured to selectively activate some of the plurality of operational circuits by at least two operation codes, wherein an operation of a first operational step is performed by selectively activating at least one of the operational circuits by a first operation code to obtain an intermediate result value, and an operation of a second operational step is performed based on the intermediate result value by selectively activating at least one of the operational circuits by a second operation code to perform an RMS normalization operation, thereby controlling the special function unit.

Furthermore, the controller may be configured to, in the first operational step, control the special function unit such that a first mixed operational circuit squares each element of the input data based on the first operation code, a first vector-dedicated operational circuit sums each of the squared elements, a second mixed operational circuit calculates an average value for the summed value and then adds a correction constant, and a third mixed operational circuit performs a square root operation on the value obtained by adding the correction constant to the average value and takes the reciprocal to store intermediate operation values, which are normalization coefficients, in the memory of the neural processing unit.

Furthermore, the controller may be configured to, in the second operational step, control the special function unit such that a fourth mixed operational circuit, based on the second operation code, performs scaling for each element by multiplying each element of the input data by the intermediate operation values, thereby calculating a normalized vector.

Furthermore, the controller may be configured to control the special function unit to perform an RMS normalization operation based on a single operation code.

Furthermore, the controller may be configured to, based on the single operation code, control the special function unit such that a first mixed operational circuit squares each element of the input data, a first vector-dedicated operational circuit sums each of the squared elements, a second mixed operational circuit calculates an average value for the summed value and then adds a correction constant, a third mixed operational circuit performs a square root operation on the value obtained by adding the correction constant to the average value and takes the reciprocal to calculate a normalization coefficient, and a fourth mixed operational circuit performs scaling for each element by multiplying each element of the input data by the normalization coefficient, thereby calculating a normalized vector.

A special function unit, comprised in a neural processing unit that performs special function operations and performs inference operations of a large-scale language model based on an artificial neural network, comprises a data input unit for reading data required for operations from an external memory, and a plurality of operational circuits including at least one vector-dedicated operational circuit that exclusively performs vector operations and at least one mixed operational circuit capable of performing both vector and scalar operations, wherein the special function unit may be configured to, upon receiving an RMS normalization operation command, perform an operation of converting at least one of the operation result or the input data into a normalized vector whose magnitude is adjusted based on the root mean square (RMS).

Furthermore, the at least one vector-dedicated operational circuit may be configured to sum the squared values of the input data in vector format or to calculate an average thereof.

Furthermore, the at least one mixed operational circuit may be configured to calculate a normalization coefficient based on the sum or average of the squared values, or to normalize the input data based on the normalization coefficient.

Furthermore, the plurality of operational circuits may be configured to be connected in series.

Furthermore, the special function unit may be configured to selectively activate some of the plurality of operational circuits by at least two operation codes, wherein an operation of a first operational step is performed by selectively activating at least one of the operational circuits by a first operation code to obtain an intermediate result value, and an operation of a second operational step is performed based on the intermediate result value by selectively activating at least one of the operational circuits by a second operation code to perform an RMS normalization operation.

Furthermore, the special function unit may be configured to, in the first operational step, based on the first operation code, have a first mixed operational circuit square each element of the input data, a first vector-dedicated operational circuit sum each of the squared elements, a second mixed operational circuit calculate an average value for the summed value and then add a correction constant, and a third mixed operational circuit perform a square root operation on the value obtained by adding the correction constant to the average value and take the reciprocal to store intermediate operation values, which are normalization coefficients, in the memory of the neural processing unit.

Furthermore, the special function unit may be configured to, in the second operational step, based on the second operation code, have a fourth mixed operational circuit, based on the intermediate operation values, perform scaling for each element by multiplying each element of the input data by the intermediate operation values, thereby calculating a normalized vector.

Furthermore, the special function unit may be configured to perform an RMS normalization operation based on a single operation code.

Furthermore, the special function unit may be configured to, based on the single operation code, have a first mixed operational circuit square each element of the input data, a first vector-dedicated operational circuit sum each of the squared elements, a second mixed operational circuit calculate an average value for the summed value and then add a correction constant, a third mixed operational circuit perform a square root operation on the value obtained by adding the correction constant to the average value and take the reciprocal to calculate a normalization coefficient, and a fourth mixed operational circuit perform scaling for each element by multiplying each element of the input data by the normalization coefficient, thereby calculating a normalized vector.

Furthermore, the special function unit may further comprise a selector circuit, and the mixed operational circuit may comprise a plurality of lanes for performing operations, wherein the mixed operational circuit identifies whether the current operation to be processed is a vector operation or a scalar operation, and if the selector circuit outputs a lane activation signal corresponding to the identified operation type, it activates at least one of the plurality of lanes to cause the mixed operational circuit to perform the vector or scalar operation, and the mixed operational circuit may be configured to, if the identified operation is a scalar operation, activate only one of the plurality of lanes, and if the identified operation is a vector operation, activate two or more of the plurality of lanes.

An operational apparatus comprising a plurality of operational circuits including at least one vector-dedicated operational circuit that exclusively performs vector operations and at least one mixed operational circuit capable of performing both vector and scalar operations, wherein the apparatus is configured to selectively activate the plurality of operational circuits to perform a plurality of sets of operations by a combination of the activated operational circuits, and the plurality of sets of operations may include an RMS normalization operation among attention operations, which are inference operations based on an artificial neural network.

According to the present disclosure, the following effects can be achieved.

First, it is possible to maximize the efficiency of hardware resources and dramatically reduce the chip area. The special function unit SFU of the present disclosure proposes a structure that processes both vector V-CORE and scalar S-CORE operations in a single SFU, moving away from the conventional method of processing them separately. This integrated structure has the effect of reducing the number of memory request ports, which significantly reduces the wafer size of the chip, i.e., the physical area. Furthermore, efficient resource utilization is possible through hardware optimization specialized for the RMS normalization operation process, in which vector and scalar operations are used simultaneously during the attention operation.

Second, it is possible to dramatically improve operational performance and processing speed and minimize energy consumption. The present disclosure adopts a method of performing the RMS normalization operation in an on-the-fly manner using a special function unit, thereby performing all operations without storing partial operation results in memory and writing only the final result to memory. This on-the-fly operation method maximizes energy efficiency by eliminating unnecessary energy consumption that occurs when accessing memory multiple times in the middle. At the same time, since the intermediate storage process is omitted, the data processing speed is increased, which has the effect of shortening the overall latency of neural network inference and maximizing the operation throughput.

Third, the memory footprint can be significantly reduced. The on-the-fly RMS normalization operation method does not require intermediate results to be stored in memory, thus providing the effect of significantly reducing the memory requirement (memory footprint) for performing the operation. This optimizes system memory usage and improves overall system efficiency.

Fourth, system scalability and interconnect efficiency are improved. For example, in the present disclosure, a common bus and a plurality of routers are arranged inside the SFU, so that each operation block can transmit and receive data to and from the shared bus. Since the router selectively arbitrates the data flow, the wiring complexity and wiring area are reduced, and when adding or replacing a block, it is only necessary to connect to the bus, thus increasing design scalability.

The effects according to the present disclosure are not limited by the contents exemplified above, and more various effects are included within the present disclosure.

BRIEF DESCRIPTION OF THE DRAWINGS

FIG. 19$b$ illustrates a method of performing an operation in an on-the-fly manner using the operational circuits of a special function unit according to at least one embodiment of the present disclosure.

FIG. 20$b$ is a diagram illustrating the internal configuration of a mixed operational circuit when performing a scalar operation according to at least one embodiment of the present disclosure.

DETAILED DESCRIPTION OF THE EMBODIMENTS

Figure 1:
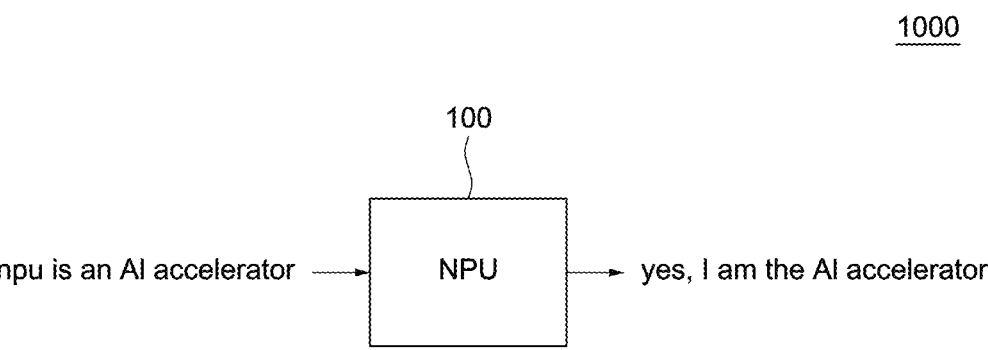
FIG. 1 is a block diagram illustrating a neural processing unit for processing a language model according to an example of the present disclosure.

Specific structural or step-wise descriptions for the examples according to the concept of the present disclosure disclosed herein are merely exemplified for the purpose of explaining the examples according to the concept of the present disclosure.

The embodiments according to the concept of the present disclosure may be variously modified. The present disclosure may have various forms. Therefore, specific examples are illustrated in the drawings and will be described in detail in the present disclosure. However, this is not intended to limit the examples according to the concept of the present disclosure to a specific disclosed form. Therefore, it should be understood that all modifications, equivalents, or substitutes included in the spirit and technical scope of the present disclosure are included in the present disclosure.

Terms such as first and/or second may be used to describe various components. However, the present disclosure should not be limited by these terms.

These terms are used only for the purpose of distinguishing one component from another. For example, without departing from the scope of the rights according to the concept of the present disclosure, a first component may be named a second component, and similarly, a second component may also be named a first component.

When a component is referred to as being "connected" or "accessed" to another component, it should be understood that it may be directly connected or accessed to the other component, but other components may exist in between. On the other hand, when a component is referred to as being "directly connected" or "directly accessed" to another component, it should be understood that no other components exist in between.

Other expressions describing the relationship between components, i.e., "between" and "directly between" or "adjacent to" and "directly adjacent to," etc., should also be interpreted in the same way.

In this document, expressions such as "A or B," "at least one of A or/and B," or "one or more of A or/and B" may include all possible combinations of the items listed together. For example, "A or B," "at least one of A and B," or "at least one of A or B" may refer to all of the following cases: (1) including at least one A, (2) including at least one B, or (3) including both at least one A and at least one B.

Expressions such as "first," "second," "primary," or "secondary," as used in the present disclosure, may modify various components regardless of order and/or importance. These expressions are used only to distinguish one component from another and do not limit the corresponding components. For example, a first user device and a second user device may represent different user devices regardless of order or importance. For example, without departing from the scope of the claims described in this document, a first component may be named a second component, and similarly, a second component may also be renamed as a first component.

The terms used in the present disclosure are used only to describe specific embodiments and may not be intended to limit the scope of other examples.

A singular expression may include a plural expression unless the context clearly indicates otherwise. Terms used herein, including technical or scientific terms, may have the same meaning as commonly understood by one of ordinary skill in the art to which the technology described herein belongs.

Terms used in the present disclosure, such as those defined in a general dictionary, may be interpreted as having the same or similar meaning as in the context of the related art. The terms used in the present disclosure are not interpreted in an ideal or excessively formal sense unless explicitly defined in this document. In some cases, even terms defined in this document cannot be interpreted to exclude the embodiments of this document.

The terms used in the present disclosure are used only to describe specific embodiments and are not intended to limit the present disclosure.

A singular expression includes a plural expression unless the context clearly indicates otherwise. In the present disclosure, terms such as "comprise" or "have" are intended to designate the existence of a described feature, number, step, operation, component, part, or a combination thereof. Therefore, it should be understood that the possibility of the existence or addition of one or more other features, numbers, steps, operations, components, parts, or combinations thereof is not precluded in advance.

Unless otherwise defined, all terms used herein, including technical or scientific terms, have the same meaning as commonly understood by one of ordinary skill in the art to which the present disclosure belongs. Terms such as those defined in a commonly used dictionary should be interpreted as having a meaning consistent with the meaning in the context of the related art. Unless explicitly defined in the present disclosure, they are not interpreted in an ideal or excessively formal sense.

The respective features of the various examples of the present disclosure may be partially or wholly combined or coupled with each other. The various examples of the present disclosure can be technically interlocked and driven in various ways, as can be fully understood by those skilled in the art. Each example of the present disclosure may be implemented independently of each other or may be implemented together in a related relationship.

In describing each example, explanations of technical content that is well-known in the technical field to which the present disclosure belongs and is not directly related to the present disclosure will be omitted. This is to deliver the gist of the present disclosure more clearly without obscuring it by omitting unnecessary explanations.

In the present disclosure, a 'unit' may refer to a hardware module or a hardware circuit. For example, a '~unit' may be a hardware circuit for performing a specific function. However, a '~unit' does not necessarily mean a dedicated circuit physically separated from other circuits to perform only that function. A '~unit' may be configured based on a plurality of circuits, and these circuits may exist at different locations and may be interlocked under a control signal to perform a specific function. For example, 'A unit' and 'B unit' may also include at least some common electronic circuits.

In the present disclosure, an 'artificial intelligence model' may include not only a generative AI model but also a traditional AI model that performs judgment, classification, prediction, etc. An artificial intelligence model may include a language model, a model that reads images or videos, etc., and any model that generates output data from input data using an artificial neural network may correspond to an artificial intelligence model. For example, an artificial intelligence model can generate output text from input text. An artificial intelligence model can classify input data or generate prediction data from input data. An artificial intelligence model can search for or track an object of interest from an image or video. An artificial intelligence model can perform situation judgment by analyzing an image or video. An artificial intelligence model can generate an image/video corresponding to input text based on the input text. An artificial intelligence model can generate output text describing an input image/video from the input image/video. The input data and output data can be text, voice signals, images, videos, etc., respectively, and are not limited in kind.

The artificial intelligence model can be implemented as an artificial neural network, and as a representative embodiment, the processing or operation of the artificial intelligence model can include various operations performed within the computation graph of the neural network. These operations can include layers containing weight parameters (Dense, Conv, etc.) as well as operations with no or a limited number of parameters, such as Softmax and RMS Normalization (RMSNorm).

A 'Transformer' is an artificial intelligence model implemented based on an Attention Mechanism and can be used in language models (large language model, LLM, and small LLM). Language models include BERT (Bidirectional Encoder Representations from Transformers), GPT (Generative Pre-trained Transformer), RoBERTa (Robustly Optimized BERT Pretraining Approach), ALBERT (A Lite BERT), ELECTRA (Efficiently Learning an Encoder that Classifies Token Replacements Accurately), Transformer-XL (Transformer with Extra Long Context), XLNet (a model combining the advantages of GPT and BERT), BART (Bidirectional and Auto-Regressive Transformers), CTRL (Conditional Transformer Language), T5 (Text-to-Text Transfer Transformer), LaMDA (Language Model for Dialogue Applications), Gopher (DeepMind's LLM), InstructGPT (a Fine-tuned model based on GPT-3), PanGu (Huawei's Chinese model), PaLM (Pathways Language Model), OPT 175B (Open Pretrained Transformer 175B), BLOOM (BigScience Large Open-science Open-access Multilingual Model), HyperCLOVA (Naver's Korean ultra-large model), etc., and may also include new language models that will appear in the future.

Hereinafter, a large language model may include not only a large language model with a large number of parameters but also a small language model (SLM) that is lightweight and has a smaller number of parameters compared to an LLM.

The transformer can be utilized not only in natural language processing (NLP) but also in computer vision, and representative transformer-based vision models include ViT (Vision Transformer), Swin-Transformer (Sliding Window-based Transformer for Vision), and others.

According to the examples of the present disclosure, it is possible to provide an apparatus, method, system, and computer-readable medium that enable a generative artificial intelligence service to operate on the device itself (also referred to as on-device).

In general, a transformer-based generative artificial intelligence model receives a query and generates a response. For example, a language model receives a query in text form and generates a token. Then, the query and the generated token are input back into the language model to generate the next token. This token generation operation can be repeated several times until a response to the query is completed. A token may correspond to a word or part of a word. The response generated by the language model may include a series of tokens that are further generated by passing the tokens generated as part of the response generated by the language model back through the language model.

In this specification, a "channel" refers to a set of output values generated by the same operational unit in an artificial neural network operation, and for example, the filter output of a CNN (convolutional neural network), the node output of an MLP (multilayer perceptron), or the hidden unit dimension ($d_{model}$) of a transformer-based model may correspond to this. That is, the embedding vector elements corresponding to the size of the hidden unit dimension for a single token may be the channel unit, but it is not limited thereto.

Hereinafter, an example of the present disclosure will be described in detail with reference to the accompanying drawings.

FIG. 1 is a block diagram illustrating a neural processing unit for processing a language model according to an example of the present disclosure.

Referring to FIG. 1, a computing system 1000 operates on an edge device and can infer from input text data through embedding, attention, feed-forward, softmax, etc., to output output tokens. This inference operation is composed of numerous matrix multiplications and nonlinear operations, and the neural processing unit (hereinafter referred to as 'NPU') of the present disclosure enables high-speed inference through the optimization of these operations.

The computing system 1000 can receive input data and generate output data. Specifically, the computing system 1000 may include an (NPU) 100. The computing system 1000 may further include operational units such as a CPU, GPU, and memory in addition to the NPU 100. The embedding transformation for the input text can be performed by a CPU or GPU, etc. The transformed embedding vector is delivered to the NPU 100 and can be utilized for subsequent inference operations by the (NPU) 100. The (NPU) 100 can perform inference operations of a transformer-based generative artificial intelligence model.

The (NPU) 100 can generate output data from input data. According to an example, the input data may be text data. The output data may be text data, image data, or video data. The text data is composed of at least one token. For example, if text including five tokens, 'npu', 'is', 'an', 'AI', 'accelerator', is input to the (NPU) 100, the (NPU) 100 can perform a transformer-based artificial neural network operation to output text including six tokens, 'yes', 'I', 'am', 'an', 'A', 'accelerator'.

In a transformer-based artificial intelligence model, the artificial neural network operation can be performed in an on-device manner. That is, the computing system 1000 can be included and driven on an edge device such as a mobile device like a smartphone, a camera, a CCTV, a robot, a vehicle, a drone, a home appliance, an artificial intelligence assistant, a smart mobility, etc. The edge device within the computing system 1000 does not require wired or wireless communication with the outside of the computing system 1000 for artificial neural network operations.

In a transformer-based artificial intelligence model, the artificial neural network operation can be performed based on an attention mechanism. Under the attention mechanism, input data in text form is transformed into an embedding vector through an embedding process, and the embedding vector can be transformed into Query, Key, and Value vectors using matrix multiplication (MatMul) with a query weight matrix, a key weight matrix, and a value weight matrix. The query weight matrix, key weight matrix, and value weight matrix are each pre-trained values. Thereafter, the similarity between the query (Q) and the key (K) is calculated, and the similarity is transformed into a normalized attention weight through a softmax function. An attention output can be obtained by multiplying the calculated weight by a value vector to assign a value (V). The attention output can go through a feed-forward neural network, etc., to finally calculate the probability distribution of the next token, and the token with the highest probability can be determined as the final output token.

Figure 2:
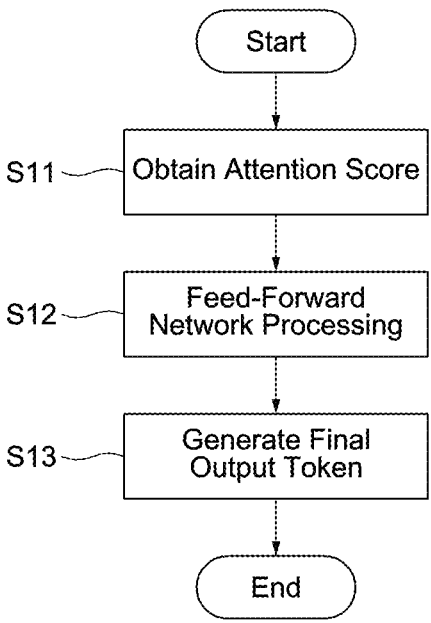
FIG. 2 is a flowchart illustrating a method of processing a language model using a neural processing unit according to an example of the present disclosure.

FIG. 2 is a flowchart illustrating a method of processing a language model using a neural processing unit according to an example of the present disclosure.

Referring to FIG. 2, the NPU 100 can obtain an attention score for the input data S11. Here, the input data may include a plurality of tokens, and each token can be represented as an embedding vector of a predetermined dimension ($d_{model}$). The number of dimensions of the embedding vector ($d_{model}$) may be, for example, 128, 256, 1024, 2048, or 4096, etc. Hereinafter, for convenience of explanation, it is assumed in this embodiment that the number of dimensions of the embedding vector ($d_{model}$) is 4096. Accordingly, under the computing system 1000, one token can be represented as a 1×4096 dimensional embedding vector.

For example, if a user inputs "npu is an AI accelerator" consisting of 5 tokens into the computing system 1000, the computing system 1000 can convert the input text into a 5×4096 (i.e., five 1×4096) size embedding vector, and the NPU 100 can receive the corresponding embedding vector.

The NPU 100 can obtain a query vector Q by matrix multiplying the embedding vector by a query weight matrix. The NPU 100 can obtain a key vector K by matrix multiplying the embedding vector by a key weight matrix. And the NPU 100 can obtain a similarity through an inner product between the query vector Q and the key vector K. When the query vector Q and the key vector K are inner-product multiplied, a scalar value is obtained, and as a result, a vector $QK^T$ of a size (1×5) identical to the number of tokens of the input data is obtained. $QK^T$ represents the similarity with the key k (each of the 5 tokens) for the current token.

However, the elements of the obtained vector $QK^T$ can be numerically very large, so for numerical stability, the normalized final similarity can be obtained by dividing $QK^T$ by the square root of the size of the key vector K ($\sqrt{(dk)}$) and then applying a softmax operation. Equation 1 below defines a formula for calculating the softmax-based similarity value (qk) for the current token key k. k can be one of 1, 2, . . . , N (N is the number of tokens included in the input data, a natural number of 2 or more, and in this embodiment, N=5).

$$qk = softmax\left(\frac{QK^T}{\sqrt{d_k}}\right) \qquad \text{Equation 1}$$

Here, the softmax operation is an operation that converts several numbers into a probability between 0 and 1. Equation 2 below shows a formula for performing a softmax operation on the vector [z1, z2, . . . , zn].

$$\sigma(zi) = \frac{e^{z_i}}{\sum_{j=1}^{n} e^{z_i}} \qquad \text{Equation 2}$$

However, if there is a very large value in zi, a numerical instability problem may occur. To solve this, it is possible to make the calculation more numerically stable by using a method of subtracting the maximum value, $z_{max}$ (negative exponential trick). Equation 3 below is a modified softmax operation formula using $z_{max}$ calculated in equation 2.

$$\sigma(zi) = \frac{e^{z_i - z_{max}}}{\sum_{j=1}^{n} e^{z_i - z_{max}}} \qquad \text{Equation 3}$$

Through equation 1, the similarity can be obtained as a 1×5 size vector of, for example, [0.007, 0.993, 0, 0, 0]. The similarity is a value expressed as a probability of similarity with other tokens for the current query (e.g., 'npu').

According to an embodiment, the NPU 100 can assign a value to the similarity. The value vector can be similar to the method of calculating the key vector. The embedding vector can be converted into a value vector through matrix multiplication with a pre-trained value weight matrix. An attention score can be obtained by vector-matrix multiplying the value vector V by the similarity obtained through equation 1. Accordingly, an attention score of 5×4096 size, which is the same dimension as the input data, can be obtained by performing the operation as in equation 4.

$$\text{Attention Score} = softmax\left(\frac{QK^T}{\sqrt{d_k}}\right) \times V \qquad \text{Equation 4}$$

That is, the NPU 100 can repeatedly perform the operation of equation 4 to generate output data. In this process, it can be seen that the NPU 100 repeatedly performs high-dimensional calculations including operations such as matrix multiplication, division, and multiplication. According to an embodiment, the NPU 100 may additionally perform a residual connection and layer normalization. The residual connection and layer normalization are for complementing the possibility of gradient vanishing that may occur in a differentiation-based learning method of deep learning, and can minimize information loss by adding the input value to the output value that has passed through the layer of the artificial neural network. For the residual connection, after the attention score is calculated, the embedding vector of the input data may be added to the corresponding attention score. Layer normalization can alleviate the covariant shift by adjusting the value based on the mean and variance of the output value (i.e., the result of the residual connection) in natural language processing. Equation 5 below is a mathematical equation related to layer normalization.

$$\bar{a}_i = \frac{a_i - \mu}{\sqrt{\frac{1}{n}\sum_{i=1}^{n}(a_i - \mu)^2 + \varepsilon}} g_i \qquad \text{Equation 5}$$

In equation 5, $\alpha_i$ is the $i^{th}$ component of the input vector a, n is the length of the vector, $\mu$ is the mean value of the component values constituting the vector, and $\varepsilon$ is a small value added to prevent the denominator of the equation from becoming 0. $g_i$ is a pre-trained gain parameter that can be multiplied to adjust the magnitude of the normalized output value. Accordingly, by adjusting the magnitude of the normalized value, the feature of each dimension can be reflected in the output value.

Meanwhile, normalization is not limited to layer normalization and may also be performed as RMS normalization (RMSNorm). RMS normalization stabilizes the magnitude of the normalized output by scaling with the root mean square (RMS) of the component values without removing the mean of the input vector.

This method has the advantage of being simple in calculation, easy to implement in hardware, and having excellent numerical stability even in an environment operating with a small number of bits (e.g., float16, bfloat16, etc.). Therefore, applying RMSNorm enables efficient inference and stable learning in deep neural networks such as large-scale language models. equation 6 to equation 8 below are formulas for RMS normalization.

$$RMS(a) = \sqrt{\frac{1}{n}\sum_{i=1}^{n} a_i^2 + \varepsilon} \qquad \text{Equation 6}$$

$$\bar{a}_i = \frac{a_i}{RMS(a)} g_i \qquad \text{Equation 7}$$

$$\bar{a}_i = \frac{a_i}{\sqrt{\frac{1}{n}\sum_{i=1}^{n} a_i^2 + \varepsilon}} g_i \qquad \text{Equation 8}$$

The symbols in equation 6 to equation 8 have the same meaning as the symbols described in equation 5.

Equation 6 defines the Root Mean Square (RMS) for the components of the input vector a. Here, Root Mean Square (RMS) refers to the operation of squaring the value of each component constituting the vector, then finding the average of those squared values, and then taking the square root of that average. For example, if a=[$a_1$, $a_2$, . . . , $a_n$], the RMS value is defined as in equation 6. RMS is an indicator that summarizes the magnitude of the entire vector into a single scalar value and can stably reflect the overall scale of the input values.

Equation 7 is a mathematical expression for obtaining the normalized output $\bar{a}_i$ by dividing the input component $\alpha_i$ by the RMS value obtained through equation 6 and then multiplying by the gain parameter $g_i$. That is, RMS normalization is an equation derived according to the normalization principle of "dividing the input value by the RIIS value of the entire vector," and the gain parameter $g_i$ can be applied to adjust the magnitude for each dimension even after normalization.

Equation 8 is a form developed by combining equation 6 and equation 7, and is expressed by directly substituting the RMS calculation formula into the denominator. That is, the finally normalized output $\bar{a}_i$ is calculated by dividing the input component $\alpha_i$ by the RMS value of equation 6 and then multiplying by $g_i$.

After step S11, the NPU 100 can process the attention score through a feed-forward neural network S12. Here, the feed-forward neural network is for predicting nonlinear phenomena, and it can infer contextual meanings such as phrases or clauses by recombining the relationship information of the tokens for which the attention score was calculated. The feed-forward neural network can use, for example, a fully connected hidden layer with two layers having 2,048 nodes, and the output can be a 4,096-dimensional vector, the same as the input. The feed-forward neural network can be pre-trained, and matrix multiplication operations can be repeatedly performed for inference. The input data input to the feed-forward neural network is represented as a 4,096-dimensional vector as a result of undergoing residual connection and normalization in step S11, and the residual connection and normalization of step S11 can also be additionally performed on the output data of the hidden layer composed of two layers. At this time, the normalization may include the aforementioned layer norm or RMS norm.

After step S12, the NPU 100 can generate a final output token S13.

To generate the final output token, the output data calculated in step S12, the output vector, must be expanded to the number of the entire token set that can be processed by the language model (e.g., 30,000). For example, the output vector of step S12 can be expanded into a 1×30000 size logit vector by being matrix-multiplied with a final output weight matrix (e.g., 4,096×30,000). The size of the final output weight matrix for the final output is $d_{model}$ X SIZE_DIC, where SIZE_DIC represents the total number of tokens that can be output from the language model during inference operations in the NPU (in this embodiment, 30,000). A softmax operation is applied to the calculated 1×30,000 size logit vector, so that all 30,000 tokens are normalized to a probability value between 0 and 1, and the token with the highest probability value among the 30,000 probability values can be selected as the next output token to be generated. For example, if the input data to the NPU 100 is 'npu is an AI accelerator', the output token can be determined as 'yes', and if the input data is 'npu is an AI accelerator yes you are an', the output token can be determined as 'expert'.

As described above with reference to FIG. 1 and FIG. 2, the NPU 100 repeatedly performs numerous matrix multiplication operations (MatMul), vector operations, scalar operations, etc., for the inference operation of a transformer-based artificial neural network model, and the NPU 100 needs to be optimized for these operations. Hereinafter, the structure and operation of the NPU 100 will be described.

Figure 3:
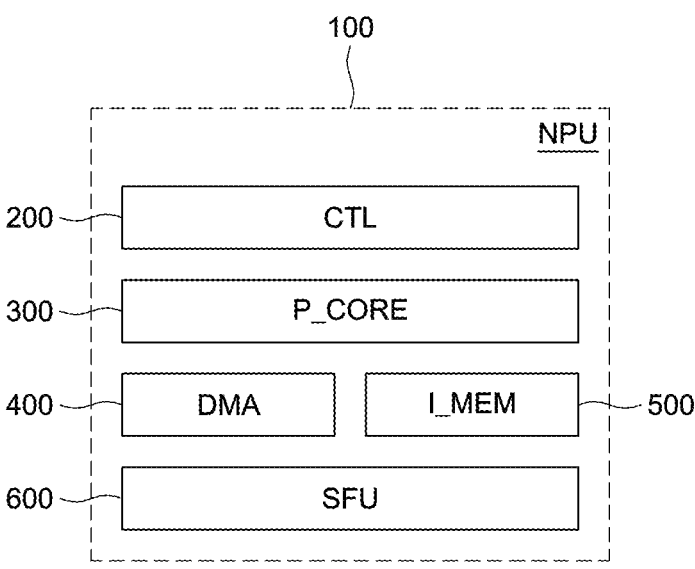
FIG. 3 is a block diagram illustrating a neural processing unit according to examples of the present disclosure.

FIG. 3 is a block diagram illustrating a neural processing unit according to examples of the present disclosure.

Hereinafter, the neural processing unit 100 will be described in detail with reference to FIG. 3. The neural processing unit 100 is a dedicated processor specialized for deep neural network (DNN) operations, separate from processors such as a central processing unit or a graphics processing unit. The neural processing unit 100 may be referred to as a tensor processing unit (TPU), an AI accelerator, a neural signal processor (NSP), a neural network processor (NNP), or the like.

The neural processing unit 100 may be a semiconductor implemented with electrical/electronic circuits. That is, each component of the neural processing unit 100 may be a semiconductor circuit composed of numerous electronic elements (e.g., transistors, capacitors, electrical wiring, etc.). Therefore, some of them may be difficult to identify and distinguish with the naked eye and can only be identified by their operation.

This neural processing unit 100 is for accelerating artificial neural network operations and is also called an artificial intelligence hardware accelerator. The artificial neural network can output the operations of a transformer-based language model. However, it is not limited to this and can also process vision-based models such as YOLO or ResNet. It can be mounted on a device and output various information based on artificial intelligence. The device may include a central processing unit, a graphics processing unit, an Application Processor (AP), a Microcontroller Unit (MCU), etc., in addition to the neural processing unit 100. The device may include a microphone, camera, touch pad, keyboard, etc., to receive input data, and may include a monitor, speaker, etc., to output output data. The device may include, but is not limited to, a smartphone, an assistant terminal located at home or in an office, a home appliance, a vehicle's VCU or ADAS system, a camera such as a CCTV, a robot, a smart mobility, etc.

The neural processing unit 100 according to examples of the present disclosure is specially designed to accelerate the attention algorithm of a transformer-based neural network model with low power, which will be described in detail later. However, the neural processing unit 100 of the present disclosure is not limited to transformer neural networks and can process various neural network models such as a convolutional neural network (CNN).

A neural processing unit 100 that can be applied to examples of the present disclosure may include a controller (CTL) 200, a processing element core (P_CORE) 300, a direct memory access (DMA) 400, an internal memory (I_MEM) 500, and a special function unit (SFU) 600.

The processing core 300 and the special function unit 600 of the neural processing unit 100 may be arithmetic circuits configured to efficiently process an attention layer of a neural network model. The attention layer can obtain an attention score (Q, K, V), which is an operation value, using parameters such as an input value and a query (Q), a key (K), and a value (V).

The processing core 300 and the special function unit 600 are designed to process operations such as matrix multiplication, root mean square normalization, and softmax for attention operations. The tensor data format required for the above operations may be one of a multi-dimensional matrix format, a 2D-matrix format, a 1D-array format, or a scalar value, and one of the processing element core 300 and the special function unit 600 may be selected for the operation according to the data format, Therefore, the neural processing unit 100 can rapidly accelerate the operation of a generative artificial intelligence model with low power by appropriately adopting a suitable hardware module according to the operation.

That is, the processing core 300 can process mathematical operations necessary for artificial neural network inference operations, and may include an arithmetic logic unit (ALU), a multiply-accumulate unit (MAC), an adder tree, and the like.

The controller 200 may be electrically connected to the processing core 300, the direct memory access unit 400, the internal memory 500, and the special function unit 600. The controller 200 may be configured to control operations related to the neural network operations of the neural processing unit 100. The controller 200 can control each circuit included in the neural processing unit 100 to process the inference operation of the neural network model by an execution code generated by a compiler (not shown). Here, the compiler (not shown) may be a semiconductor circuit or a software module operating in a separate device from the neural processing unit 100.

The compiler (not shown) can obtain an executable code that can be executed in the neural processing unit 100 by compiling a specific neural network model. That is, the compiler (not shown) can generate an executable code that can be exclusively executed in a specific neural processing unit having specific performance. The executable code may also be referred to as machine code or binary code.

The controller 200 can control the processing core 300, the direct memory access unit 400, the internal memory 500, and the special function unit 600 based on various commands and operation schedules included in the execution code. For example, in the present disclosure, the controller 200 may be operably connected to each of the processing core and the special function unit.

The compiler (not shown) may be provided with the hardware characteristics of the neural processing unit 100 (e.g., the operational performance of the processing core 300, the operational performance of the special function unit 600, the capacity of the internal memory 500, and the main memory (not shown) bandwidth of the corresponding bus (not shown), etc.). Also, the compiler (not shown) may be provided with the structure information of the neural network model to be processed by the neural processing unit 100, information on the algorithms included in the neural network model, and information on the size of the parameters. Then, the compiler (not shown) can generate an execution code for controlling the read/write order of data required for neural network operations, the processing order of neural network operations, and the operational status of each component of the neural processing unit 100. The controller 200 can be provided with the execution code from the compiler and control the neural processing unit 100 based on the execution code. Each execution code may be generated corresponding to each neural network model, and the neural processing unit 100 may be configured to process at least one execution code.

The processing core 300 may include an electronic circuit specialized for matrix multiplication, which accounts for the largest amount of computation in neural network operations. For example, the processing core 300 may be composed of a plurality of processing elements. For example, the processing core 300 may be designed with an M×N (where M and N are integers) processing element array structure or an adder tree structure, but is not limited thereto. The processing core 300 may be configured to process matrix multiplication operations of input data and corresponding parameters (e.g., weights, kernels, query (Q), key (K), value (V), etc.) in a parallel processing manner based on a plurality of processing elements PEs (not shown).

The processing elements (not shown) may each include a Multiply-And-Accumulate (MAC) operator. Therefore, the processing core 300 can efficiently process matrix multiplication or convolution operations. To elaborate, the processing core 300 may be a circuit designed to simultaneously process M×N size tensor data. Here, the number of processing cores 300 may be at least one or more. The processing core 300 can exchange data with the plurality of arithmetic circuits of the special function unit 600, the internal memory 500, and the main memory (not shown). The processing core 300 may be configured to receive integer parameters and output integer parameters. The input integer parameters may include input parameters and weights. The input parameter may be configured to have a first bit width, and the weight parameter may be configured to have a second bit width. The output integer parameter may be configured to have a third bit width, and the third bit width may be configured to be larger than the first bit width or the second bit width.

As the number of processing elements (not shown) included in the processing core 300 increases, the number of transistors in an application specific integrated circuit (ASIC) may increase, and manufacturing costs may rise. If the circuit of the processing core 300 is designed to process integer parameters rather than floating-point numbers, the number of transistors in the ASIC can be significantly reduced, and the power consumption of the neural processing unit 100 can be substantially lowered.

The bit width of the integer parameters that the processing core 300 can handle may be determined based on the hardware design of the processing elements (not shown). This will be described later with reference to FIG. 4. The number of processing elements (not shown) may range from several hundred to tens of thousands. To elaborate, the number of transistors included in a processing element designed to process floating-point parameters is about four times greater than the number of transistors in a processing element designed to process integer parameters. Therefore, if the circuit of the processing core 300 of the neural processing unit 100 according to examples of the present disclosure is designed to exclude floating-point parameter operations and operate only on integer parameters, the number of transistors can be reduced by about 75% compared to a floating-point operation circuit. In such an embodiment, the number of processing elements (not shown) included in the processing core 300 can be easily increased within the same chip area compared to a floating-point design, which has the effect of reducing the semiconductor chip size while improving operational processing performance with low power.

The special function unit 600 may refer to a collection of various circuit units configured to process various neural network operations not handled by the processing core 300. In other words, it is a circuit that can accelerate special operations that are difficult to perform in an ALU. The special function unit 600 can perform operations such as exponential operations, logarithmic functions (log, ln), square roots (sqrt), reciprocal and inverse square roots (reciprocal, 1/sqrt(x)), trigonometric functions (Sin, Cos, Tan, ArcSin, ArcCos, etc.), and quantization (INTS/FP16 conversion, etc.). For example, the special function unit 600 can efficiently perform Softmax function operations, RMS Norm, and quantization and dequantization operations that are closely related to the attention operations performed in large language models (LLMs). For example, the special function unit 600 can perform an RMS normalization operation, which adjusts the scale of vector-formatted data based on the root mean square (RMS) value, using a plurality of arithmetic circuits.

The special function unit 600 includes a plurality of arithmetic circuits, and according to an embodiment, the plurality of arithmetic circuits may include a vector-dedicated arithmetic circuit that exclusively performs vector operations and a mixed-operation circuit that performs both vector and scalar operations. However, the special function unit 600 is not limited to this embodiment, and each of the plurality of arithmetic circuits may be configured to exclusively perform vector operations or scalar operations.

The vector-dedicated arithmetic circuit of the special function unit 600 may refer to a set of circuits that process at least some of the operations of the artificial intelligence model, excluding the matrix multiplication processed in the processing core 300. The vector-dedicated arithmetic circuit may be designed to include a plurality of specialized vector arithmetic circuits. For example, the vector-dedicated arithmetic circuit may include a format conversion unit (INT2FP) 600-1 for converting integer data to floating-point data, a masking unit (MASK) 600-2 for selectively passing only specific elements of an input vector, a transformation unit (HADAMARD) 600-4 for performing a Hadamard transform, and an operation result post-processing unit (FP2INT) 600-10. The operation of each module of the vector-dedicated arithmetic circuit will be described later with reference to FIG. 5. Furthermore, the vector-dedicated arithmetic circuit may be referred to as a vector core.

The mixed-operation circuit of the special function unit 600 may refer to a set of circuits that process at least some of the remaining operations of the artificial intelligence model, excluding the operations processed in the vector-dedicated arithmetic circuit. The mixed-operation circuit may be designed to include a plurality of specialized vector and scalar arithmetic circuits. For example, the mixed-operation circuit may include a multiplication operation unit (FPMUL) 600-3, a comparison operation unit (FPCMP) 600-6, a multiply-accumulate operation unit (FPMMAC) 600-7, a non-linear function processing unit (TPAF) 600-8, and a multiply-add operation unit (FPMMADD) 600-9. The operation of each module of the mixed-operation circuit will be described later with reference to FIG. 5.

Referring to FIG. 3, the direct memory access unit 400 may be configured to access at least one memory electrically connected to the neural processing unit 100 to perform data read/write operations. The at least one memory may include at least one of a main memory (not shown), a shared memory (not shown), a storage device (not shown), etc. The neural processing unit 100 can transmit various data related to artificial intelligence operations to the at least one memory (not shown) or read data from the at least one memory (not shown) through the direct memory access unit 400. The direct memory access unit 400 may be configured to perform operations such as setting the address of the internal memory 500, generating read/write commands, and control. The direct memory access unit 400 may be configured to be connected to at least one communication bus to control the at least one memory.

The internal memory 500 is a memory located in the on-chip area of the neural processing unit 100. The internal memory 500 may include a memory for caching or storing data processed in the on-chip area and/or a register file for storing instructions to drive a compiled neural network model. The register file may also be configured to be included in the controller 200. For example, when a memory (not shown) connected to a bus is provided, the internal memory 500 can read and store data required for operations from the memory. The internal memory 500 may include SRAM, a Register file, DRAM, Resistive RAM, Magneto-resistive RAM, Phase-change RAM, Ferroelectric RAI, or Flash Memory, etc. The internal memory 500 may be composed of at least one memory unit. The internal memory 500 may be composed of a single (homogeneous) memory unit or heterogeneous memory units. The capacity of the internal memory 500 may be from several megabytes to tens of megabytes, but is not limited thereto.

Furthermore, the input and output of the processing core 300 may be in integer format. The input and output for the plurality of arithmetic circuits included in the special function unit may be in floating-point format.

According to examples of the present disclosure, the floating-point format is not limited to the IEEE 754 standard, and formats such as brain floating-point, dynamic floating-point, variable precision floating-point (VPFP), custom floating-point (CFP), or flexible floating-point (FFP) may be applied to improve the operational efficiency, reduce memory usage, and lower power consumption of the neural processing unit 100. VPFP is a floating-point format that allows the bit widths of the exponent and mantissa to be dynamically set or adjusted. Using VPFP allows for flexible precision levels based on specific calculations, thereby optimizing power and performance. A dynamic floating-point format, used interchangeably with variable precision, allows the mantissa and exponent sizes to be adjusted on the fly during runtime, enabling real-time responses to data characteristics. CFP refers to an application-specific format where the bit allocation for the mantissa and exponent is tailored to the needs of a particular use case. This can be useful in implementations of the neural processing unit 100 for selecting the exact bit width to optimize hardware resources and data accuracy. FFP refers to a floating-point format that allows for adjustable bit allocation between the exponent and mantissa. FFP can be implemented in the neural processing unit 100 to provide an optimal balance between range and precision. According to examples of the present disclosure, the bit width of the floating-point numbers may be between 4 bits and 32 bits. According to examples of the present disclosure, the bit width of the integers may be between 4 bits and 32 bits.

The neural processing unit 100 disclosed in the present disclosure may provide at least one of power gating, clock gating, and register retention functions to enable the neural processing unit 100 to operate at low power.

The power gating function is a technique that completely cuts off the power to unused circuit blocks to eliminate leakage power. A power switch is provided to the circuit block to which power gating is applied. Accordingly, the power switch can be used to disconnect a specific circuit block of the neural processing unit 100 from the power source. The power gating function can eliminate both dynamic power and leakage power, allowing the device to operate in a low-power mode.

The clock gating function is a technique that reduces dynamic power consumption by blocking the clock signal to unused circuit blocks. For circuit blocks where clock gating is applied, clock control logic can be used to selectively block the clock signal input to a specific circuit block. When clock gating is applied, power is still supplied to the neural processing unit (NPU), so the state of the circuit can be maintained. Since power is not turned off with clock gating, operation can resume immediately upon reactivating the clock, and dynamic power can be saved by preventing unnecessary switching activity.

The register retention function is a technique designed to allow specific registers of the neural processing unit 100 to maintain their state even when power is turned off. Registers to which register retention is applied can maintain the data stored in them using only low power in sleep mode. Therefore, even if a register transitions to a power-saving mode, it maintains important register values, eliminating the need for initialization upon return. Register retention can provide low-power operation and can maintain data using extremely low power even when the power to the neural processing unit 100 is off.

Figure 4:
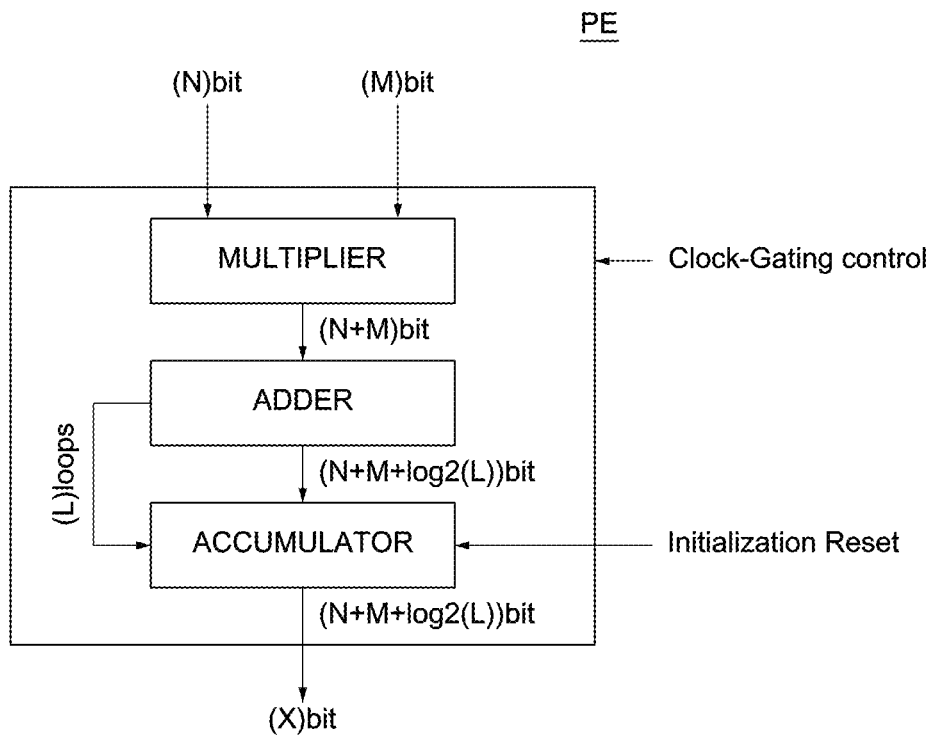
FIG. 4 is a block diagram illustrating a processing element according to examples of the present disclosure.

FIG. 4 is a block diagram illustrating a processing element according to examples of the present disclosure.

Referring to FIG. 4, the processing element PE may be configured to include a multiplier MULTIPLIER, an adder ADDER, and an accumulator ACCUMULATOR. The processing element PE of FIG. 4 may be one of the plurality of processing elements PEs included in the processing element core (P_CORE) 300 of FIG. 3.

The multiplier multiplies the received (N) bit data and (M)bit data. The operation result of the multiplier is output as (N+M) bit data. Here, N and M are integers greater than 0. A first input unit may be configured to receive (N) bit data. A second input unit may be configured to receive (M) bit data. For example, the first input unit may be configured to receive an input parameter, and the second input unit may be configured to receive a weight value.

The bit width of the parameters input to the first input unit and the second input unit of the processing element PE can be determined when the execution code is obtained by compiling the current neural network model processed by the neural processing unit (NPU) 100. That is, the bit width of the input parameters and the bit width of the weight values of the neural network model can be determined during the compilation stage by the compiler. For example, the input parameters and the weight values may be quantized to have the same bit width. Here, the bit width may be 32 bits, 16 bits, 8 bits, 4 bits, etc., but the present disclosure is not limited to this. For example, the bit width of the input parameters and the bit width of the weight values may be determined to be different from each other, and the parameters may be quantized based on their respective bit widths. For example, the bit width of the input parameters and the bit width of the weight values may be quantized to 16 bits and 8 bits, respectively. For example, the bit width of the input parameters and the bit width of the weight values may be quantized to 8 bits and 4 bits, respectively. That is, the bit width of the parameters input to each input unit of the processing element PE may be different from each other. The quantization information of the data input to each input unit of the processing element PE may be included in the execution code.

The accumulator accumulates the operation result of the multiplier and the operation result of the accumulator using the adder for (L) loops times. Therefore, the bit width of the data at the output unit and input unit of the accumulator can be output as (N+M+log 2(L)) bit. Here, L is an integer greater than 0. When accumulation is finished, an INITIAL-IZATION RESET signal can be input to initialize the data stored in the accumulator to 0. The accumulator of the processing element PE is configured to maintain the accumulated value when zero skipping is activated. The output data (X) bit can be set to a bit width that does not cause an overflow of the output data (X) bit based on the maximum value that can be accumulated in the accumulator. For example, (X) bit may be 16 bits to 64 bits.

To elaborate, the special function unit (SFU) 600 can convert the integer parameters output from the processing element core (P_CORE) 300 to floating-point numbers and transmit them to the internal memory (I_MEM) 500. The special function unit (SFU) 600 can be controlled under the control signal of the control unit (CTL) 200.

The control unit (CTL) 200 can restrict the operation of the multiplier (e.g., zero-skipping operation) so that it does not perform an operation when 0 is input to one of the first input unit and the second input unit of the multiplier, based on the fact that the operation result will be 0 even without performing the operation. For example, when 0 is input to one of the first input unit and the second input unit of the multiplier of the processing element PE, the multiplier can operate in a zero-skipping manner. For zero skipping, each processing element PE included in the processing element core (P_CORE) 300 can be individually activated or deactivated. The control unit (CTL) 200 can provide an activation or deactivation signal CLOCK-GATING CONTROL to each processing element PE on a clock-by-clock basis. When the processing element PE is deactivated, the multiplier is deactivated. This can reduce the power consumed by the operation of the multiplier. An example of the power consumption of the multiplier can be shown in FIG. 6.

The processing element PE can be designed to receive a control signal CLOCK-GATING CONTROL for zero-skipping operation control (i.e., activation or deactivation) from the control unit (CTL) 200. Specifically, the multiplier of the processing element PE can be designed to receive a respective control signal CLOCK-GATING CONTROL for zero-skipping operation control from the control unit (CTL) 200. Alternatively, the adder of the processing element PE can be modified to be designed to receive a control signal CLOCK-GATING CONTROL for zero-skipping operation control from the control unit (CTL) 200. Alternatively, each of the multiplier and adder of the processing element PE can be modified to be designed to simultaneously receive a respective control signal CLOCK-GATING CONTROL for zero-skipping operation control from the control unit (CTL) 200.

Figure 5:
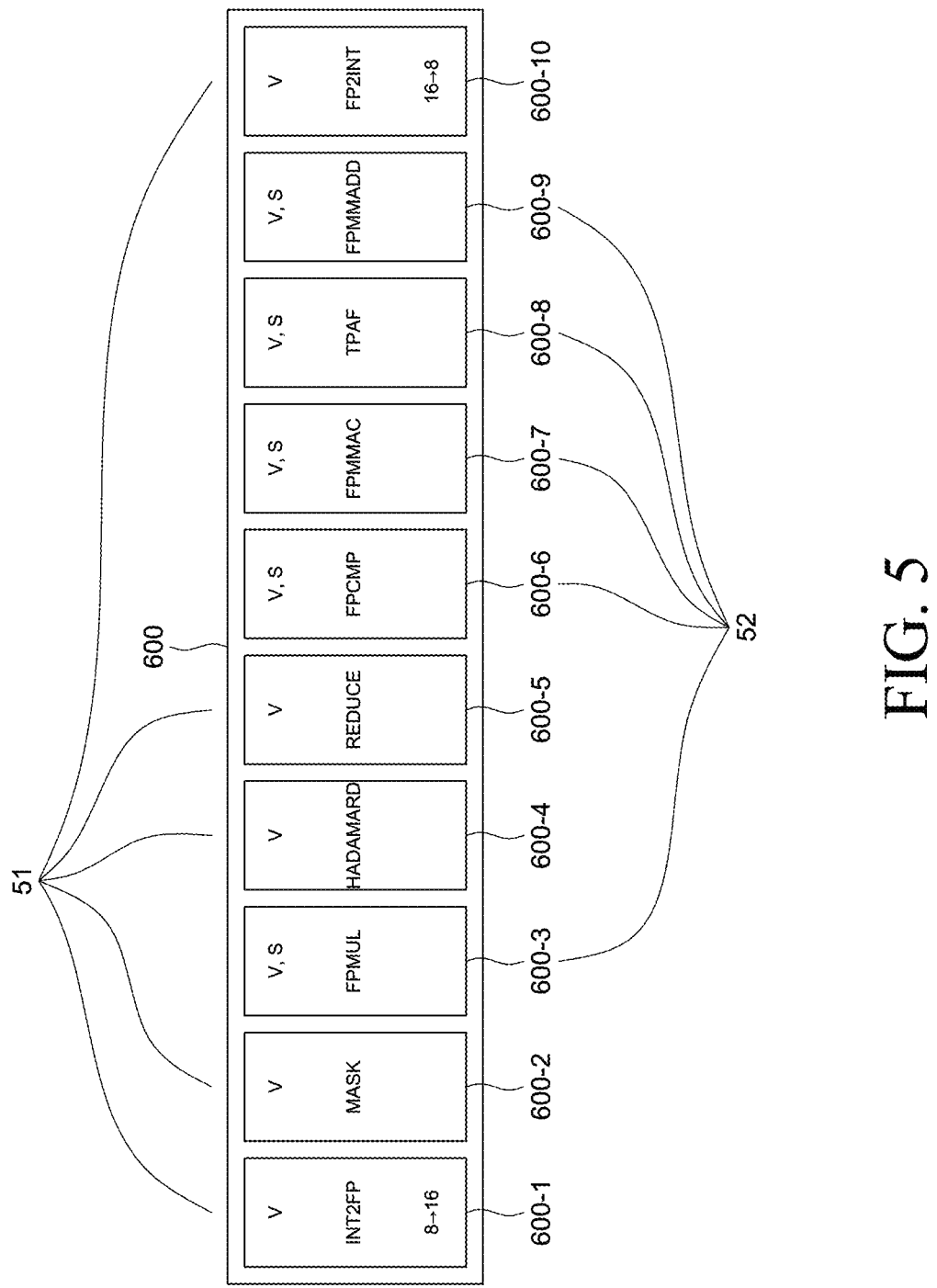
FIG. 5 is a block diagram for illustrating operational circuits constituting a special function unit that can be applied to examples of the present disclosure.

FIG. 5 is a block diagram illustrating arithmetic circuits constituting a special function unit that can be applied to examples of the present disclosure.

To perform a specific type of completed operation, at least one of the plurality of arithmetic circuits included in the special function unit 600 may be used. According to an embodiment, the specific type of completed operation may include Softmax, quantization, dequantization, normalization (e.g., RMS Normalization), Rotary Position Embedding, floating-point matrix multiplication, etc., but is not limited thereto. Each of the arithmetic circuits may perform a partial operation for a set of operations for the specific type of completed operation. The partial operation may include Mask, floating-point multiplication, Hadamard transform, Min, Max, Sum, floating-point addition, Round, Clip, data converting (Int to Float/Float to Int), etc., but is not limited thereto.

For example, the RMS normalization operation may consist of an operation of squaring each element of the input data, an operation of calculating the sum and average of the squared values, an operation of adding a correction constant to the average value, an inverse square root (rsqrt) operation, and an operation of multiplying the input data by the calculated normalization coefficient, and a plurality of arithmetic circuits may be used to perform these partial operations. That is, the RMS normalization operation can be performed by a combination of a plurality of arithmetic circuits. Hereinafter, the operation performed in each of the arithmetic circuits may mean a partial operation for a specific type of completed operation.

As described above, the special function unit 600 may be configured in a form including a plurality of vector-dedicated arithmetic circuits 51 and a plurality of mixed-operation circuits 52.

The vector-dedicated arithmetic circuit 51 may refer to a set of circuits configured to perform at least some of the other vector operations not processed by the processing core 300. In the present disclosure, the vector-dedicated arithmetic circuit 51 can only perform vector operations.

The vector-dedicated arithmetic circuit 51 differs from the processing core 300 in that it is composed of floating-point arithmetic circuits. That is, the vector-dedicated arithmetic circuit 51 can be configured to receive floating-point parameters, perform operations, and output floating-point parameters. The vector-dedicated arithmetic circuit 51 can be designed to be pipelined with the processing core 300 and the mixed-operation circuits 52 for operational efficiency with the processing core 300 and the mixed-operation circuits 52. To elaborate, the vector-dedicated arithmetic circuit 51 is configured to be able to exchange data with the processing core 300, the mixed-operation circuit 52, and a main memory (not shown). To elaborate, the vector-dedicated arithmetic circuit 51 can be specifically designed to efficiently process a part of the attention operation of a transformer-based neural network model. That is, the vector-dedicated arithmetic circuit 51 may include a plurality of specialized vector arithmetic circuit units. For example, the vector-dedicated arithmetic circuit 51 may be designed to include a format conversion unit (INT2FP) 600-1 for converting integer data to floating-point data, a masking unit (MASK) 600-2 for selectively passing only specific elements of an input vector, a transformation unit (HADAMARD) 600-4 for performing a Hadamard transform, a statistics calculation unit (REDUCE) 600-5 for calculating the minimum, maximum, and sum of an input vector, and an operation result post-processing unit (FP2INT) 600-10.

The format conversion unit (INT2FP) 600-1 is configured to include a circuit that converts an input integer tensor to a floating-point format. The masking unit (MASK) 600-2 is configured to include a circuit that selectively passes only the data in a specific region of the input vector data and overwrites unnecessary data with other data. The transformation unit (HADAMARD) 600-4 is configured to include a circuit that performs a Hadamard transform on the input data. The statistics calculation unit (REDUCE) 600-5 is configured to include a circuit that calculates the minimum and maximum values of the input vector or performs a summation operation. Furthermore, the statistics calculation unit (REDUCE) 600-5 may also be configured to, depending on the setting, first take the absolute value of each input vector and then perform the aforementioned operations.

The operation result post-processing unit (FP2INT) 600-10 converts input floating-point (Float) data to integer (Int) data and is configured to include a circuit that processes Round and Clip operations in this process.

As an embodiment, when the special function unit 600 performs an RMS normalization operation, it can sum or average the squared values of the vector-formatted input data using the vector-dedicated arithmetic circuit 51.

The vector-dedicated arithmetic circuit 51 may be a circuit designed to simultaneously process N×1 size tensor data. The vector-dedicated arithmetic circuit may be designed to receive N×1 size tensor data and output N×1 size tensor data. Here, the N of the N×1 size tensor data received by the vector-dedicated arithmetic circuit 51 may be the same as the number of rows N of the M×N size tensor data received by the processing core 300. That is, a pipeline circuit design can be implemented by matching the size of a specific dimension of the tensor data of each of the processing core 300 and the vector-dedicated arithmetic circuit. However, the vector-dedicated arithmetic circuit 51 may also be designed to process 1×N size tensor data. To elaborate, the vector-dedicated arithmetic circuit 51 may be designed such that the special function unit 600 processes the output of the M×N size PE array of the processing core 300 on a line-by-line basis.

To elaborate, the vector-dedicated arithmetic circuit 51 may include a register file for storing one-dimensional array data. Therefore, the vector-dedicated arithmetic circuit 51 can improve the operation processing efficiency by processing the tensor data output from the processing core 300 in units of a specific dimension. As described above, the vector-dedicated arithmetic circuit 51 is configured to process various function operations with floating-point operators.

Therefore, if the vector-dedicated arithmetic circuit 51 is designed to process the same tensor size as the processing core 300, the semiconductor chip size and power consumption of the neural processing unit 100 may increase. However, since the vector-dedicated arithmetic circuit 51 is designed to process data in a one-dimensional array format, it can reduce the increase in the semiconductor chip size of the neural processing unit 100, reduce power consumption, and reduce the bottleneck of neural network operations by being designed in a pipeline with the processing core 300. In some examples, the vector-dedicated arithmetic circuit 51 may be designed to receive L×1 size tensor data. Here, L may be a power-of-two value within a specific range based on the N. For example, when N is 64, L can be 8, 16, 32, 64, 128, or 256.

The mixed-operation circuit 52 may refer to a set of circuits that process at least some of the remaining operations of the neural network model, excluding the operations processed in the processing core 300 and the vector-dedicated arithmetic circuit 51. The mixed-operation circuit 52 may be an arithmetic circuit capable of performing both vector operations and scalar operations.

Furthermore, unlike the vector-dedicated arithmetic circuit 51, the mixed-operation circuit 52 may include a selector circuit that switches the mixed-operation circuit 52 to a vector operation mode or a scalar operation mode.

Therefore, when the special function unit 600 performs an operation using the mixed-operation circuit 52, it can identify whether the operation is a vector operation or a scalar operation, and based on the identification, use the selector circuit included in the mixed-operation circuit 52 to control the mixed-operation circuit 52 to perform the corresponding operation. A specific method for how the selector circuit and the mixed-operation circuit 52 perform operations will be described later.

The mixed-operation circuit 52 can be configured to receive floating-point parameters, perform operations, and output floating-point parameters. The mixed-operation circuit 52 can be designed to be pipelined with the processing core 300 and the vector-dedicated arithmetic circuit 51 for operational efficiency with the processing core 300 and the vector-dedicated arithmetic circuit 51. To elaborate, the mixed-operation circuit 52 is configured to be able to exchange data with the processing core 300, the vector-dedicated arithmetic circuit 51, the internal memory 500, and a main memory (not shown). To elaborate, the mixed-operation circuit 52 can be specifically designed to efficiently process a part of the attention operation of a transformer-based neural network model. That is, the mixed-operation circuit 52 may include a plurality of specialized scalar and vector arithmetic circuit units.

For example, the mixed-operation circuit 52 may be designed to include a multiplication operation unit (FPMUL) 600-3, a comparison operation unit (FPCMP) 600-6, a multiply-accumulate operation unit (FPMMAC) 600-7, a non-linear function processing unit (TPAF) 600-8, and a multiply-add operation unit (FPMMADD) 600-9.

The multiplication operation unit (FPMUL) 600-3 is configured to include a circuit that performs power operations and multiplication operations on input floating-point data. The comparison operation unit (FPCMP) 600-6 is configured to include a circuit that performs a magnitude comparison operation on two input floating-point data to determine the maximum or minimum value, and generates a control signal for subsequent processing such as a selection operation according to the comparison result. The multiply-accumulate operation unit (FPMMAC) 600-7 is configured to include a circuit that performs a Multiply-And-Accumulate (MAC) operation that multiplies floating-point data and then accumulates it. The non-linear function processing unit (TPAF) 600-8 is configured to include a circuit that approximates various non-linear functions used in neural network operations such as softmax or RELU, or performs an inverse square root (rsqrt) operation during an RMS normalization operation. Furthermore, the non-linear function processing unit (TPAF) 600-8 can obtain a normalization coefficient, which is a value used for normalization, by taking the reciprocal of the normalization coefficient during the RMS normalization operation. The multiply-add operation unit (FPMMADD) 600-9 is configured to include a circuit that processes a Multiply-And-Add (MADD) operation that multiplies two input data and then performs an addition operation. The multiply-accumulate operation unit (FPMMAC) 600-7 and the multiply-add operation unit (FPMMADD) 600-9 may include at least one multiplication operator (arithmetic circuit) and at least one addition operator (arithmetic circuit). For example, each of the multiply-accumulate operation unit (FPMMAC) 600-7 and the multiply-add operation unit (FPMMADD) 600-9 may include two multiplication operators and one addition operator.

As an embodiment, when the special function unit 600 performs an RMS normalization operation, it can calculate a normalization coefficient based on the vector in which each element of the input data is squared, or normalize the input data based on the calculated normalization coefficient, using the mixed-operation circuit 52.

The mixed-operation circuit 52 may be a circuit designed to simultaneously process 1×N or N×1 size tensor data.

In scalar operation mode, the mixed-operation circuit 52 may be designed to receive N×1 or 1×1 size tensor data and output 1×1 size tensor data. Accordingly, the mixed-operation circuit 52 can receive N×1 or 1×1 size tensor data and output 1×1 size scalar data. Here, the N×1 size of the tensor data received by the mixed-operation circuit 52 may be the same as the Nx1 size received by the vector-dedicated arithmetic circuit 51. That is, a pipeline circuit design can be implemented by matching the size of a specific dimension of the tensor data of each of the vector-dedicated arithmetic circuit 51 and the mixed-operation circuit 52. The mixed-operation circuit 52 may also operate in a vector operation mode, which is the same as described above for the vector-dedicated arithmetic circuit 51.

The mixed-operation circuit 52 may include a register file for storing one-dimensional array data. Therefore, the mixed-operation circuit 52 can improve the operation processing efficiency by processing the tensor data output from the vector-dedicated arithmetic circuit 51 in units of a specific dimension. As described above, the mixed-operation circuit 52 is configured to process various function operations with floating-point operators. Therefore, if the mixed-operation circuit 52 is designed to process the same tensor size as the processing core 300, the semiconductor chip size and power consumption of the neural processing unit 100 may increase. However, since the mixed-operation circuit 52 is designed to process data in a vector or scalar format as needed, it can reduce the increase in the semiconductor chip size of the neural processing unit 100, reduce power consumption, and reduce the bottleneck of neural network operations by being designed in a pipeline with the vector-dedicated arithmetic circuit 51. In some examples, the mixed-operation circuit may be designed to receive L×1 size tensor data. Here, L may be a power-of-two value within a specific range based on the N. For example, when N is 64, L can be 8, 16, 32, 64, 128, or 256.

The mixed-operation circuit 52 is, as described above, a 'vector-scalar integrated operation unit' and may be an arithmetic circuit with increased integration by sharing functionally overlapping circuits. This integrated architecture goes beyond simply placing the two units physically adjacent to each other; it maximizes the efficiency of hardware resources by sharing arithmetic circuits with similar functions.

Referring to FIG. 5, the first arithmetic unit 51 is designed to perform parallel operations on each element of a vector composed of a plurality of data elements (e.g., N). This can be conceptually understood as a structure in which N independent scalar operation lanes are arranged in parallel. On the other hand, the second arithmetic unit 52 processes single data (1×1 scalar) or vector-formatted data. Therefore, in this embodiment, based on the structural similarity, it can be configured to perform scalar operations by selectively activating only some lanes of the vector arithmetic circuit according to the control signal of the selector circuit and the controller 200. This will be described later.

According to the above configuration, the integrated vector-scalar operation unit can be implemented with a selective resource sharing architecture that shares circuits by having the existing vector operator replace scalar operators with duplicate functions, and separately maintaining only functionally specialized scalar operation units such as for Reduction. This can significantly improve the power-performance-area (PPA) ratio by reducing the total number of gates and chip area of the special function unit (SFU) 600 while providing all functions equally.

In this way, the special function unit 600 uses the first and mixed-operation circuits 51, 52 to square each element of the vector-formatted input data, perform summation and average calculation of the squared values, perform an inverse square root operation after adding a correction constant to the average value to calculate a normalization coefficient, and finally output a size-adjusted normalized vector by multiplying the input data by the calculated normalization coefficient. Considering this operational efficiency, the plurality of arithmetic circuits can be configured in a pipelined and parallel processing manner.

The special function unit 600 can be configured with a hybrid architecture that maximizes the efficiency of hardware resources and reduces chip area and power consumption. Conventional hardware accelerators adopted a method of implementing a dedicated circuit (hard-wired) for each specific function, but this has a fundamental limitation in that the number of gates increases exponentially as the number of functions to be processed increases, raising the chip area and manufacturing cost. However, the special function unit 600 according to the embodiments of the present disclosure can perform various operations without significantly increasing the chip area by being composed of two types of functionally different arithmetic circuits.

For example, the two types of arithmetic circuits may include a vector-dedicated arithmetic circuit 51, which is optimized for vector-unit processing such as format conversion (INT2FP) or masking (MASK), and a mixed-operation circuit 52, which is a 'vector-scalar integrated operation unit' capable of performing both vector and scalar operations.

This mixed-operation circuit 52 internally includes a plurality of operation lanes, and during vector operations, it can achieve high throughput by activating all lanes in parallel under the control of the selector 601. On the other hand, when a scalar operation is required, it can perform the operation by selectively activating only one of the entire lanes. This 'selective resource sharing architecture' eliminates the need for a separate scalar operator with overlapping functions, and instead replaces the scalar operation by sharing some resources of the existing vector operator, thereby eliminating hardware redundancy. Therefore, this combination of a vector-dedicated and a vector-scalar integrated block minimizes the number of unnecessary gates to directly reduce the chip area, and prevents the activation of unnecessary circuit parts during scalar operations to reduce power consumption. This goes beyond simply placing the two units physically adjacent; it improves the power-performance-area (PPA) ratio by sharing circuit resources and dynamically controlling them.

Hereinafter, the power consumption of the processing element core (P_CORE) 300 and the special function unit 600 of the neural processing unit (NPU) 100 will be described with reference to FIG. 6.

Figure 6:
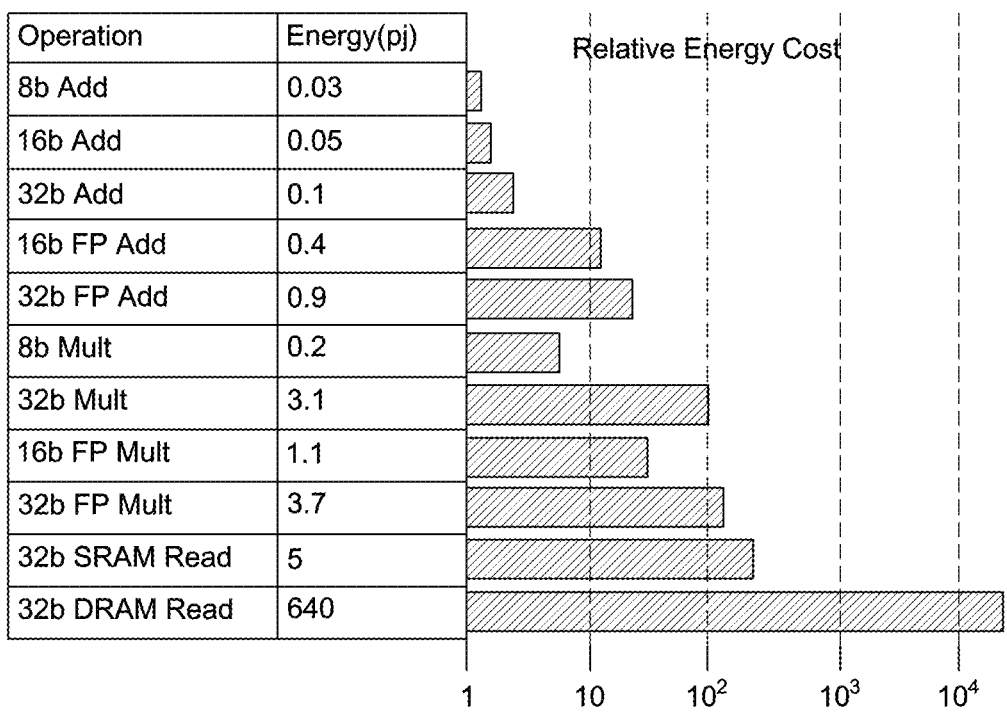
FIG. 6 is a table schematically illustrating the energy consumption per unit operation of a neural processing unit according to examples of the present disclosure.

FIG. 6 is a table schematically illustrating the energy consumption per unit operation of the neural processing unit according to examples of the present disclosure.

Before explaining with reference to FIG. 6, the energy consumption can be explained by dividing it into, for example, addition operations and multiplication operations. However, the energy consumed per unit operation may vary depending on the semiconductor chip's foundry process technology (e.g., 2 nm technology, 5 nm technology, 7 nm technology, 14 nm technology, 28 nm technology, etc.) or the technical capabilities of a specific foundry company.

The processing element core (P_CORE) 300 may be designed to operate on integer parameters of a specific bit width. "8b INT Add" in FIG. 6 refers to an 8-bit integer addition operation of the adder of the processing element PE. An 8-bit integer addition operation may consume 0.03 pJ of energy. "16b INT Add" refers to a 16-bit integer addition operation of the adder of the processing element PE. A 16-bit integer addition operation may consume 0.05 pJ of energy. "32b INT Add" refers to a 32-bit integer addition operation of the adder of the processing element PE. A 32-bit integer addition operation may consume 0.1 pJ of energy. "8b INT Mult" refers to an 8-bit integer multiplication operation of the multiplier of the processing element PE. An 8-bit integer multiplication operation may consume 0.2 pJ of energy. "32b INT Mult" refers to a 32-bit integer multiplication operation of the multiplier of the processing element PE. A 32-bit integer multiplication operation may consume 3.1 pJ of energy.

To elaborate, if the processing core (P_CORE) 300 is composed of thousands to tens of thousands of processing elements PEs designed with integer operators, the power consumption of the neural processing unit (NPU) 100 can be significantly reduced compared to the case where the processing core is composed of the same number of processing elements designed with floating-point operators. In general, for generative artificial intelligence models, most of the operations are processed in the processing element core (P_CORE) 300, so the design of an operator with a specific integer bit width is important for the low-power design of the neural processing unit (NPU) 100.

The special function unit (SFU) 600 may be designed to operate on floating-point parameters. "16b FP Add" refers to a 16-bit floating-point addition operation of the adder of the special function unit (SFU) 600. A 16-bit floating-point addition operation may consume 0.4 pJ of energy. "32b FP Add" refers to a 32-bit floating-point addition operation of the adder of the special function unit (SFU) 600. A 32-bit floating-point addition operation may consume 0.9 pJ of energy. "16b FP Mult" refers to a 16-bit floating-point multiplication operation of the multiplier of the special function unit (SFU) 600. A 16-bit floating-point multiplication operation may consume 1.1 pJ of energy. "32b FP Mult" refers to a 32-bit floating-point multiplication operation of the multiplier of the special function unit (SFU) 600. A 32-bit floating-point multiplication operation may consume 3.7 pJ of energy. To elaborate, if the special function unit (SFU) 600 is designed with floating-point operators, it is advantageous in terms of the power consumption and miniaturization of the semiconductor chip size of the neural processing unit (NPU) 100 to design the number of operators in the special function unit (SFU) 600 to be relatively smaller than the number of processing elements PEs in the processing element core (P_CORE) 300. Therefore, the number of floating-point operators in the special function unit (SFU) 600 may be designed to be smaller than the number of integer operators in the processing element core (P_CORE) 300. In other words, the special function unit 600 does not have a separate arithmetic circuit corresponding to each of various types of operations such as softmax, quantization, dequantization, normalization (e.g., RMS Normalization), but is configured to process all types of operations by executing a combination composed of one or more minimized arithmetic circuits based on an instruction set for the vector-dedicated arithmetic circuit 51 and/or the mixed-operation circuit 52. Accordingly, there may be no or minimal redundant arithmetic circuits, so that the special function unit 600 can be miniaturized.

According to an embodiment, the operational efficiency of the neural processing unit (NPU) 100 can be improved by implementing a data pipeline circuit design for the processing element core (P_CORE) 300 and the special function unit 600 such that the array size of a specific dimension of the tensor data processed by the neural processing unit (NPU) 100 is compatible with each other among the hardware components.

Figure 7:
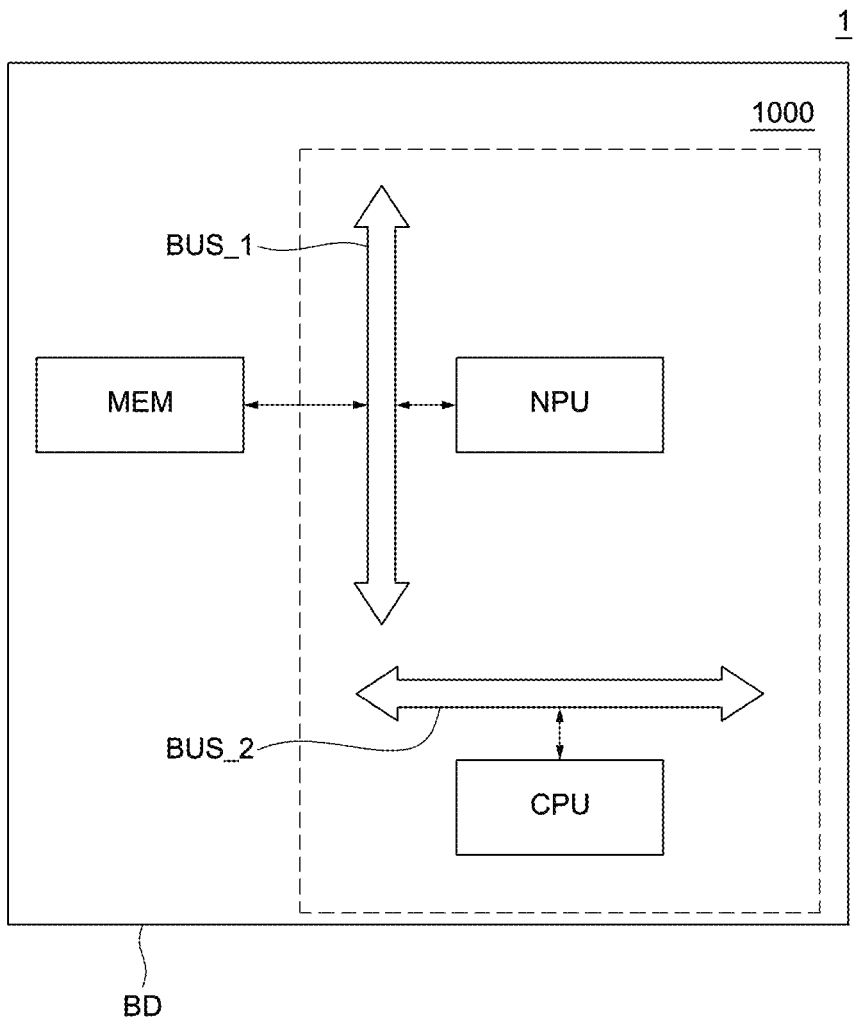
FIG. 7 is a block diagram illustrating a system-on-chip according to a first embodiment of a first example of the present disclosure.

FIG. 7 is a block diagram illustrating a system on chip according to a first embodiment of a first example of the present disclosure.

Referring to FIG. 7, a device 1 according to a first embodiment of a first example of the present disclosure will be described. The device 1 includes a circuit board BD, a memory MEM, and a system on chip 1000. The memory MEM and the system on chip 1000 may be disposed on a circuit board (not shown). The system on chip 1000 is configured to include a neural processing unit NPU, a central processing unit CPU, a first bus BUS_1, and a second bus BUS_2. The memory MEM is configured to be electrically connected to the first bus BUS_1. Each example and each embodiment of the present disclosure may be combined and modified with other examples and other embodiments of the present disclosure.

The system on chip 1000 may refer to a computing system manufactured on a single semiconductor substrate. The system on chip 1000 may be further configured to include a package (not shown) that protects the semiconductor substrate.

The neural processing unit NPU may be configured to communicate with the memory MEM. A first bus BUS_1 may be provided between the neural processing unit NPU and the memory MEM. For example, the first bus BUS_1 may be an Advanced eXtensible Interface (AXI) bus. However, the examples of the present disclosure are not limited thereto. The first bus BUS_1 may be configured to support the read and write address/control interface of the memory MEM and the neural processing unit NPU. The first bus BUS_1 may be configured with independent data communication channels to support high-speed data transfer through transaction processing in addition to memory control commands. The first bus BUS_1 may be configured as a dedicated bus for transferring input parameters, output parameters, and weight values of a neural network model, and it is desirable to appropriately design the bandwidth of the first bus BUS_1 in consideration of the parameter sizes of the neural network models to be processed.

The neural processing unit NPU may be configured to communicate with the central processing unit CPU. A second bus BUS_2 may be provided between the neural processing unit NPU and the central processing unit CPU. For example, the second bus BUS_2 may be an Advanced High-performance Bus (AHB). However, the examples of the present disclosure are not limited thereto. The second bus BUS_2 may be provided for efficient communication between the neural processing unit NPU, the central processing unit CPU, and peripheral devices of the system on chip 1000. The second bus BUS_2 may provide a master-slave architecture to improve data throughput. The second bus BUS_2 may be configured to support burst transfers and pipeline operation tasks of the system on chip 1000. The second bus BUS_2 may be configured to provide an on-the-fly function. The second bus BUS_2 may be configured such that while the central processing unit CPU or the neural processing unit NPU is reading or writing data in real time, the master of the second bus BUS_2 can execute new commands on-the-fly without waiting. Therefore, real-time data processing of the neural processing unit NPU can be optimized, and at least one core of the neural processing unit NPU can be configured to use the bus independently. Therefore, the second bus BUS_2 can support the system on chip 1000 to perform various commands in real time.

To elaborate, the first bus BUS_1 provides a higher memory bandwidth than the second bus BUS_2, and the second bus BUS_2 provides an on-the-fly function, thereby allowing the central processing unit CPU to dynamically control the neural processing unit NPU. Accordingly, the system on chip 1000 can dynamically process various input queries for a generative neural network model.

A description of the neural processing unit NPU refers to FIGS. 3 to 6. Accordingly, a redundant description of the neural processing unit NPU is omitted.

The central processing unit CPU may be configured to control the neural processing unit NPU based on the execution code of an artificial intelligence model. The execution code may be generated by a compiler (not shown). The central processing unit CPU may control the neural processing unit NPU by directly setting the register values of each circuit of the neural processing unit NPU based on the execution code. Here, the execution code may include each register value. Furthermore, the central processing unit CPU can off-load and process operations that are not processed by the neural processing unit NPU. In this case, the neural network model may be compiled to off-load specific operations of the neural network model to the central processing unit CPU to obtain the execution code.

The memory MEM may include a main memory located outside the system on chip 1000, but is not limited thereto. The memory MEM may be electrically connected to the system on chip 1000 through the first bus BUS_1. The memory MEM of the device 1 according to the first embodiment of the first example of the present disclosure may include at least one memory such as SRAM, LPDDR RAM, Resistive RAM, Magneto-resistive RAM, Phase-change RAM, Ferroelectric RAM, Flash Memory, HBM, etc. The memory MEM may be composed of at least one memory unit (e.g., a bank, etc.). The memory MEM may be composed of a single (homogeneous) memory or heterogeneous memories. It is desirable that the capacity of the memory MEM be provided to be larger than the total size of the weight values of the neural network model. In this case, all of the weight values of the neural network model can be loaded into the memory MEM at once and reside there. If the storage capacity of the memory MEM is insufficient, only a part of the weight values can be loaded, which may make it difficult to quickly process the inference operations of the neural network model in real time. For example, the capacity of the memory MEM may be one of 4 GBytes and 8 GBytes. That is, the capacity of the memory MEM may be 4 GBytes to 8 GBytes and can be determined in consideration of the parameter size of the neural network model to be driven on the system on chip 1000.

The bandwidth of the first bus BUS-_i may be determined according to the processing performance of the neural processing unit NPU (e.g., Tera Operations Per Second (TOPS) of the neural processing unit NPU). For example, a memory MEM bandwidth of 2 GB/s to 4 GB/s per 1 TOPS may be required. For example, a 10 TOPS NPU may be configured with a memory MEM that provides a bus bandwidth of 20 GB/s to 40 GB/s. The bandwidth of the first bus BUS_1 may be determined according to the operating frequency of the memory MEM and the number of communication channels. For example, to configure a 40 GB/s memory bandwidth with LPDDR5, equation 9 below can be used.

$$\text{Memory Bandwidth(GB/s)=(Data Rate(Gbps per pin)×Bus Width(bits)×Number of Channels+8).} \quad \text{Equation 9}$$

To elaborate, LPDDR5 generally supports a data rate of up to 6400 Mbps per pin. The bus width of an LPDDR channel is generally 16 bits (2 bytes). However, the number of channels cannot be a decimal point and is an integer. However, the examples of the present disclosure are not limited to the bandwidth of the first bus BUS_1.

The device 1 according to the first embodiment of the first example of the present disclosure may be configured to provide a low-power function for use on-device.

The low-power mode of the device 1 according to the first embodiment of the first example of the present disclosure may be provided with, for example, a sleep mode, a deep sleep mode, a retention mode, etc. In some examples, the low-power mode may be referred to as a standby mode, a hibernation mode, an idle mode, etc.

The sleep mode may be implemented, for example, by applying clock gating to at least one of the processing element core P_CORE and the special function unit SFU of the neural processing unit NPU.

The deep sleep mode may be implemented, for example, by applying power gating to at least one of the processing element core P_CORE, the special function unit SFU of the neural processing unit NPU, or the memory MEM.

The retention mode may be implemented by supplying a minimum retention voltage to the control unit CTL of the neural processing unit NPU or the memory MEM.

For example, the neural processing unit NPU of the device 1 according to the first embodiment of the first example of the present disclosure may be configured to provide at least one of power gating, clock gating, and register retention functions. To elaborate, when the device 1 enters a sleep mode, the neural processing unit NPU can activate the clock gating function. To elaborate, when the device 1 enters a deep sleep mode, the neural processing unit NPU can activate the power gating function. To elaborate, when the device 1 enters a retention mode, the supply voltage input to the neural processing unit NPU can be reduced or the operating frequency can be reduced.

For example, the memory MEM of the device 1 according to the first embodiment of the first example of the present disclosure may provide at least one of deep sleep, retention, and maintain parameters functions. To elaborate, when the device 1 enters a deep sleep mode, the memory MEM may be power-gated, and in the case of a volatile memory device, data may be lost. To elaborate, when the device 1 enters a retention mode, the supply voltage input to the memory MEM can be reduced or the operating frequency can be reduced, and in the case of a volatile memory device, data can be maintained. To elaborate, when the device 1 enters a parameter maintenance mode, the supply voltage input to the memory MEM can be reduced or the operating frequency can be reduced, and in the case of a DRAM, the refresh period of the memory cells is increased, so that in the case of a volatile memory device, data can be maintained.

The low-power mode may be activated when an input query for speculative decoding is not input to the device 1 for a certain period of time or more. The certain period of time may be provided based on, for example, a timer, a counter value, etc. The low-power mode may be activated based on a specific threshold time and may be deactivated when an input query processed by speculative decoding is input to the device 1. The state in which the low-power mode is deactivated may be referred to as a wake-up state.

The device 1 according to the first embodiment of the first example of the present disclosure may be a device operable in a battery environment. Therefore, the neural processing unit NPU may be designed to be operable with a battery voltage.

The device 1 according to the first embodiment of the first example of the present disclosure may be configured to provide at least one low-power mode and at the same time provide speculative decoding in an on-device environment. The device 1 may enter a low-power mode based on a preset condition, thereby reducing the power consumption of the device 1.

The system on chip 1000 according to the first embodiment of the first example of the present disclosure has the effect of being able to rapidly accelerate the inference operations of a generative neural network model at low power due to the pipeline circuit structure of the processing element core P_CORE and the special function unit SFU.

Figure 8:
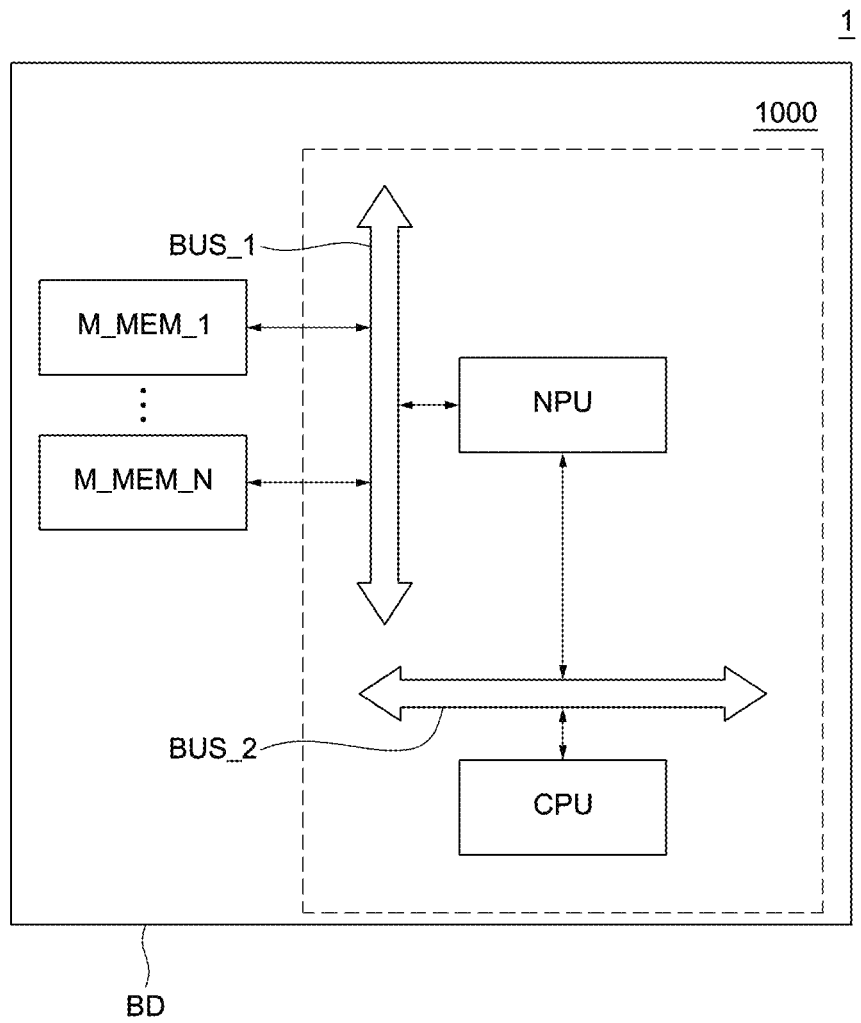
FIG. 8 is a block diagram illustrating a system-on-chip according to a second embodiment of the first example of the present disclosure.

FIG. 8 is a block diagram illustrating a system on chip according to a second embodiment of a first example of the present disclosure.

Referring to FIG. 8, a device 1 according to a second embodiment of a first example of the present disclosure will be described. The device 1 includes a circuit board BD, a plurality of main memories (M_MEM_1, ..., M_MEM_N), and a system on chip 1000. In describing the device 1 according to the second embodiment of the first example of the present disclosure, overlapping descriptions with those described with reference to FIGS. 3 to 7 may be omitted for convenience of explanation. Each example and each embodiment of the present disclosure may be combined and modified with other examples and other embodiments of the present disclosure.

The system on chip 1000 may refer to a computing system manufactured on a single semiconductor substrate. The system on chip 1000 may be further configured to include a package (not shown) that protects the semiconductor substrate.

The system on chip 1000 according to the second embodiment of the first example of the present disclosure is configured to include a neural processing unit NPU, a central processing unit CPU, a first bus BUS_1, and a second bus BUS_2. The plurality of main memories (M_MEM_1, ..., M_MEM_N) are configured to be electrically connected to the first bus BUS_1. The plurality of main memories (M_MEM_1, ..., M_MEM_N) are configured to include a plurality of semiconductor chips.

A first bus BUS_1 may be provided between the neural processing unit NPU and the plurality of main memories (M_MEM_1, ..., M_MEM_N). A second bus BUS_2 may be provided between the neural processing unit NPU and the central processing unit CPU.

Since the operation of the neural processing unit NPU has been described above with reference to FIGS. 3 to 6, a detailed description of the operation of the neural processing unit NPU is omitted. Since the operation of the central processing unit CPU has been described above with reference to FIG. 7, a detailed description of the operation of the central processing unit CPU is omitted.

The plurality of main memories (M_MEM_1, . . . , M_MEM_N) may be configured as a plurality of memories disposed outside the system on chip 1000. However, the present disclosure is not limited thereto. The plurality of main memories (M_MEM_1, . . . , M_MEM_N) may be electrically connected to the system on chip 1000 through the first bus BUS_1, respectively. Each of the plurality of main memories (M_MEM_1, . . . , M_MEM_N) of the device 1 according to the second embodiment of the first example of the present disclosure may include SRAM, LPDDR RAM, Resistive RAM, Magneto-resistive RAM, Phase-change RAM, Ferroelectric RAM, Flash Memory, or HBM, etc. The plurality of main memories (M_MEM_1, . . . , M_MEM_N) may be composed of a single (homogeneous) memory or heterogeneous memories.

It is desirable that the total capacity of the plurality of main memories (M_MEM_1, . . . , M_MEM_N) be provided to be larger than the total capacity occupied by the weight values of the artificial intelligence model. In this case, the weight values of the neural network model can be loaded onto the plurality of main memories (M_MEM_1, . . . , M_MEM_N) at once and reside there. If the storage capacity of the plurality of main memories (M_MEM_1, . . . , M_MEM_N) is insufficient, it may be difficult to quickly process the inference operations of the neural network model in real time. For example, the total capacity of the plurality of main memories (M_MEM_1, . . . , M_MEM_N) may be one of 8 GBytes, 16 GBytes, 32 GBytes, 64 GBytes, and 128 GBytes. That is, the total capacity of the plurality of main memories (M_MEM_1, . . . , M_MEM_N) may be 8 GBytes to 128 GBytes and can be determined in consideration of the parameter size of at least one artificial intelligence model to be driven on the system on chip 1000. Therefore, by locating a plurality of main memories for loading and storing the parameters of the artificial intelligence model outside the system on chip 1000, the device 1 can easily increase the capacity of the main memory while reducing the manufacturing cost of the system on chip 1000. If a plurality of main memories are disposed inside the package protecting the system on chip 1000, the size of the package may increase, which may increase the manufacturing cost, but it can satisfy the standard of a specific form factor (e.g., M.2 2230, M.2 2242).

The bandwidth of the first bus BUS_1 may be determined according to the processing performance of the neural processing unit NPU (e.g., Tera Operations Per Second (TOPS) of the neural processing unit NPU). For example, for a 30 TOPS neural processing unit NPU, the plurality of main memories (M_MEM_1, . . . , M_MEM_N) may be configured to provide a bus bandwidth of 60 GB/s to 120 GB/s. The bandwidth of the first bus BUS_1 may be determined according to the operating frequency of the plurality of main memories (M_MEM_1, . . . , M_MEM_N) and the number of communication channels. However, the examples of the present disclosure are not limited to the bandwidth of the first bus BUS_1.

The device 1 according to the second embodiment of the first example of the present disclosure provides a plurality of main memories (M_MEM_1, . . . , M_MEM_N), and the total capacity of the main memories may be a capacity capable of storing all parameters of at least one neural network model at once. Furthermore, according to the configuration of the second embodiment of the first example, the memory capacity can be expanded to correspond to the size of a generative neural network model with a considerable size of weight values. Therefore, the system on chip 1000 can quickly process the neural network model in real time. To elaborate, the plurality of main memories (M_MEM_1, . . . , M_MEM_N) of the device 1 according to the embodiments of the present disclosure are configured as dedicated memories of the system on chip SoC. If all the parameters of the artificial intelligence model processed by the neural processing unit NPU are not stored in the plurality of main memories (M_MEM_1, . . . , M_MEM_N), especially if all the weight values and attention scores cannot be stored in the plurality of main memories (M_MEM_1, . . . , M_MEM_N), the parameters must be stored in a separate storage device, which causes a decrease in operation speed due to large-scale memory operations.

Figure 9:
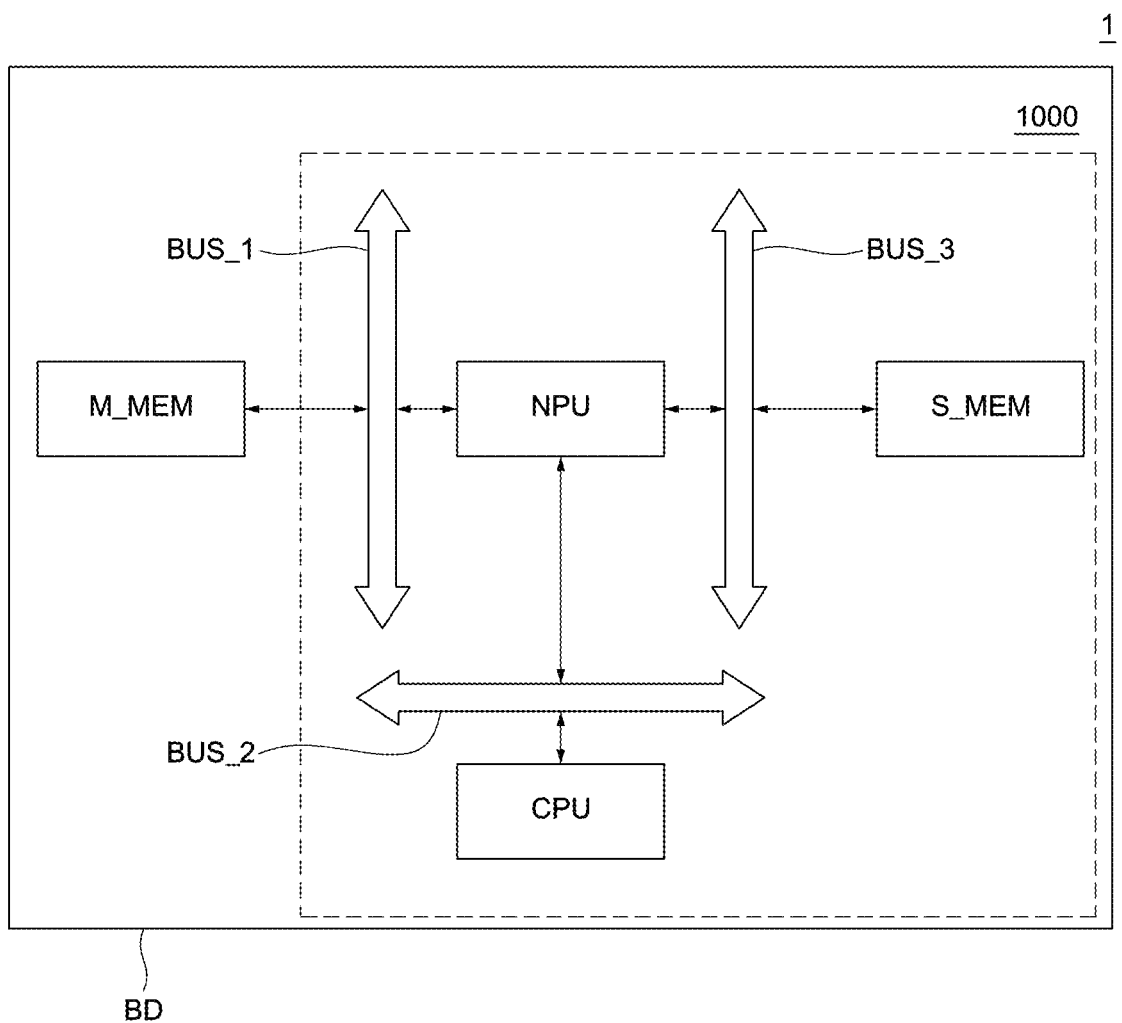
FIG. 9 is a block diagram illustrating a system-on-chip according to a third embodiment of the first example of the present disclosure.

FIG. 9 is a block diagram illustrating a system on chip according to a third embodiment of a first example of the present disclosure.

Referring to FIG. 9, a device 1 according to a third embodiment of a first example of the present disclosure will be described. The device 1 includes a circuit board BD, a main memory M_MEM, and a system on chip 1000. In describing the system on chip 1000 according to the third embodiment of the first example of the present disclosure, overlapping descriptions with those described with reference to FIGS. 3 to 8 may be omitted for convenience of explanation. Each example and each embodiment of the present disclosure may be combined and modified with other examples and other embodiments of the present disclosure.

The system on chip 1000 may refer to a computing system manufactured on a single semiconductor substrate. The system on chip 1000 may be further configured to include a package (not shown) that protects the semiconductor substrate.

The system on chip 1000 according to the third embodiment of the first example of the present disclosure is configured to include a neural processing unit NPU, a central processing unit CPU, a first bus BUS_1, a second bus BUS_2, a third bus BUS_3, and a shared memory S_MEM. The shared memory S_MEM is configured as an on-chip memory of the system on chip 1000. The main memory M_MEM is configured to be electrically connected to the first bus BUS_1. The main memory M_MEM is configured to include at least one semiconductor chip. The shared memory S_MEM is configured to be electrically connected to the third bus BUS_3.

A first bus BUS_1 may be located between the neural processing unit NPU and the main memory M_MEM. A second bus BUS_2 may be located between the neural processing unit NPU and the central processing unit CPU. A third bus BUS_3 may be located between the neural processing unit NPU and the shared memory S_MEM. For example, the third bus BUS_3 may be an Advanced eXtensible Interface (AXI) bus. However, the examples of the present disclosure are not limited thereto. The third bus BUS_3 may be configured to support the read and write address/control interface of the shared memory S_MEM and the neural processing unit NPU. The third bus BUS_3 may be configured with independent data communication channels to support high-speed data transfer through transaction processing in addition to memory control commands. The third bus BUS_3 may be configured as a dedicated bus for transferring input parameters, output parameters, and weight values of a neural network model. Here, the first bus BUS_1 and the third bus BUS_3 are configured to be electrically connected. Accordingly, the shared memory S_MEM and the main memory M_MEM can transmit tensor data through the first bus BUS_1 and the third bus BUS_3.

Since the operation of the neural processing unit NPU has been described above with reference to FIGS. 3 to 6, a detailed description is omitted. Since the operation of the central processing unit CPU has been described above with reference to FIG. 7, a detailed description is omitted.

The main memory M_MEM may be configured as at least one memory disposed outside the system on chip 1000. The main memory M_MEM may be composed of a single (homogeneous) memory or heterogeneous memories. The capacity of the main memory M_MEM may be determined in consideration of the parameter size of at least one neural network model to be driven on the system on chip 1000. The bandwidth of the first bus BUS_1 may be determined based on the processing performance of the neural processing unit NPU.

The shared memory S_MEM may be configured as at least one memory disposed inside the system on chip 1000. The shared memory S_MEM of the system on chip 1000 according to the third embodiment of the first example of the present disclosure may include at least one memory such as SRAM, LPDDR RAM, Resistive RAM, Magneto-resistive RAM, Phase-change RAM, Ferroelectric RAM, Flash Memory, IBM, etc. The shared memory S_MEM may be composed of a single (homogeneous) memory or heterogeneous memories. As a representative embodiment, the shared memory S_MEM may be implemented with SRAM. The capacity of the shared memory S_MEM is designed to be smaller than the capacity of the main memory M_MEM. If the capacity of the shared memory S_MEM increases, the semiconductor manufacturing cost may increase rapidly. Therefore, the capacity of the shared memory S_MEM may be configured from 4 MBytes to 128 MBytes. Preferably, the capacity of the shared memory S_MEM may be configured from 16 MBytes to 64 MBytes. The capacity of the shared memory S_MEM may be larger than the capacity of the internal memory I_MEM of the neural processing unit NPU.

The operation of the shared memory S_MEM and the main memory M_MEM will be described with reference to FIG. 6. "32b DRAM Read" in FIG. 6 refers to a 32-bit data read operation of the main memory M_MEM. Here, the main memory M_MEM may be an LPDDR RAM. In this case, a 32-bit data read operation of the main memory M_MEM may consume 640 pJ of energy. "32b SRAM Read" in FIG. 5 refers to a 32-bit data read operation of the shared memory S_MEM. Here, the shared memory S_MEM may be an SRAM. In this case, a 32-bit data read operation of the shared memory S_MEM may consume 5 pJ of energy. That is, when the neural processing unit NPU uses the shared memory S_MEM implemented with SRAM, the energy consumption of the device 1 can be significantly reduced compared to the case of using only the main memory M_MEM. However, since the manufacturing cost of the shared memory S_MEM is high, it is difficult to implement it with a large capacity. Therefore, when a compiler (not shown) generates the execution code for the neural network model to be processed by the system on chip 1000, it can set reusable input parameters, output parameters, and weight values to be preferentially stored in the shared memory S_MEM rather than the main memory M_MEM. That is, the compiler (not shown) can provide a function of determining reusable parameters during a series of neural network model operations and storing them in the shared memory S_MEM for reuse.

The system on chip 1000 according to the third embodiment of the first example of the present disclosure can reduce the power consumption of the system on chip 1000 by providing a shared memory S_MEM and executing an execution code set to store reusable parameters in the shared memory S_MEM.

Figure 10:
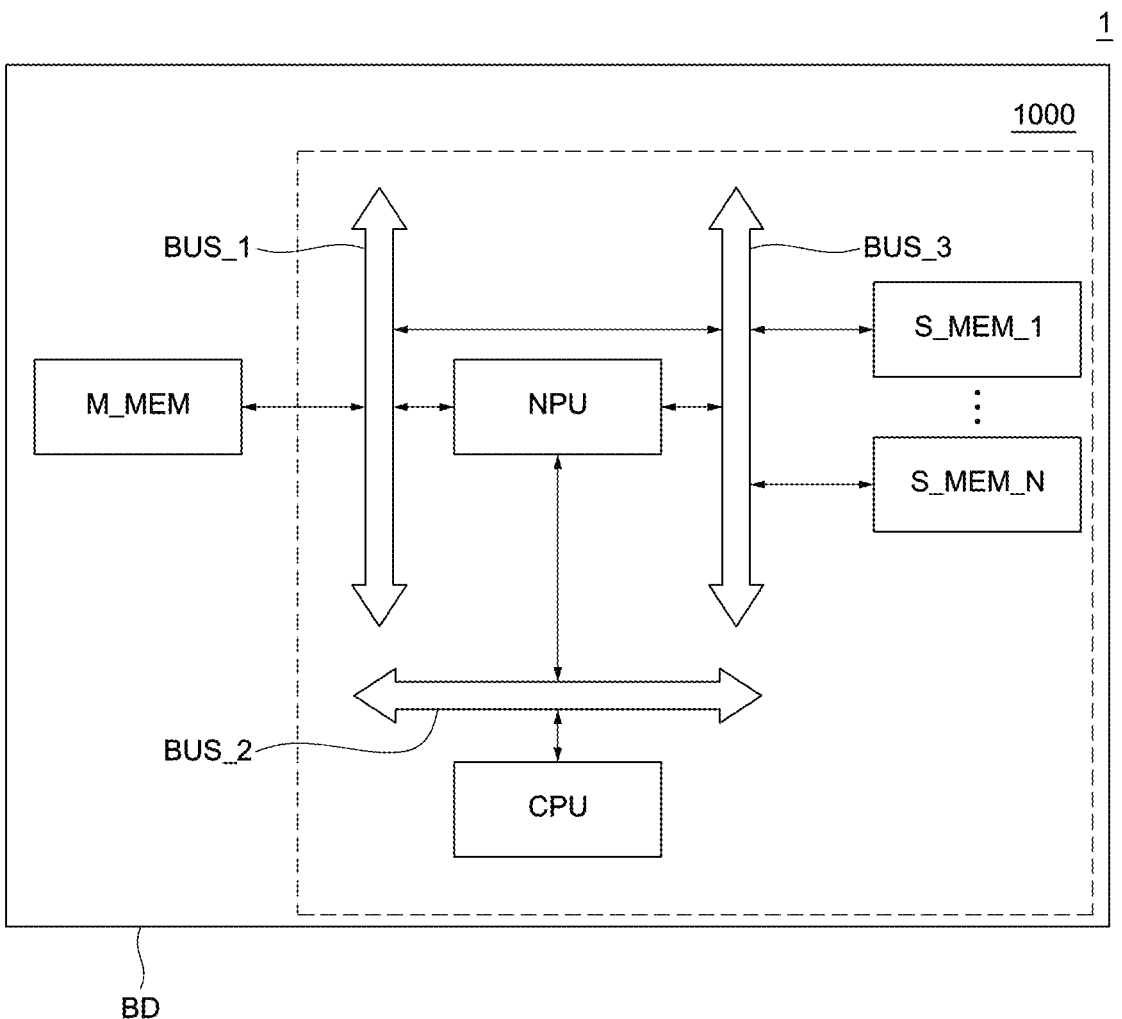
FIG. 10 is a block diagram illustrating a system-on-chip according to a fourth embodiment of the first example of the present disclosure.

FIG. 10 is a block diagram illustrating a system on chip according to a fourth embodiment of a first example of the present disclosure.

Referring to FIG. 10, a device 1 according to a fourth embodiment of a first example of the present disclosure will be described. The device 1 includes a circuit board BD, a main memory M_MEM, and a system on chip 1000. In describing the system on chip 1000 according to the fourth embodiment of the first example of the present disclosure, overlapping descriptions from FIGS. 3 to 9 may be omitted for convenience of explanation. Each example and each embodiment of the present disclosure may be combined and modified with other examples and other embodiments of the present disclosure.

The system on chip 1000 may refer to a computing system manufactured on a single semiconductor substrate. The system on chip 1000 may be further configured to include a package (not shown) that protects the semiconductor substrate.

The system on chip 1000 according to the fourth embodiment of the first example of the present disclosure is configured to include a neural processing unit NPU, a central processing unit CPU, a first bus BUS_1, a second bus BUS_2, a third bus BUS_3, and a plurality of shared memories (S_MEM_1, . . . , S_MEM_N). The plurality of shared memories (S_MEM_1, . . . , S_MEM_N) are configured as on-chip memories of the system on chip 1000. The main memory M_MEM is configured to be electrically connected to the first bus BUS_1. The main memory M_MEM is configured to include at least one semiconductor chip. The plurality of shared memories (S_MEM_1, . . . , S_NEM_N) are configured to be electrically connected to the third bus BUS_3.

A first bus BUS_1 may be located between the neural processing unit NPU and the main memory M_MEM. A second bus BUS_2 may be located between the neural processing unit NPU and the central processing unit CPU. A third bus BUS_3 may be located between the neural processing unit NPU and the plurality of shared memories (S_MEM_1, . . . , S_MEM_N). Here, the first bus BUS_1 and the third bus BUS_3 are configured to be electrically connected.

Since the operation of the neural processing unit NPU has been described with reference to FIGS. 3 to 6, a redundant description of the operation of the neural processing unit NPU is omitted. Since the operation of the central processing unit CPU has been described with reference to FIG. 7, a redundant description of the central processing unit CPU is omitted.

The main memory M_MEM may be configured as at least one memory disposed outside the system on chip 1000. The main memory M_MEM may be composed of a single (homogeneous) memory or heterogeneous memories. The capacity of the main memory M_MEM may be determined in consideration of the parameter size of at least one neural network model to be driven on the system on chip 1000. The bandwidth of the first bus BUS_1 may be determined according to the processing performance of the neural processing unit NPU.

The plurality of shared memories (S_MEM_1, . . . , S_MEM_N) may be configured as a plurality of memories disposed inside the system on chip 1000. Each shared memory may be configured to operate independently of each other. The plurality of shared memories (S_MEM_1, . . . , S_MEM_N) of the system on chip 1000 according to the fourth embodiment of the first example of the present disclosure may include at least one memory such as SRAM, LPDDR RAM, Resistive RAM, Magneto-resistive RAM, Phase-change RAM, Ferroelectric RAM, Flash Memory, HBM, etc. The plurality of shared memories (S_ MEM_1, . . . , S_MEM_N) may be composed of a single (homogeneous) memory or heterogeneous memories. Here, an example in which the plurality of shared memories (S_MEM_1, . . . , S_MEM_N) are implemented with SRAM will be described. The capacity of the plurality of shared memories (S_MEM_1, . . . , S_MEM_N) is designed to be smaller than the capacity of the main memory M_MEM. If the capacity of the plurality of shared memories (S_MEM_1, . . . , S_MEM_N) increases, the semiconductor manufacturing cost may increase rapidly. Therefore, the total capacity of the plurality of shared memories (S_MEM_1, . . . , S_MEM_N) may be configured from 4 MBytes to 128 MBytes. Preferably, the total capacity of the plurality of shared memories (S_MEM_1, . . . , S_MEM_N) may be configured from 16 MBytes to 64 MBytes. The capacity of the plurality of shared memories (S_ MEM_1, . . . , S_MEM_N) may be configured to be larger than the capacity of the internal memory I_MEM of the neural processing unit NPU.

When the neural processing unit NPU uses the plurality of shared memories (S_MEM_1, . . . , S_MEM_N) implemented with SRAM, the energy consumption of the device 1 can be significantly reduced compared to the case of using only the main memory M_MEM. Therefore, when a compiler (not shown) generates the execution code for the neural network model to be processed by the system on chip 1000, it can set a data reuse command that preferentially stores reusable input parameters, output parameters, and weight values in the plurality of shared memories (S_ MEM_1, . . . , S_MEM_N) located inside the system on chip 1000 rather than the main memory M_MEM.

The system on chip 1000 according to the fourth embodiment of the first example of the present disclosure can reduce the power consumption of the system on chip 1000 by providing a plurality of shared memories (S_ MEM_1, . . . , S_MEM_N) and executing an execution code set to preferentially store reusable parameters in the plurality of shared memories (S_MEM_1, . . . , S_MEM_N). Furthermore, by providing a plurality of independent shared memories for their respective domains (e.g., weight domain, attention score domain, etc.), the memory operations of each domain of the neural network model's parameters (e.g., weights, input parameters, output parameters) can be easily processed.

The system on chip 1000 according to the fourth embodiment of the first example of the present disclosure can reduce the power consumption of the system on chip 1000 by providing a plurality of shared memories (S_ MEM_1, . . . , S_MEM_N) and executing an execution code set to preferentially store reusable parameters in the plurality of shared memories (S_MEM_1, . . . , S_MEM_N). Furthermore, by providing a plurality of independent shared memories, the memory operations of each domain of the neural network model's parameters (e.g., weights, input parameters, output parameters) can be easily processed.

Figure 11:
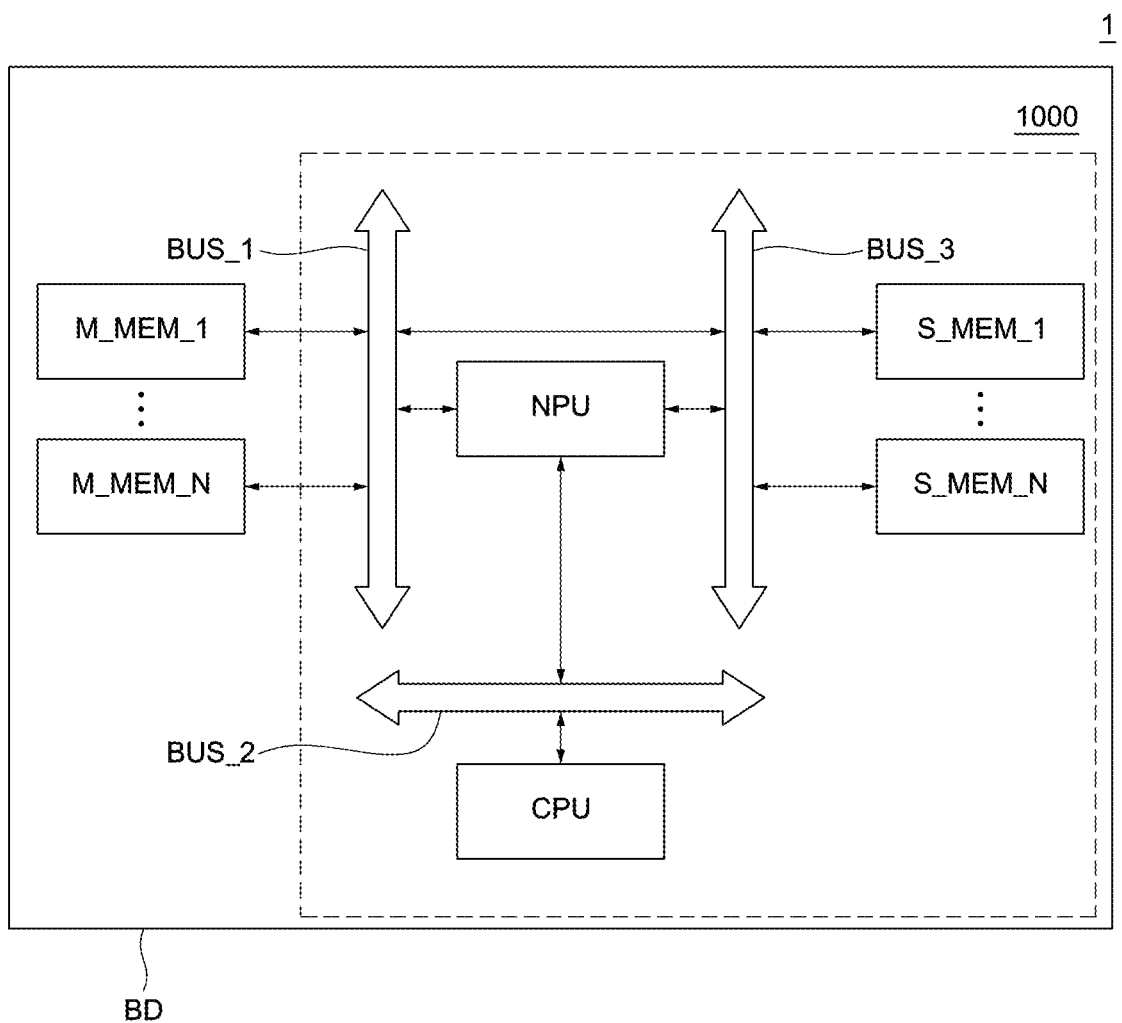
FIG. 11 is a block diagram illustrating a system-on-chip according to a fifth embodiment of the first example of the present disclosure.

FIG. 11 is a block diagram illustrating a system on chip according to a fifth embodiment of a first example of the present disclosure.

Referring to FIG. 9, a device 1 according to a fifth embodiment of a first example of the present disclosure will be described. The device 1 includes a circuit board BD, a plurality of main memories (M_MEM_1, . . . , M_MEM_N), and a system on chip 1000. In describing the system on chip 1000 according to the fifth embodiment of the first example of the present disclosure, overlapping descriptions from FIGS. 3 to 10 may be omitted for convenience of explanation. Each example and each embodiment of the present disclosure may be combined and modified with other examples and other embodiments of the present disclosure.

The system on chip 1000 may refer to a computing system manufactured on a single semiconductor substrate. The system on chip 1000 may be further configured to include a package (not shown) that protects the semiconductor substrate.

The system on chip 1000 according to the fifth embodiment of the first example of the present disclosure is configured to include a neural processing unit NPU, a central processing unit CPU, a first bus BUS_1, a second bus BUS_2, a third bus BUS_3, and a plurality of shared memories (S_MEM_1, . . . , S_MEM_N). The plurality of shared memories (S_MEM_1, . . . , S_MEM_N) are configured as on-chip memories of the system on chip 1000. The plurality of main memories (M_MEM_1, . . . , M_MEM_N) are configured to be electrically connected to the first bus BUS_1. The plurality of main memories (M_MEM_1, . . . , M_MEM_N) are configured to include at least one semiconductor chip. The plurality of shared memories (S_MEM_1, . . . , S_MEM_N) are configured to be electrically connected to the third bus BUS_3.

A first bus BUS_1 may be provided between the neural processing unit NPU and the plurality of main memories (M_MEM_1, . . . , M_MEM_N). A second bus BUS_2 may be provided between the neural processing unit NPU and the central processing unit CPU. A third bus BUS_3 may be provided between the neural processing unit NPU and the plurality of shared memories (S_MEM_1, . . . , S_MEM_N). Here, the first bus BUS_1 and the third bus BUS_3 are configured to be electrically connected.

A description of the neural processing unit NPU refers to FIGS. 3 to 6. Accordingly, a redundant description of the neural processing unit NPU is omitted. A description of the central processing unit CPU refers to FIG. 7. Accordingly, a redundant description of the central processing unit CPU is omitted. Furthermore, a redundant description regarding the plurality of main memories (M_MEM_1 . . . , M_MEM_N) refers to FIG. 8. A redundant description regarding the plurality of shared memories (S_MEM_1, . . . , S_MEM_N) refers to FIG. 10.

The plurality of main memories (M_MEM_1, . . . , M_MEM_N) may be configured as a plurality of memories disposed outside the system on chip 1000. The total capacity of the plurality of main memories (M_MEM_1, . . . , M_MEM_N) may be determined in consideration of the parameter size of at least one neural network model to be driven on the system on chip 1000. In addition, the total capacity of the plurality of main memories (M_ MEM_1, . . . , M_MEM_N) may be configured to be larger than the total capacity of the plurality of shared memories (S_MEM_1, . . . , S_MEM_N). Therefore, by providing a plurality of main memories outside the system on chip 1000, the manufacturing cost of the system on chip 1000 can be reduced.

The plurality of shared memories (S_MEM_1, . . . , S_MEM_N) may be configured as a plurality of memories disposed inside the system on chip 1000. The total capacity of the plurality of shared memories (S_MEM_1, . . . , S_MEM_N) may be configured to be larger than the capacity of the internal memory I_MEM of the neural processing unit NPU. Therefore, by arranging reusable parameters in the plurality of shared memories (S_MEM_1, . . . , S_MEM_N), the data read from or transmitted to the plurality of main memories (M_MEM_1, . . . , M_MEM_N) can be reduced, thereby reducing the power consumption of the device 1.

A compiler (not shown) may, when generating the execution code for the neural network model to be processed by the system on chip 1000, set reusable input parameters, output parameters, and weight values to be preferentially stored in the plurality of shared memories (S_MEM_1, . . . , S_MEM_N) rather than the plurality of main memories (M_MEM_1, . . . , M_MEM_N).

The device 1 according to the fifth embodiment of the first example of the present disclosure can support a generative neural network model with a large number of parameters and improve data reuse by combining the features of the second embodiment of the first example and the fourth embodiment of the first example, with scalable main memory and scalable shared memory.

Figure 12:
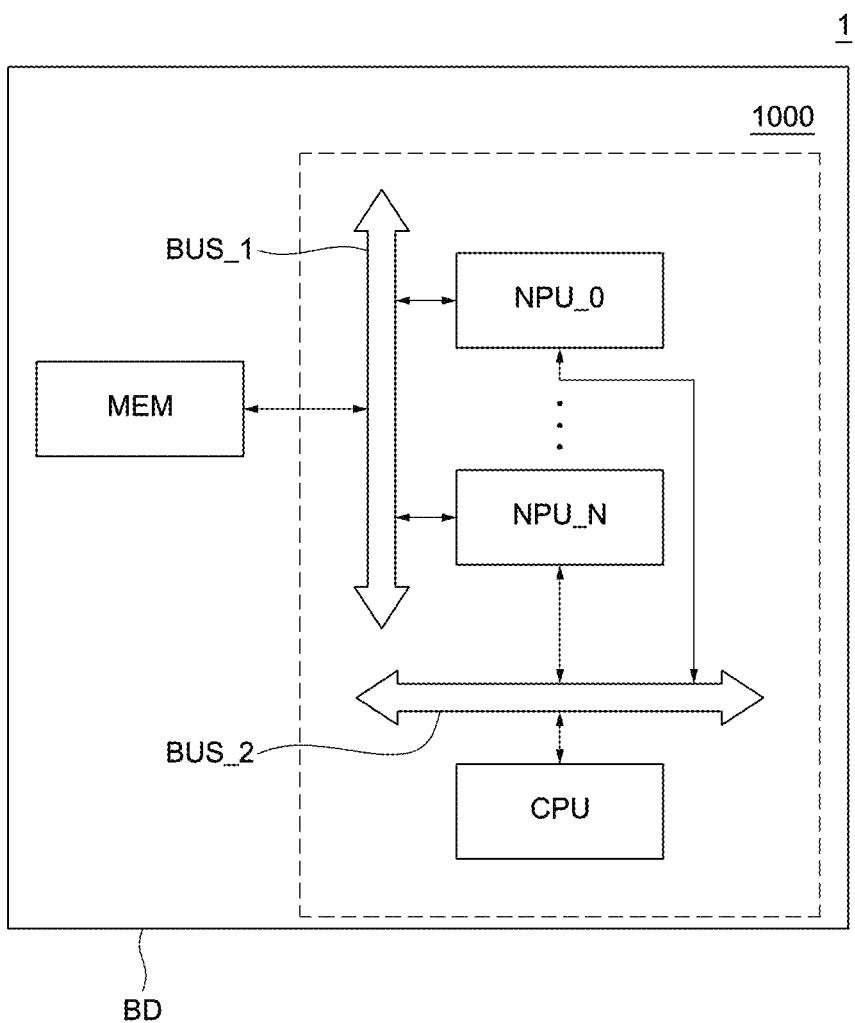
FIG. 12 is a block diagram illustrating a system-on-chip according to a sixth embodiment of the first example of the present disclosure.

FIG. 12 is a block diagram illustrating a system on chip according to a sixth embodiment of a first example of the present disclosure.

Referring to FIG. 12, a device 1 according to a sixth embodiment of a first example of the present disclosure will be described. The device 1 includes a circuit board BD, a memory MEM, and a system on chip 1000. In describing the system on chip 1000 according to the sixth embodiment of the first example of the present disclosure, overlapping descriptions from FIGS. 3 to 11 may be omitted for convenience of explanation. Each example and each embodiment of the present disclosure may be combined and modified with other examples and other embodiments of the present disclosure.

The system on chip 1000 may refer to a computing system manufactured on a single semiconductor substrate. The system on chip 1000 may be further configured to include a package (not shown) that protects the semiconductor substrate.

The system on chip 1000 according to the sixth embodiment of the first example of the present disclosure is configured to include a plurality of neural processing units (NPU_1, . . . , NPU_N), a central processing unit CPU, a first bus BUS_1, and a second bus BUS_2. The memory MEM is configured to be electrically connected to the first bus BUS_1.

Each of the plurality of neural processing units (NPU_1, . . . , NPU_N) may be configured to communicate with the memory MEM. A first bus BUS_1 may be provided between the plurality of neural processing units (NPU_1, . . . , NPU_N) and the memory MEM.

Each of the plurality of neural processing units (NPU_1, . . . , NPU_N) may be configured to communicate with the central processing unit CPU. A second bus BUS_2 may be provided between the plurality of neural processing units (NPU_1, . . . , NPU_N) and the central processing unit CPU.

A description of the plurality of neural processing units (NPU_1, . . . , NPU_N) refers to FIGS. 3 to 6. Accordingly, a redundant description of the neural processing unit NPU is omitted.

The processing performance (TOPS) of each of the plurality of neural processing units (NPU_1 . . . , NPU_N) may be the same as or different from each other. Each of the plurality of neural processing units (NPU_1, . . . , NPU_N) may be configured to operate independently. Each of the plurality of neural processing units (NPU_1, . . . , NPU_N) may be configured to process the operations of a specific neural network model in parallel.

A description of the central processing unit CPU refers to FIG. 7. Accordingly, a redundant description of the central processing unit CPU is omitted.

The central processing unit CPU may be configured to control each of the plurality of neural processing units (NPU_1, . . . , NPU_N) based on the execution code of a neural network model. Here, a compiler (not shown) may be configured to generate respective execution codes corresponding to each of the plurality of neural processing units (NPU_1, . . . , NPU_N). The central processing unit CPU may be configured to control the plurality of neural processing units (NPU_1, . . . , NPU_N) by directly setting the register values of the circuits of each of the plurality of neural processing units (NPU_1, . . . , NPU_N) based on the respective execution codes.

The memory MEM may be configured as a main memory disposed outside the system on chip 1000. The memory MEM may be composed of a single (homogeneous) memory or heterogeneous memories. The capacity of the memory MEM may be determined in consideration of the parameter size of at least one neural network model to be driven on the system on chip 1000. The bandwidth of the first bus BUS_1 may be determined according to the processing performance of the plurality of neural processing units (NPU_1, . . . , NPU_N).

The bandwidth of the first bus BUS_1 may be determined according to the processing performance (for example, Tera Operations Per Second (TOPS) of the neural processing unit NPU) of the plurality of neural processing units (NPU_1, . . . , NPU_N). For example, a memory MEM bandwidth of 2 GB/s to 4 GB/s per 1 TOPS may be required. For example, if there are two 10 TOPS NPUs, the memory MEM may be configured to provide a bus bandwidth of 40 GB/s to 80 GB/s. The bandwidth of the first bus BUS_1 may be determined according to the operating frequency of the memory MEM and the number of communication channels.

The system on chip 1000 according to the sixth embodiment of the first example of the present disclosure provides a plurality of neural processing units (NPU_1, . . . , NPU_N), thereby improving the parallel processing performance of a neural network model, which has the effect of being able to generate a response to an input query more quickly.

Figure 13:
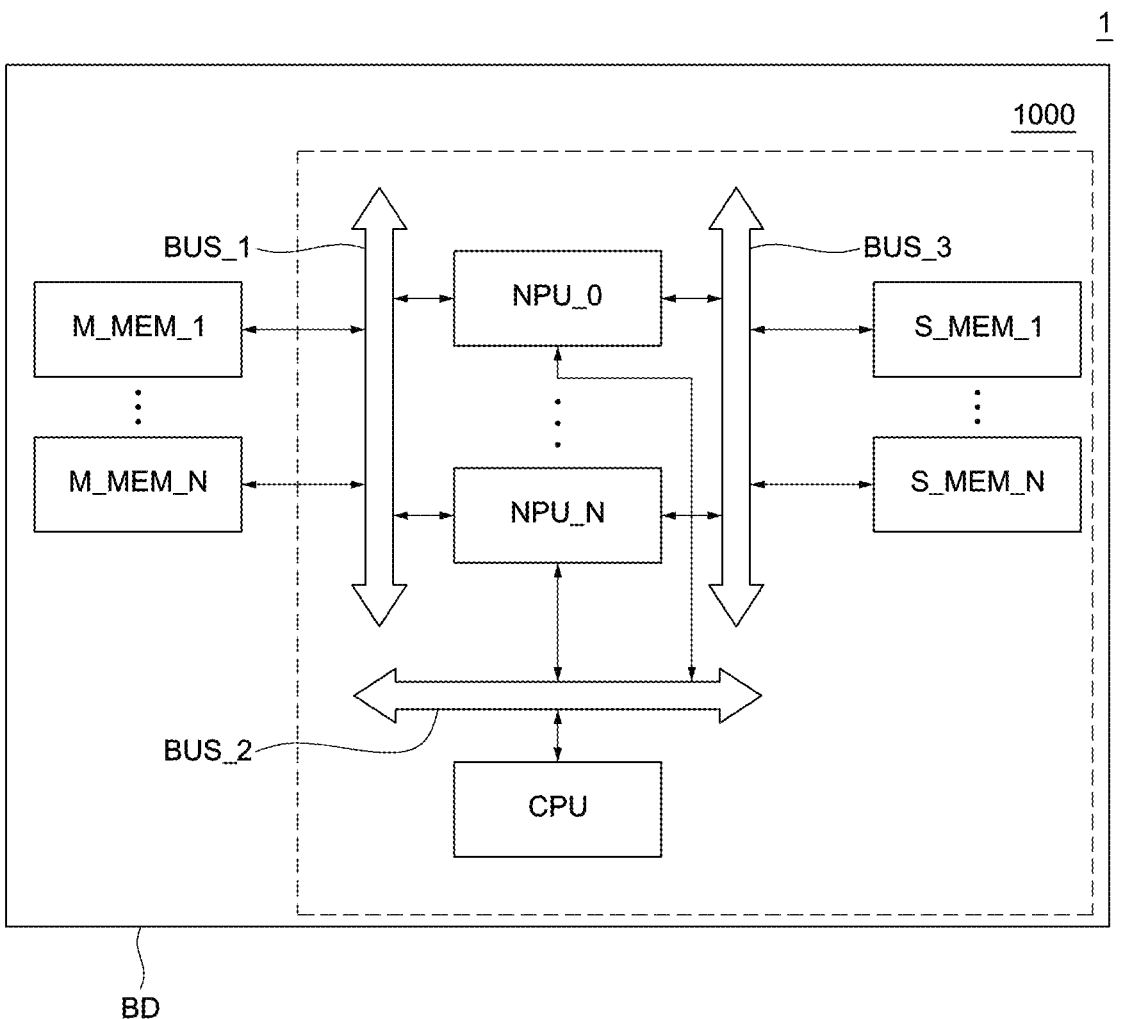
FIG. 13 is a block diagram illustrating a system-on-chip according to a seventh embodiment of the first example of the present disclosure.

FIG. 13 is a block diagram illustrating a system on chip according to a seventh embodiment of a first example of the present disclosure.

Referring to FIG. 13, a device 1 according to a seventh embodiment of a first example of the present disclosure will be described. The device 1 includes a circuit board BD, a plurality of main memories (M_MEM_1, . . . , M_MEM_N), and a system on chip 1000. In describing the system on chip 1000 according to the seventh embodiment of the first example of the present disclosure, overlapping descriptions from FIGS. 3 to 12 may be omitted for convenience of explanation. Each example and each embodiment of the present disclosure may be combined and modified with other examples and other embodiments of the present disclosure.

The system on chip 1000 may refer to a computing system manufactured on a single semiconductor substrate. The system on chip 1000 may be further configured to include a package (not shown) that protects the semiconductor substrate.

The system on chip 1000 according to the seventh embodiment of the first example of the present disclosure is configured to include a plurality of neural processing units (NPU_1, . . . , NPU_N), a central processing unit CPU, a first bus BUS_1, a second bus BUS_2, a third bus BUS_3, and a plurality of shared memories (S_MEM_1, . . . , S_MEM_N). The plurality of shared memories (S_MEM_1, . . . , S_MEM_N) are configured as on-chip memories of the system on chip 1000. The plurality of main memories (M_MEM_1, . . . , M_MEM_N) are configured to be electrically connected to the first bus BUS_1. The plurality of main memories (M_MEM_1, . . . , M_MEM_N) are configured to include at least one semiconductor chip. The plurality of shared memories (S_MEM_1, . . . , S_MEM_N) are configured to be electrically connected to the third bus BUS_3.

A first bus BUS_1 may be provided between the neural processing unit NPU and the plurality of main memories (M_MEM_1, . . . , M_MEM_N). A second bus BUS_2 may be provided between the neural processing unit NPU and the central processing unit CPU. A third bus BUS_3 may be provided between the neural processing unit NPU and the plurality of shared memories (S_MEM_1, . . . , S_MEM_N). Here, the first bus BUS_1 and the third bus BUS_3 are configured to be electrically connected.

A description of the neural processing unit NPU refers to FIGS. 3 to 6. Accordingly, a redundant description of the neural processing unit NPU is omitted. A description of the central processing unit CPU refers to FIG. 7. Accordingly, a redundant description of the central processing unit CPU is omitted. A description regarding the plurality of main memories (M_MEM_1, . . . , M_MEM_N) refers to FIG. 8. Accordingly, a redundant description of the plurality of main memories (M_MEM_1, . . . , M_MEM_N) is omitted. A description regarding the plurality of shared memories (S_MEM_1, . . . , S_MEM_N) refers to FIG. 10. Accordingly, a redundant description of the plurality of shared memories (S_MEM_1, . . . , S_MEM_N) is omitted. A description regarding the plurality of neural processing units (NPU_0, . . . , NPU_N) refers to FIG. 12. Accordingly, a redundant description of the plurality of neural processing units (NTU_0, . . . , NPU_N) is omitted.

The plurality of main memories (M_MEM_1, . . . , M_MEM_N) may be configured as a plurality of memories disposed outside the system on chip 1000. The total capacity of the plurality of main memories (M_MEM_1, . . . , M_MEM_N) may be determined in consideration of the parameter size of at least one neural network model to be driven on the system on chip 1000. The total capacity of the plurality of main memories (M_MEM_1, . . . , M_MEM_N) may be configured to be larger than the total capacity of the plurality of shared memories (S_MEM_1, . . . , S_MEM_N). Therefore, by providing a plurality of main memories outside the system on chip 1000, the manufacturing cost of the system on chip 1000 can be reduced.

The plurality of shared memories (S_MEM_1, . . . , S_MEM_N) may be configured as a plurality of memories disposed inside the system on chip 1000. The total capacity of the plurality of shared memories (S_MEM_1, . . . , S_MEM_N) may be configured to be larger than the capacity of the internal memory I_MEM of the neural processing unit NPU. Therefore, by arranging reusable parameters in the plurality of shared memories (S_MEM_1, . . . , S_MEM_N), the data read from or transmitted to the plurality of main memories (M_MEM_1, . . . , M_MEM_N) can be reduced, thereby reducing the power consumption of the device 1.

A compiler (not shown) may, when generating the execution code for the neural network model to be processed by the system on chip 1000, set reusable input parameters, output parameters, and weight values to be preferentially stored in the plurality of shared memories (S_

MEM_1, . . . , S_MEM_N) rather than the plurality of main memories (M_MEM_1, . . . , M_MEM_N).

The device 1 according to the seventh embodiment of the first example of the present disclosure provides a plurality of neural processing units, scalable main memory, and scalable shared memory by combining the features of the fifth embodiment of the first example and the sixth embodiment of the first example. Accordingly, it is possible to improve data reuse while supporting a generative neural network model with a large number of parameters through parallel processing by a plurality of neural processing units.

Figure 14:
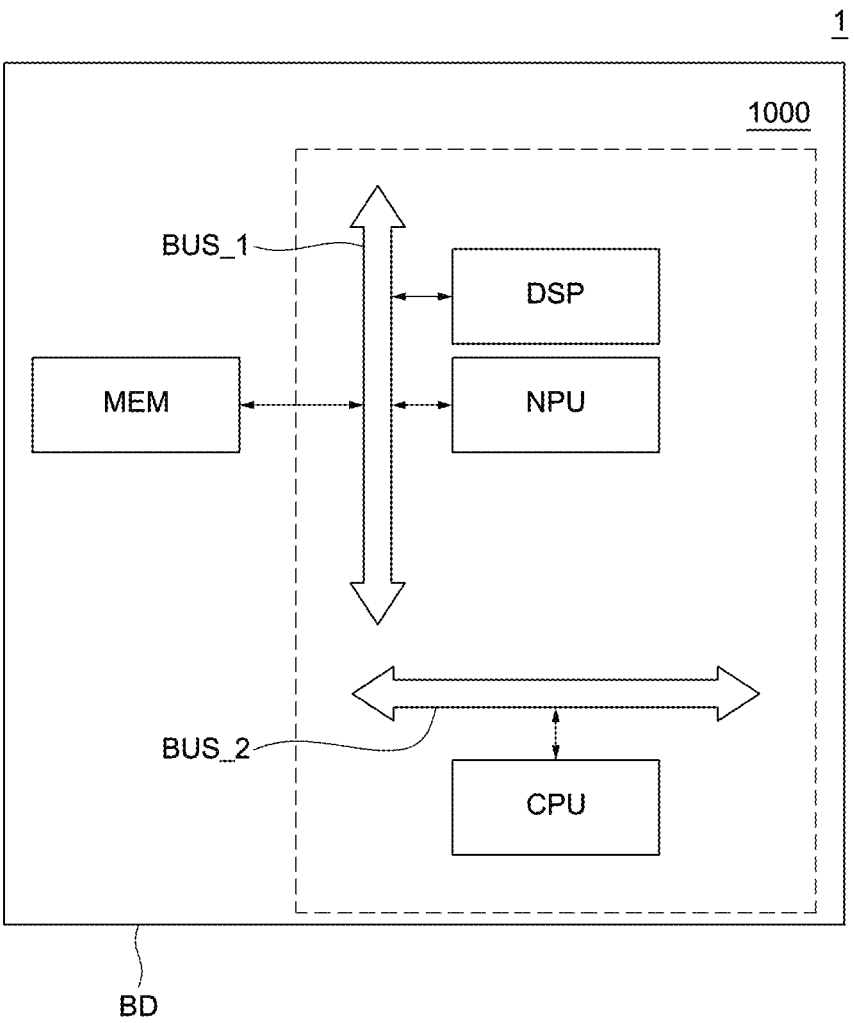
FIG. 14 is a block diagram illustrating a system-on-chip according to an eighth embodiment of the first example of the present disclosure.

FIG. 14 is a block diagram illustrating a system on chip according to an eighth embodiment of a first example of the present disclosure.

Referring to FIG. 14, a system on chip 1000 according to an eighth embodiment of a first example of the present disclosure will be described. In describing the system on chip 1000 according to the eighth embodiment of the first example of the present disclosure, overlapping descriptions from FIGS. 3 to 13 may be omitted for convenience of explanation. Each example and each embodiment of the present disclosure may be combined and modified with other examples and other embodiments of the present disclosure.

The system on chip 1000 may refer to a computing system manufactured on a single semiconductor substrate. The system on chip 1000 may be further configured to include a package (not shown) that protects the semiconductor substrate.

The system on chip 1000 according to the eighth embodiment of the first example of the present disclosure is configured to include a neural processing unit NPU, a central processing unit CPU, a first bus BUS_1, and a second bus BUS_2. Here, the system on chip 1000 according to the eighth embodiment of the first example of the present disclosure is further configured to include a digital signal processing unit DSP. The memory MEM is configured to be electrically connected to the first bus BUS_1. The memory MEM is configured to include at least one semiconductor chip.

A first bus BUS_1 may be provided between the neural processing unit NPU and the memory MEM. A first bus BUS_1 may be provided between the digital signal processing unit DSP and the memory MEM. A second bus BUS_2 may be provided between the neural processing unit NPU and the central processing unit CPU. A second bus BUS_2 may be provided between the digital signal processing unit DSP and the central processing unit CPU.

A description of the neural processing unit NPU refers to FIGS. 3 to 6. Accordingly, a redundant description of the neural processing unit NPU is omitted. A description of the central processing unit CPU refers to FIG. 7. Accordingly, a redundant description of the central processing unit (NPU) is omitted. A description of the memory MEM refers to FIGS. 7 to 11. Accordingly, a redundant description of the memory MEM is omitted.

The digital signal processing unit DSP may be configured to process at least a part of the operations of a neural network model that are inefficient to be processed by the neural processing unit NPU. The digital signal processing unit DSP includes at least one vector processor (not shown) and at least one scalar processor (not shown).

The system on chip 1000 according to the eighth embodiment of the first example of the present disclosure further provides a digital signal processing unit DSP, thereby being able to offload specific operations of a neural network model that are inefficient to be processed by the neural processing unit NPU. Therefore, the system on chip 1000 can quickly process the neural network model in real time.

Figure 15:
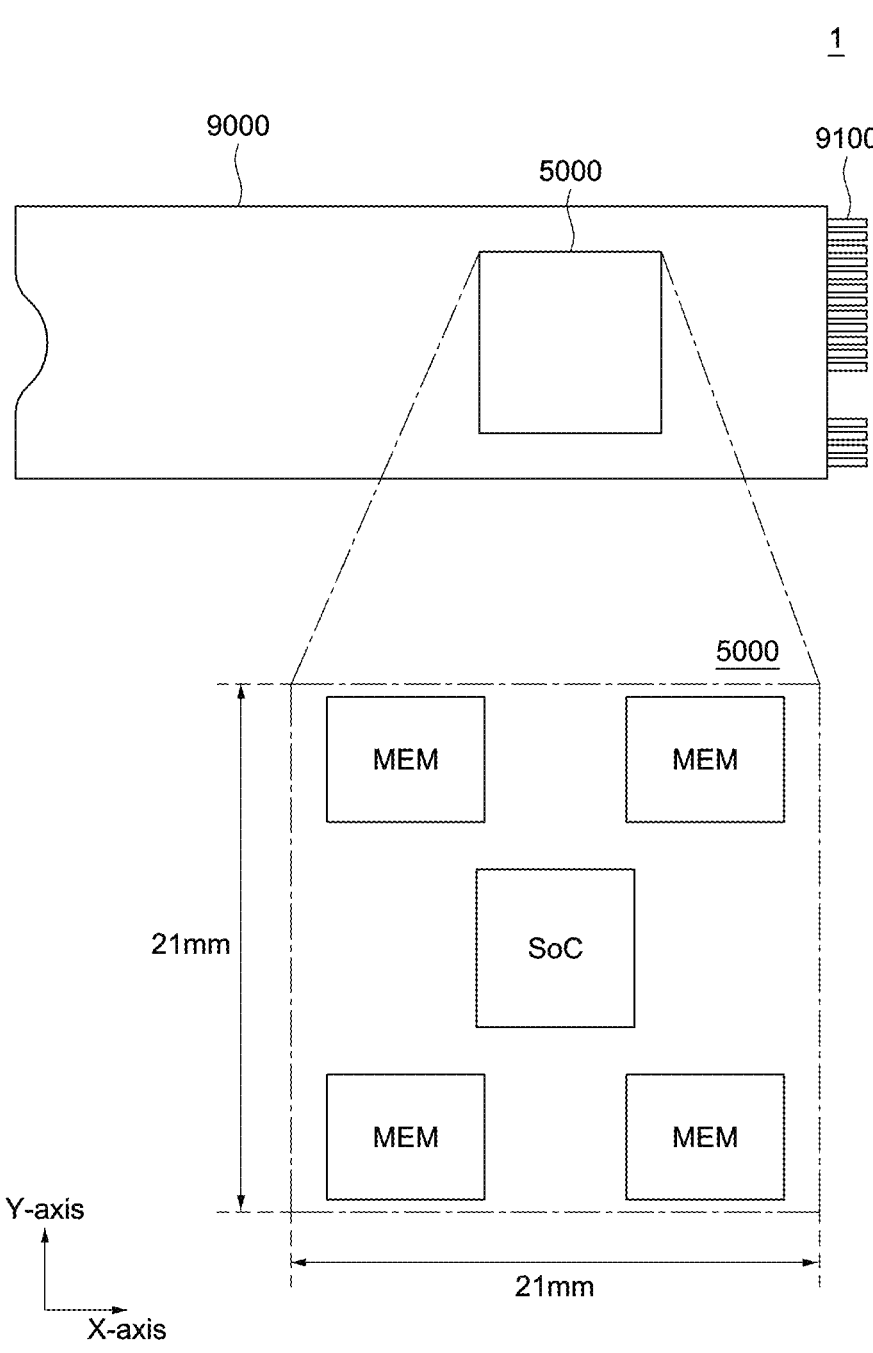
FIG. 15 is a diagram illustrating an apparatus according to a first embodiment of a second example of the present disclosure.

FIG. 15 is a conceptual diagram illustrating a device according to a first embodiment of a second example of the present disclosure.

Before describing with reference to FIG. 15, the device 1 shown in FIG. 15 may be a plan view looking down on the device 1, but is not limited thereto. The size of each of the hardware components described with reference to FIG. 15 may refer to the width (X-axis length) and depth (Y-axis length).

Referring to FIG. 15, a device 1 according to a first embodiment of a second example of the present disclosure includes a circuit board 9000 and a package 5000. The circuit board 9000 may further include a slot 9100 (for example, an M.2 slot). The device 1 according to the first embodiment of the second example of the present disclosure may correspond to the device 1 according to the embodiments of the first example of the present disclosure. The circuit board 9000 according to the first embodiment of the second example of the present disclosure may correspond to the circuit board BD according to the embodiments of the first example of the present disclosure. The package 5000 according to the first embodiment of the second example of the present disclosure may correspond to the package (not shown) in the embodiments of the first example of the present disclosure. Overlapping content described with reference to FIGS. 3 to 14 is omitted.

The device 1 according to the first embodiment of the second example of the present disclosure may be configured as a system on chip (SoC). A system on chip SoC may refer to a semiconductor package that integrates at least one neural processing unit NPU and components of various electronic systems. The system on chip SoC may integrate digital circuits, analog circuits, mixed-signal, and radio frequency processing circuits into a single package. For example, the system on chip SoC may further include at least one of a central processing unit (CPU), a digital signal processor (DSP), an image signal processor (ISP), and a graphics processing unit (GPU) in addition to the neural processing unit (NPU). The system on chip SoC may include at least one memory MEM. The system on chip SoC may include a high-speed data bus for efficient communication between the various circuits included in the system on chip SoC. The system on chip SoC may include at least one interface such as PCIe, USB, I2C, SPI, UART, GPIO for connection with external devices and sensors. The system on chip SoC may include an on-chip power management unit that regulates the voltage and power distribution of the semiconductor package. The system on chip SoC may include a communication interface that integrates wired or wireless communication protocols such as Ethernet, Wi-Fi, Bluetooth, and cellular connectivity for data transmission.

Meanwhile, the device 1 shown in FIG. 15 is an example implemented in an M.2 form factor. In the first embodiment of the second example of the present disclosure, the width of the circuit board 9000 is 22 mm and the depth may be 42 mm, 60 mm, 80 mm, or 110 mm, but is not limited thereto.

The M.2 board is a next-generation interface standard for high-speed data transmission, providing high speed and high efficiency, and is designed in a compact size, making it adopted in various devices such as laptops, desktops, and mini-PCs. In particular, a small form factor such as M.2 is easy to apply on-device.

The package 5000 mounted on the device 1 may include a system on chip SoC and at least one memory MEM. The system on chip SoC according to the first embodiment of the second example of the present disclosure may correspond to the system on chip 1000 according to the embodiments of the first example of the present disclosure. The memory MEM of FIG. 15 may correspond to the memory MEM or main memory M_MEM described above with reference to FIGS. 7 to 14.

The physical size of the system on chip SoC may be, for example, 4.50 mm×4.85 mm. However, the present disclosure is not limited thereto. Considering the minimum required separation distance between the system on chip SoC and the memories MEM, the physical size of each memory MEM may be limited to 6.43 mm×5.30 mm. However, the present disclosure is not limited to the size or dimensions of each component.

Meanwhile, the maximum number of memories MEM within the package 5000 may be determined in consideration of the processing capability (for example, TOPS) of the system on chip SoC, or the size of a package that is smaller than a specific size that satisfies the size of a specific form factor applied to the system on chip SoC.

According to an embodiment of the present disclosure, the process node of the semiconductor manufacturing process of the memory MEM may be lower than the process node of the semiconductor manufacturing process of the system on chip SoC. For example, the memory MEM may be manufactured by a 14 nm semiconductor manufacturing process, and the process of the system on chip SoC may be manufactured by a 7 nm semiconductor manufacturing process. For example, the memory MEM may be manufactured by a 5 nm semiconductor manufacturing process and the system on chip SoC may be manufactured by a 7 nm semiconductor manufacturing process. For example, the memory MEM may be manufactured by a 2 nm semiconductor manufacturing process, and the system on chip SoC may be manufactured by a 5 nm semiconductor manufacturing process. According to the above-described configuration, the size of the system on chip SoC can be reduced to be suitable for the specification of a specific form factor (for example, M.2). In particular, in the case of on-device, if the size of the system on chip SoC is large, it may become an obstacle to commercialization.

Meanwhile, the package 5000 may include a maximum of four memories MEM. Each memory MEM may be LPDDR5 (Low Power Double Data Rate 5). If the number of bus channels between the system on chip SoC and the memories MEM is increased to correspond to the number of memories MEM, the memory bandwidth of the first bus BUS_1 of the embodiments of the first example of the present disclosure can be increased. For example, if the system on chip SoC and the four memories MEM of the package 5000 are placed closest to each other, the size of the package 5000 may be 21 mm×31 mm. In this embodiment, the package 5000 can be mounted on the device 1 having a width of 22 mm and a depth of 42 mm.

However, the package 5000 of FIG. 15 cannot be mounted on the circuit board 9000 having a depth of 30 mm. Therefore, an embodiment in which the package 5000 including the system on chip SoC and four memories MEM can be mounted on the circuit board 9000 having a depth of 30 mm will be described with reference to FIG. 16.

The package 5000 may include at least one semiconductor chip to which a fan-in semiconductor package, a fan-out semiconductor package, a package-on-package (PoP), and/or a 2.5D package method is applied. Furthermore, the technical features of the different examples of the present disclosure may be combined and modified with each other.

Figure 16:
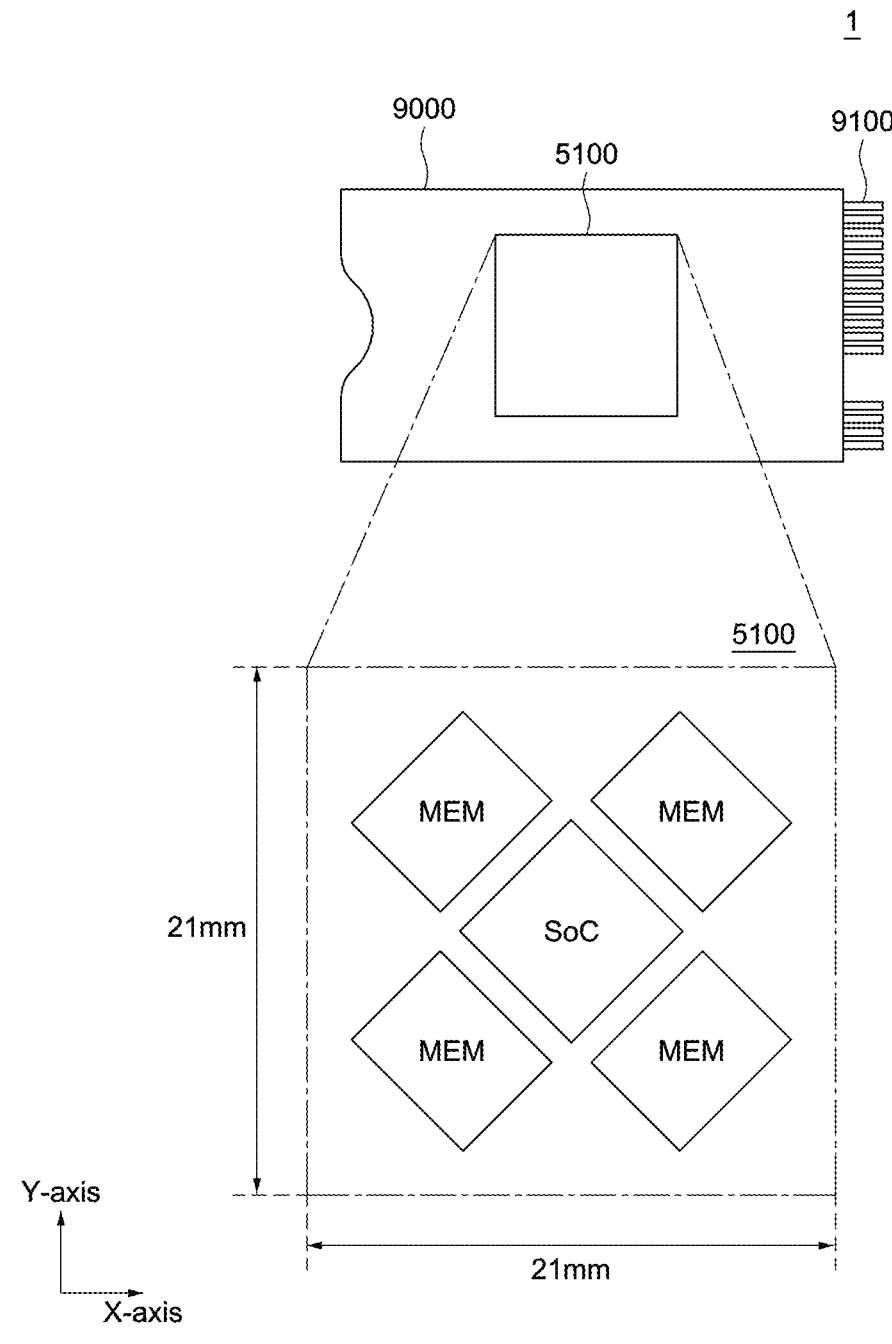
FIG. 16 is a diagram illustrating an apparatus according to a second embodiment of the second example of the present disclosure.

FIG. 16 is a conceptual diagram illustrating a device according to a second embodiment of a second example of the present disclosure.

Before describing with reference to FIG. 16, the device 1 shown in FIG. 16 may be a plan view looking down on the device 1, but is not limited thereto. The size of each of the hardware components described with reference to FIG. 16 may refer to the width (X-axis length) and depth (Y-axis length).

Referring to FIG. 16, a device 1 according to a second embodiment of a second example of the present disclosure includes a circuit board 9000 and a package 5100. The circuit board 9000 may further include a slot 9100 (for example, an M.2 slot). The device 1 according to the second embodiment of the second example of the present disclosure may correspond to the device 1 according to the embodiments of the first example of the present disclosure. The circuit board 9000 according to the second embodiment of the second example of the present disclosure may correspond to the circuit board BD according to the embodiments of the first example of the present disclosure. The package 5100 according to the second embodiment of the second example of the present disclosure may correspond to the package (not shown) in the embodiments of the first example of the present disclosure. Overlapping content described above with reference to FIGS. 3 to 15 is omitted. Furthermore, in describing the second embodiment of the second example of the present disclosure, overlapping descriptions with the first embodiment of the second example may be omitted for convenience of explanation.

Meanwhile, the device 1 shown in FIG. 16 is an example implemented in an M.2 form factor. In the second embodiment of the second example of the present disclosure, the width of the circuit board 9000 may be 22 mm and the depth may be 30 mm, but is not limited thereto.

The package 5100 mounted on the device 1 may include a system on chip SoC and at least one memory MEM. The system on chip SoC according to the second embodiment of the second example of the present disclosure may correspond to the system on chip 1000 according to the embodiments of the first example of the present disclosure. The memory MEM of FIG. 16 may correspond to the memory MEM or main memory M_MEM described above with reference to FIGS. 7 to 13.

The width of the circuit board 9000 shown in FIG. 16 may be 22 mm, and the depth may be 30 mm. In order to mount the package 5100 within such a restrictive size, the arrangement of the system on chip SoC and the plurality of memories MEM within the package 5100 must be improved.

The physical size of the system on chip SoC may be 4.50 mm×4.85 mm, and the physical size of each memory MEM may be 6.43 mm×5.30 mm.

According to an embodiment of the present disclosure, the process node of the semiconductor manufacturing process of the memory MEM may be lower than the process node of the semiconductor manufacturing process of the system on chip SoC. For example, the memory MEM may be manufactured by a 14 nm semiconductor manufacturing process, and the process of the system on chip SoC may be manufactured by a 7 nm semiconductor manufacturing process. For example, the memory MEM may be manufactured by a 5 nm semiconductor manufacturing process and the system on chip SoC may be manufactured by a 7 nm semiconductor manufacturing process. For example, the memory MEM may be manufactured by a 2 nm semiconductor manufacturing process, and the system on chip SoC may be manufactured by a 5 nm semiconductor manufacturing process. According to the above-described configuration, the size of the system on chip SoC can be reduced to be suitable for the specification of a specific form factor (for example, M.2).

The system on chip SoC and the plurality of memories MEM may be arranged in a diagonal direction of the package 5100. In this case, the size of the package 5100 can be reduced to 21 mm×21 mm. To elaborate, the configuration of the plurality of semiconductor chips disposed inside the package 5100 may be referred to as a "rotated multi-chip substrate layout." The package 5100 of the rotated multi-chip substrate layout has the effect of being able to reduce the size of the package 5100 due to the arrangement of the respective semiconductor chips rotated at a specific angle. That is, the X-axis of the system on chip SoC and the X-axis of the substrate 5100 may not be parallel. The Y-axis of the system on chip SoC and the Y-axis of the substrate 5100 may not be parallel. The X-axis of the memory MEM and the X-axis of the substrate 5100 may not be parallel. The Y-axis of the memory MEM and the Y-axis of the substrate 5100 may not be parallel.

Meanwhile, the number of memories MEM in the package 5100 may be changed in consideration of the processing capability (for example, TOPS) of the system on chip SoC, the size of a specific form factor, and the size that can be placed within a package smaller than the specific form factor.

The package 5100 may be configured to include at least one semiconductor chip to which a fan-in semiconductor package, a fan-out semiconductor package, a package-on-package (PoP), and/or a 2.5D package method is applied. Furthermore, the technical features of the different examples of the present disclosure may be combined and modified with each other.

That is, the package 5100 may include a semiconductor package substrate, a system on chip SoC rotated at a first angle with respect to one side of the semiconductor package substrate and disposed on the semiconductor package substrate, based on a plan view, and one or a plurality of memories MEM rotated at a second angle with respect to one side of the semiconductor package substrate and disposed on the semiconductor package substrate adjacent to the system on chip SoC, based on a plan view. Here, the first angle and the second angle may be determined such that the size of the package 5100 is smaller than the size of a specific form factor.

Figure 17:
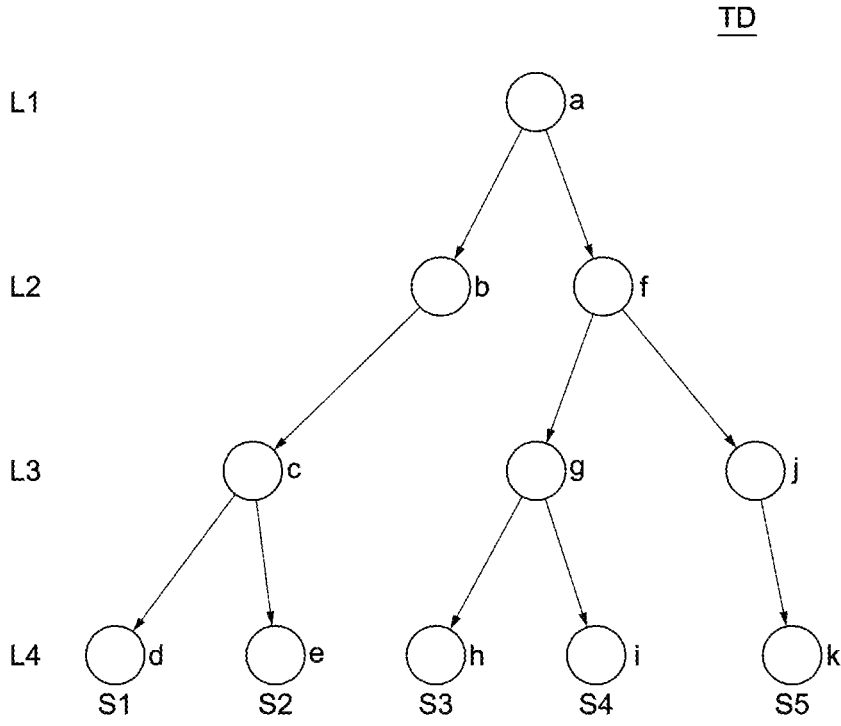
FIG. 17 is a diagram illustrating a tree for explaining speculative decoding according to a third example of the present disclosure.

FIG. 17 is a conceptual diagram illustrating a tree for explaining speculative decoding according to a third example of the present disclosure.

Hereinafter, the speculative decoding method according to the third example of the present disclosure may be performed in the device 1 described with reference to FIGS. 3 to 16. Accordingly, in describing the third example of the present disclosure, overlapping descriptions with the first example and the second example may be omitted for convenience of explanation.

A transformer-based generative artificial intelligence model can generate a response by receiving a query as input. For example, a language model can obtain an input token by receiving a query in text form as input and generate an output token from the input token. Subsequently, the query and the generated output token can be input to the language model again to generate a subsequent next output token. This token generation operation may be repeated several times until the response to the query is completed. A token may correspond to a word or a part of a word. The response may include an output token. The final response generated by the language model for the input query data may include a series of output tokens generated by inputting the output tokens generated as part of the response generated by the language model back into the language model.

The larger the number of parameters of a language model, the higher the cost for generating a response from the language model. Therefore, using a language model with a large number of parameters increases the computational cost required to generate a response. Reducing the number of parameters of a language model can lower the computational cost and improve the response speed, but it may cause a problem of deteriorating the response accuracy. That is, there is a trade-off relationship between the number and accuracy (or quality) of the parameters of a language model and the time required for a processor to perform the operations of the language model. In particular, to generate a response of a certain quality or higher, the number of parameters of a language model must be quite large.

Meanwhile, processing a language model on the device itself to provide a commercialized service is difficult considering the hardware resource limitations of the device (for example, energy consumption, battery capacity, memory capacity, AI processing capability, etc.).

Accordingly, the third example of the present disclosure describes speculative decoding (or speculation decoding) for driving heterogeneous language models using the limited hardware resources of the device 1.

Speculative decoding is a technique that generates the most reliable answer by combining the results after a plurality of language models each perform a prediction. For example, a first language model can select candidates that can come as the next token and calculate a probability representing the suitability for each candidate token. Subsequently, a second language model can finally select one of the candidate tokens proposed by the first language model, considering the context. Since the second language model must select one of the candidate tokens by reflecting a broader context, it may be a model with a larger number of parameters and better performance than the first language model.

The device 1 according to the examples of the present disclosure can drive heterogeneous language models based on at least one system on chip 1000. That is, in an on-device method, to accelerate the token generation speed of a language model, speculative decoding can utilize heterogeneous language models. In at least one device 1, a speculative decoding technique may be utilized in which heterogeneous language models cooperate with each other to generate a response to an input query.

The heterogeneous language models according to the third example of the present disclosure may include a first language model and a second language model. Here, the number of parameters of the first language model is smaller than the number of parameters of the second language model. That is, the number of parameters of the heterogeneous language models is different from each other. A language model with a relatively small number of parameters and a language model with a large number of parameters can be defined as an upper model and a lower model, respectively. That is, the first language model may be defined as a lower model of the second language model, and the second language model may be defined as an upper model of the first language model. For example, the number of parameters of the upper model may be 7 billion, and the number of parameters of the lower model may be 1 billion.

The lower model according to the third example of the present disclosure may generate probabilities used for sampling the additional tokens, based on the speculatively generated additional tokens and the currently allowed set of tokens. The upper model according to the third example of the present disclosure generates output tokens using the candidate tokens generated by the lower model. The upper model can accept or reject the candidate tokens by sampling the additional tokens speculatively generated by the lower model. Here, the acceptance or rejection of the upper model can be determined by comparing the probability generated by the upper model corresponding to each token with the probability generated by the lower model corresponding to each token. The candidate token accepted by the upper model is the output token included in the response.

According to the speculative decoding of the third example of the present disclosure, the lower model can generate one or more sets of candidate tokens to generate a response corresponding to the query input to the lower model. A candidate token set is a set including one or more candidate tokens.

TABLE 1

| Candidate Tokens | Candidate Token Set |
| --- | --- |
| apple, is, red, banana, yellow, car, fast | set1: [apple, is, red] set2: [banana, is, yellow] set3: [car, is, fast] |

The upper model can accept or reject the candidate token set by sampling each of one or more candidate token sets. Here, when the device 1 performs sampling for each candidate token set, the device 1 can generate more tokens faster than when sampling for each token. Furthermore, the probability distributions of the lower model and the upper model can also be maintained similarly. Here, the token generation speed may be referred to as TPS (tokens per second).

The speculative decoding according to the third example of the present disclosure may operate in an auto-regressive token generation method. In the auto-regressive token generation method, a series of tokens generated by the lower model is input to the lower model again to generate a token. The lower model generates one token for each auto-regression. Therefore, if the lower model performs N inferences, N series of tokens are generated. The lower model generates a conditional probability distribution related to the N series of tokens. Subsequently, the upper model processes the N series of tokens generated by the lower model and the conditional probability distribution related to the N series of tokens to generate a probability distribution of the upper model. Therefore, the upper model can accept or reject the token generated by the lower model by comparing the probability distribution generated by the upper model with the conditional probability distribution generated by the lower model. The upper model can accept a token based on a threshold value. When the similarity between the probability distribution value of the upper model and the conditional probability distribution value of the lower model is equal to or greater than the threshold value, the corresponding token is accepted, and when the similarity is less than the threshold value, the corresponding token may be rejected.

The upper model can accept or reject a series of tokens generated by the lower model based on a threshold value. If a specific token among the series of tokens is rejected, the tokens up to the previous token of the rejected token become the final output tokens. For example, the lower model of speculative decoding can generate tokens in units of sets. In this case, the upper model can accept or reject each of the plurality of token sets generated by the lower model. If the lower model generates candidate tokens in units of sets, the acceptance or rejection judgment in the upper model can also be performed in units of sets, which can improve the token generation speed of the speculative decoding of the device 1. Furthermore, as the number of token sets generated by the lower model increases, the probability that the upper model will accept a token set may increase.

The lower model generates one or more sets of candidate tokens in response to an input query. Each candidate token set includes a series of tokens, and the lower model can select a series of tokens with high probability in the probability distribution as a candidate token set. Each candidate token set can be selected in various ways. For example, each candidate token set may be generated by selecting tokens with the highest probability within the probability distribution, but the present disclosure is not limited thereto. In order for the upper model to accept one candidate token set, the probabilities of the tokens included in each candidate token set may be summed. Therefore, the upper model can accept or reject the entire candidate token set based on the summed probability of the candidate token set, not the probability of each token. To elaborate, when using the probability of each token, it may be difficult to match the probabilities of the respective tokens generated by the lower model and the upper model, so the rejection probability of the upper model increases. When using the summed probability of a token set, the matching of the summed probabilities of the token sets generated by the lower model and the upper model can be more similar, so the acceptance probability of the upper model increases.

The lower model may generate one or more sets of candidate tokens in response to an input query. The one or more sets of candidate tokens may be generated statically or dynamically. For example, the sentence length (sequence length) of each candidate token set may be preset. The lower model may generate one or more sets of candidate tokens and generate tree data by combining each of the candidate token sets. The tree data includes a node at each branch point.

Referring to FIG. 17, the tree data TD includes one or more token sets generated by the lower model, according to an embodiment of the present disclosure. Below the leaf nodes of the tree, a first token set S1, a second token set S2, a third token set S3, a fourth token set S4, and a fifth token set S5 are indicated.

The first candidate token set S1 may include four tokens (a, b, c, d). The second candidate token set S2 may include four tokens (a, b, c, e). The third candidate token set S3 may include four tokens (a, f, g, h). The fourth candidate token set S4 may include four tokens (a, f, g, i). The fifth candidate token set S5 may include four tokens (a, f j, k). Each of the candidate token sets may be selected or rejected by the upper model.

The token length of each candidate token set may be set. For example, the sentence length of each token set may be set to 4. However, the present disclosure is not limited thereto, and the length of the token set may be changed dynamically.

Each token may have an order level. The order level may correspond to the sentence length. Specifically, the first order level L1 corresponds to the token (a). The second order level L2 corresponds to the tokens (b, f). The third order level L3 corresponds to the tokens (c, g, j). The fourth order level L4 corresponds to the tokens (d, e, h, i, k). In the example where the sentence length is set to 4, the maximum order level is set to 4. The order of the tokens in each token set may be arranged according to the corresponding order level. Specifically, the first token (a) among the tokens (a, b, c, d) of the first token set S1 corresponds to the first order level L1. The second token (b) among the tokens (a, b, c, d) of the first token set S1 corresponds to the second order level L2. The third token (c) among the tokens (a, b, c, d) of the first token set S1 corresponds to the third order level L3. The fourth token (d) among the tokens (a, b, c, d) of the first token set S1 corresponds to the fourth order level L4.

Each token is defined as a node of the tree data TD. For example, the token (g) can be a branch node of the third token set S3 and the fourth token set S4 at the third order level L3. Each node includes branch information.

That is, the tree data TD generated by the lower model may include all or at least a part of one or more token sets (S1 to S5), order levels (L1 to L4), node (a, b, c, d, e, f, g, h, i, j, k) information of each token, and selection probability of each candidate token set (for example, the summed probability of the token set). The upper model can accept or reject at least one token of the tree data TD.

Speculative decoding may also be implemented as hybrid speculative decoding. Hybrid speculative decoding can set a threshold value a for determining whether a token is approved or rejected by comparing the probability distributions of the lower model and the upper model, after previously speculatively generated token is verified by the upper model.

Speculative decoding may also be implemented as group speculative decoding. In group speculative decoding, multiple tokens are generated in group units by the lower model and are configured to be verified by the upper model, which can provide a high level of efficiency.

Figure 18:
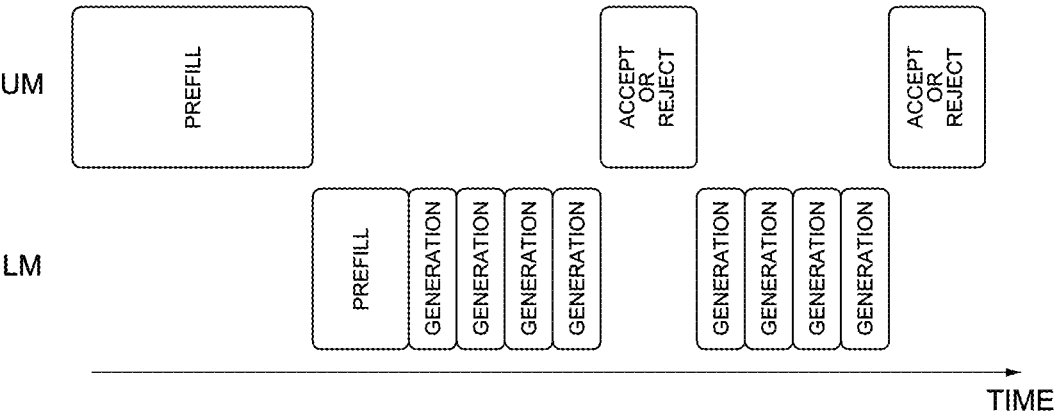
FIG. 18 is a conceptual diagram for explaining a speculative decoding operation according to the third example of the present disclosure.

FIG. 18 is a conceptual diagram for explaining a speculative decoding operation according to a third example of the present disclosure.

Referring to FIG. 18, a lower model LM and an upper model UM are shown. The device 1 according to the third example of the present disclosure may be configured to sequentially process the lower model LM and the upper model UM for speculative decoding.

A transformer-based artificial intelligence model can perform predetermined operation steps (for example, a prefill step and a generation step) to generate a response to an input query. A transformer is an artificial intelligence model based on an attention mechanism. A transformer utilizes a large number of matrix multiplication operations. A transformer can obtain an attention score (Q, K, V), which is an output value, using an input value and parameters such as a query (Q), a key (K), and a value (V). A transformer can process various inference operations based on the output value (i.e., attention (Q, K, V)). Transformers are actively used in generative language models.

A tensor refers to a multi-dimensional matrix parameter processed in an artificial intelligence model (for example, an artificial neural network). A tensor can refer to various parameters of a neural network model such as weights, input parameters, output parameters, and attention parameters.

The prefill step is an initial step of processing and interpreting an input (for example, a prompt input by a user). The prefill step may include a tokenization step, a context embedding step, a processing step through layers, and a preparation step for decoding. The prefill step may be processed by one or more neural processing units. In the tokenization step, the input text is converted into tokens (sub-words, words, or characters), which are numerical representations used in the artificial intelligence model. In the context embedding step, the tokens can be mapped to high-density embedding vectors that encode semantic and syntactic information. In the prefill step, the embeddings are processed through several layers of the neural network model (e.g., transformer blocks) to generate a contextual representation of the input tokens. In the preparation step for decoding, the artificial intelligence model calculates the probability for each entire token of what the next output token might be based on the input context, but does not yet finally generate the next token. Instead, it can set the context for the generation step.

In the generation step, one or more neural processing units can sequentially generate one or more output tokens based on the context provided by the artificial intelligence model in the prefill step and the previously generated output tokens. The generation step includes an initial prediction step, an auto-regressive processing step, and a stopping condition. The generation step may be processed by one or a plurality of neural processing units. In the initial prediction step, the first token is generated by sampling from the probability distribution calculated in the prefill step. In the auto-regressive processing step, each subsequent token is generated by integrating the previous tokens (including the generated tokens) into the context of the neural network model. The generation process continues until a stopping condition is met, such as reaching a maximum token limit, encountering a special end-of-sequence token (e.g., end of sequence (EOS)), or achieving a specific semantic goal. The series of tokens generated in the generation step may correspond to the tree data TD of FIG. 15. The tree data may include at least one token set.

Referring back to FIG. 18, a third example showing the steps of speculative decoding over time is shown. The speculative decoding according to the examples of the present disclosure may be processed sequentially or in parallel by one or more neural processing units. In speculative decoding, the upper model UM and the lower model LM cooperate to generate a response to an input query. The longer the horizontal length of the block representing each step, the more processing time is required.

Specifically, in speculative decoding, the upper model UM first performs a prefill operation. Subsequently, the lower model LM performs a prefill operation. Subsequently, the lower model LM continuously performs a generation step, and in each generation step, each token is generated. Next, the upper model UM accepts or rejects the tokens generated by the lower model LM. The upper model UM may accept or reject some or all of the tokens generated by the lower model LM. The lower model LM receives the accepted tokens as an input query again, and the lower model LM continuously performs generation steps so that each token corresponding to each generation step is generated. Next, the upper model UM accepts or rejects the tokens generated by the lower model LM. The above steps are repeated until a stopping condition is met.

The number of parameters of the upper model UM is larger than the number of parameters of the lower model LM, so the processing time is longer. Therefore, the processing time of the prefill step of the upper model UM is longer than the processing time of the prefill step of the lower model LM. The processing time of the acceptance or rejection step of the upper model UM is longer than the processing time of the generation step of the lower model LM. Therefore, in generating tokens for a response, the token generation speed of the system can be improved by configuring the lower model to generate as many tokens as possible and the upper model to perform only selective judgments.

The number of parameters of each of the lower model LM and the upper model UM may be determined in consideration of the hardware resource limitations of the device 1 (for example, the processing performance of the system on chip SoC and the bandwidth of the memory MEM). The upper model UM may utilize a language model in which the number of parameters is determined in consideration of the hardware resource limitations of the device being processed.

In some examples, the lower model LM may be a model in which the parameters of the upper model UM are pruned. In this case, the parameters of the pruned neural network model can be made lightweight, and the required memory bandwidth can be smaller than that of the upper model UM.

According to the third example of the present disclosure, the device 1 may be configured to process a prefill operation using the upper model UM to process speculative decoding. Subsequently, the device 1 may process a prefill operation and a generation operation using the lower model LM to process speculative decoding.

The device 1 according to the third example of the present disclosure may include at least one interface (not shown). The interface can input and/or output data. The device 1 may receive an input query through the interface (not shown). The interface may be an electronic circuit capable of receiving an input query such as a prompt, gesture, or voice. The input and/or output interface may include, for example, a mouse, a keyboard, a touch pad, a touch screen, a microphone, a wireless communication device, a wired communication device, a camera, a speaker, etc.

The system on chip SoC of the device 1 according to the third example of the present disclosure can perform inference operations on the upper model UM and the lower model LM. The upper model UNI and the lower model LM can cooperate to process speculative decoding. The neural processing unit NPU of the system on chip SoC of the device 1 according to the third example of the present disclosure can process the upper model UM and the lower model LM alternately. That is, the neural processing unit NPU operates to sequentially process the upper model UNI and the lower model LM. In other words, the neural processing unit NPU operates to process the upper model UM and the lower model LM in a time-division manner. Therefore, the utilization rate of the operation circuits of the neural processing unit NPU can be increased while sequentially processing the upper model UM and the lower model LM.

According to the disclosed embodiment, speculative decoding is performed by sequentially processing the upper model UM and the lower model LM in the neural processing unit NPU of the device 1, and by having the parameters of the upper model UM and the lower model LM reside in the memory MEM, the bottleneck phenomenon due to the speculative decoding operation can be reduced.

The memory MEM of the device 1 according to the third example of the present disclosure is configured to store all the weight values of the upper model UM and the lower model LM when the device 1 is operating. By storing both the first weight values of the upper model UM and the second weight values of the lower model LM in the memory MEM, the device 1 can efficiently process speculative decoding. The memory MEM of the device 1 according to the third example of the present disclosure can provide the parameters of the upper model UM to the neural processing unit NPU when the neural processing unit NPU performs inference on the upper model UM, and provide the parameters of the lower model LM to the neural processing unit NPU when it performs inference on the lower model LM.

For example, during a speculative decoding operation, the device 1 can allocate a memory bank where the weight values of the upper model UM and the lower model LM will be stored by setting the address map of the memory MEM. Therefore, during a speculative decoding operation, the weight values of both the upper model UM and the lower model LM can reside in the memory MEM. That is, the capacity of the memory TMEM of the device 1 according to the third example of the present disclosure may be larger than the total capacity occupied by the first weight values of the upper model UM and the second weight values of the lower model LM. If the memory MEM of the device 1 does not have a memory capacity capable of storing the upper model UM and the lower model LM, it may be difficult to quickly process speculative decoding in real time. That is, the capacity of the memory MEM can be determined in consideration of the sizes of the parameters of the upper model UM and the lower model LM to be driven on the device 1. If the parameters of the upper model UM and the lower model LM are not all stored in the memory MEM, a conventional device must read the weight values of each model from an external storage device for speculative decoding. In this embodiment, since the conventional device must command unnecessary memory read and memory write operations for speculative decoding, the token generation speed may be lower than the token generation speed of the device 1 according to the third example of the present disclosure.

The first memory MEM1 of the device 1 according to the second embodiment of the first example of the present disclosure is configured to store the weight values of the upper model UM and the tokens generated by the upper model UM when the device 1 is operating.

The second memory MEM2 of the device 1 according to the second embodiment of the first example of the present disclosure is configured to store the weight values of the lower model LM and the tokens generated by the lower model when the device 1 is operating. If all the weight values of the upper model UM and the lower model LM are stored in the first memory MEM1 and the second memory MEM2, the device 1 can efficiently process speculative decoding. To elaborate, the size of the weight values of the upper model UM and the lower model LM can be quite large, and it may be difficult to store them all in a single memory chip. In this case, the device 1 can increase the capacity of the memory by configuring a plurality of memories.

The first memory MEM1 of the device 1 according to the second embodiment of the first example of the present disclosure is configured to provide the parameters of the upper model UM to the neural processing unit NPU when the neural processing unit NPU performs inference on the upper model UM, and the second memory MEM2 is configured to provide the parameters of the lower model LM to the neural processing unit NPU when it performs inference on the lower model LM.

For example, during a speculative decoding operation, the device 1 can allocate a memory bank where the weight values of the upper model UM and the lower model LM will be stored by setting the address maps of each of the first memory MEM1 and the second memory MEM2. Therefore, during a speculative decoding operation, the weight values of both the upper model UM and the lower model LM can reside in both the first memory MEM1 and the second memory MEM2.

Accordingly, the capacity of the plurality of memories (MEM1, MEM2) of the device 1 according to the second embodiment of the first example of the present disclosure is configured to be larger than the total capacity occupied by the weight values of the upper model UM and the lower model LM. Therefore, the weight values of the upper model UM and the lower model LM can reside in the plurality of memories (MEM1, MEM2). If the capacity of the upper model UM and the lower model LM in the plurality of memories (MEM1, MME2) of the device 1 is insufficient, it may be difficult to efficiently process speculative decoding.

If the parameters of the upper model UM and the lower model LM are not all stored in the plurality of memories (MEM1, MEM2), a conventional device must read the weight values of each model from an external storage device for speculative decoding. Accordingly, the conventional device commands unnecessary memory read and memory write operations for speculative decoding. Accordingly, the token generation speed of the conventional device is lower than the token generation speed of the device 1 according to the second embodiment of the first example of the present disclosure.

Hereinafter, a specific operation method based on the special function operation unit 600 described above in FIG. 5 will be described.

Figure 19A:
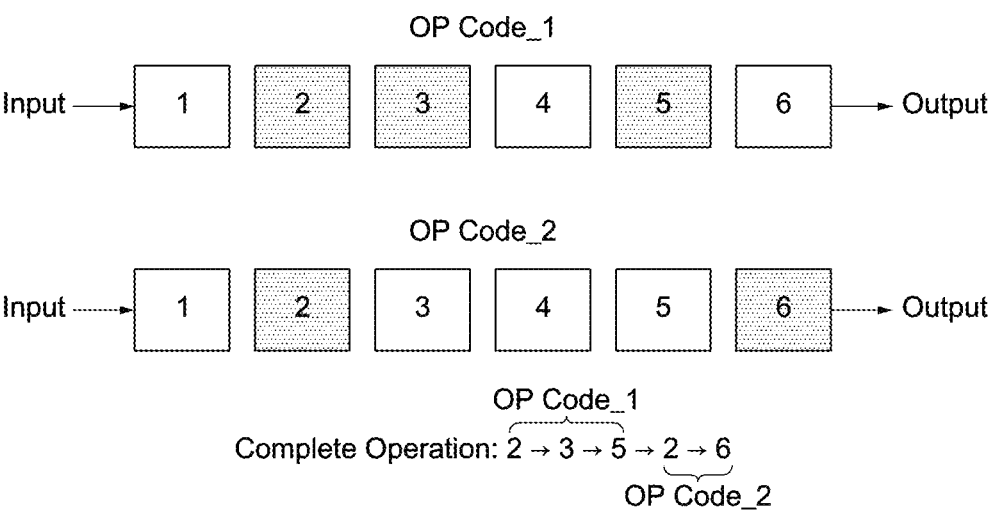
FIG. 19$a$ illustrates a method of performing an operation using the operational circuits of a special function unit according to at least one embodiment of the present disclosure.

FIG. 19a illustrates a method for performing an operation using the arithmetic circuits of a special function unit according to at least one embodiment of the present disclosure.

The controller 200 of the neural processing unit may activate the vector-dedicated arithmetic circuit 51 and/or the mixed arithmetic circuit 52 based on an operation code, which is an operation execution command signal.

Specifically, an operation code is a set of instructions that directs the execution of a combination of one or more arithmetic circuits included in the special function unit 600, and may include control information about the type of operation and data flow. Such an operation code may be generated by a compiler during the compilation stage. The special function unit 600 may perform an RMS normalization operation by activating a plurality of arithmetic circuits based on the operation code. This will be described later with reference to FIG. 19a and subsequent figures.

FIG. 19a illustrates a method for performing an operation using the arithmetic circuits of a special function unit according to at least one embodiment of the present disclosure.

In one embodiment, an operation may be performed by sequentially activating a plurality of arithmetic circuits by a plurality of operation codes.

For example, referring to FIG. 19a, at least one of the arithmetic circuits within the special function unit 600 may be activated by one operation code. Arithmetic circuits 2, 3, and 5 may be activated by a first operation code OP Code_1. At this time, the output of the operation may be stored in memory.

After the operation by the first operation code is completed, arithmetic circuits 2 and 6 may be activated by a second operation code OP Code_2. The output of the operation may be stored in memory.

When performing a specific operation, it may be controlled so that the same arithmetic circuit is not used multiple times in the operation step proceeding under the same operation code. Therefore, if it is necessary to use arithmetic circuit 2 twice, at least two operation codes may be applied in stages.

In this embodiment, when it is necessary to use a specific arithmetic circuit multiple times for a specific type of operation (e.g., the operation is performed by passing through arithmetic circuits in the order of 2→3→5→2→6), in order to use arithmetic circuit 2 again, the output from the first operation code OP Code_1 is stored in memory, and then the stored output is read from the memory and input again to the arithmetic circuits within the special function unit 600 under the second operation code OP Code_2 to complete the operation.

In the present disclosure, an embodiment (on-the-fly method) in which an operation is performed by activating each arithmetic circuit only once with a single operation code for a specific type of completed operation may be disclosed. This will be described with reference to FIG. 19b.

Figure 19B:
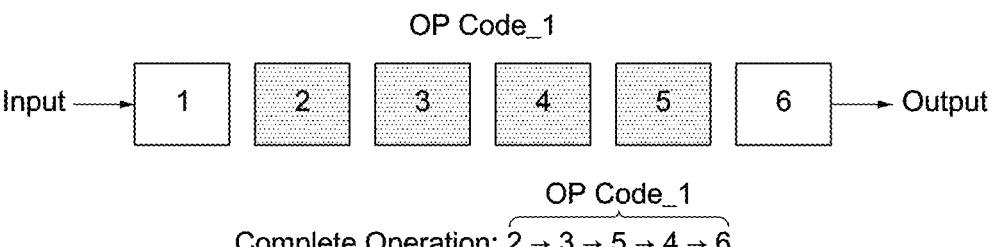

FIG. 19b illustrates a method for performing an operation in an on-the-fly manner using the arithmetic circuits of a special function unit according to at least one embodiment of the present disclosure.

Under the on-the-fly method, a specific type of operation can be performed continuously by selectively activating at least one of the vector-dedicated arithmetic circuit or the mixed arithmetic circuit with one operation code. That is, under the on-the-fly method, for a specific type of operation that obtains an output O from an input I, when the input I is input to the special function unit 600 by one operation code, the final operation result, output O, can be generated immediately without intermediate storage after passing through at least one or more arithmetic circuits within the special function unit 600. At this time, for a specific type of operation, the special function unit 600 can complete the operation at once with only one operation code by continuously driving the first and mixed arithmetic circuits, instead of storing the intermediate result of the operation by the first operation code in the memory of the neural processing unit 100 and then reading it again to proceed with an additional operation with a separate operation code to obtain the final output value.

Under the on-the-fly method, all intermediate results are not written to memory but are passed directly to the next arithmetic circuit within the pipeline, so the entire RMS normalization operation can be performed at once in a single operation pass without additional steps. Furthermore, the on-the-fly method eliminates additional memory accesses, unlike the method using two layers, which significantly reduces power consumption and bus congestion due to data movement, thereby improving overall system power efficiency and real-time processing latency simultaneously.

Referring to FIG. 19b, for a specific type of operation, arithmetic circuits 2, 3, 4, and 5 among the plurality of arithmetic circuits within the special function unit 600 may be activated. FIG. 19b performs the same completed operation as FIG. 19a. The difference is that to perform the completed operation, FIG. 19a is performed in a plurality of steps (a first step according to the first operation code OP Code_1 and a second step according to the second operation code OP Code_2), whereas FIG. 19b performs the same completed operation in a single step (a single step according to the first operation code OP Code_1).

If the completed operation requires using function X twice, in FIG. 19a, function X provided by arithmetic circuit 2 is used twice, but in FIG. 19b, function X provided by arithmetic circuit 2 is used once, and then when function X is needed again, function X provided by arithmetic circuit 4 is used instead of arithmetic circuit 2. Thus, by not using each arithmetic circuit multiple times, an on-the-fly operation is possible. In this embodiment, at least some of the arithmetic circuits included in the special function unit 600 may be disposed at different locations while providing the same or common operation functions. For example, arithmetic circuit 2 may provide operation function X and operation function Y, and arithmetic circuit 4 may provide operation function X and operation function Z. That is, arithmetic circuit 2 and arithmetic circuit 4 may provide a common operation function X.

Furthermore, the vector-dedicated arithmetic circuit 51 and the mixed arithmetic circuit 52 may each include a plurality of lanes, for example, 64 lanes may be implemented. Each lane may include one or more arithmetic units.

In one embodiment, the vector-dedicated arithmetic circuit 51, which performs only vector operations, can perform vector operations by activating a plurality of lanes simultaneously.

For example, when the controller 200 transmits an operation execution command signal to the vector-dedicated arithmetic circuit 51, the vector-dedicated arithmetic circuit 51 can perform an operation by activating all the arithmetic units included in each of the 64 lanes.

In one embodiment, the mixed arithmetic circuit 52 may perform vector or scalar operations by activating some or all of the plurality of lanes. Furthermore, as described above, the mixed arithmetic circuit 52 may include a selector circuit that controls the scalar operation mode and vector operation mode of the mixed arithmetic circuit 52.

For example, when the selector circuit included in the mixed arithmetic circuit 52 outputs a lane activation signal corresponding to the operation type, it can control the mixed arithmetic circuit 52 to perform the vector or scalar operation by activating at least one of the plurality of lanes based on the signal.

Each lane includes an independently operable arithmetic unit, and the arithmetic units can be individually turned on/off by the selector. For example, an arithmetic circuit (FPMMADD 600-9) that performs multiplication and addition operations may include at least one first arithmetic unit for multiplication and at least one second arithmetic unit for addition, and the selector can selectively activate at least one of the first arithmetic unit or the second arithmetic unit according to the input operation type information, thereby controlling so that only the necessary operation is performed. The operation type information may refer to a control signal or command information for specifying the type of operation to be performed (e.g., multiplication, addition, etc.) among two or more arithmetic units included in the arithmetic circuit. For example, if the arithmetic circuit includes both a multiplier and an adder, the operation type information may be included in the input operation code, allowing the selector circuit to selectively activate either the multiplier or the adder.

Specific details regarding this will be described based on FIGS. 20a and 20b.

Figure 20A:
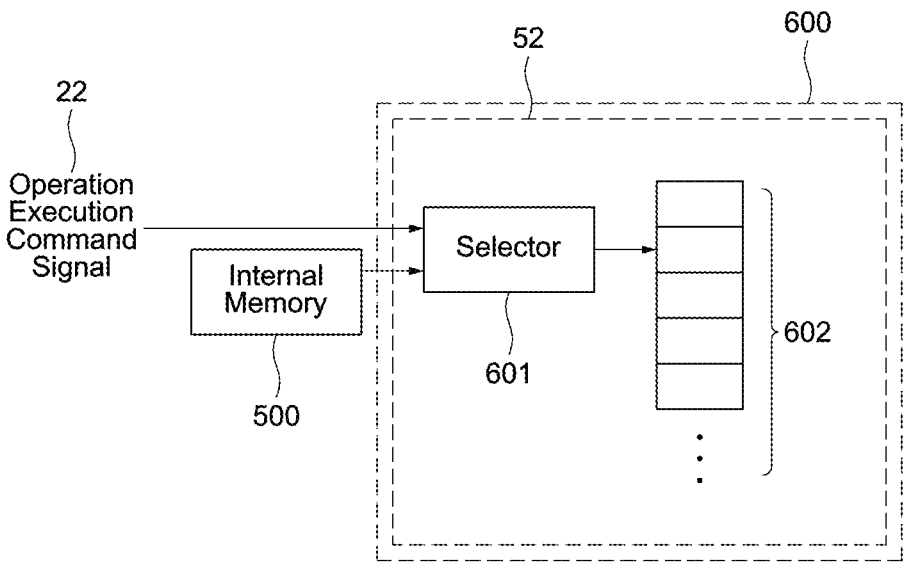
FIG. 20$a$ is a diagram illustrating the internal configuration of a mixed operational circuit when performing a vector operation according to at least one embodiment of the present disclosure.

FIG. 20a is a diagram illustrating the internal configuration of a mixed arithmetic circuit when performing a vector operation according to at least one embodiment of the present disclosure.

Referring to FIG. 20a, when the controller 200 receives an operation execution command signal 22, it can control to transfer the control information stored in the internal memory 500 to the selector 601. The selector 601 is the same configuration as the selector circuit described above.

At this time, the control information stored in the internal memory 500 may include operation mode information, data type information, and information on the lane to be activated, and this control information can be configured based on the operation code generated during the compilation stage.

The selector 601 can output a control signal that selectively activates some or all of the plurality of lanes 602 according to the received control information. That is, the selector 601 can control the mixed arithmetic circuit to activate an appropriate number of lanes according to the data size of the operation.

Figure 20B:
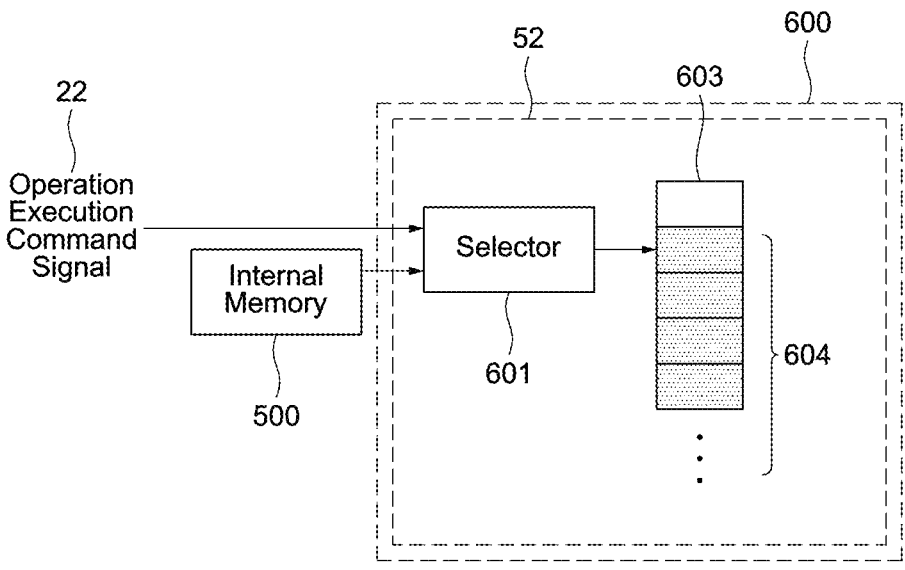

FIG. 20b is a diagram for explaining the internal configuration of a mixed arithmetic circuit when performing a scalar operation according to at least one embodiment of the present disclosure.

Referring to FIG. 20b, when the neural processing unit 100 receives an operation execution command signal 22, it can transfer the control information stored in the internal memory 500 to the selector 601.

The selector 601 can identify the operation type based on the corresponding control information and then selectively activate only one lane 603 among the plurality of lanes 603, 604.

For example, if the identified operation is a scalar operation, the selector 601 can prevent unnecessary power consumption by activating only one of the plurality of lanes and deactivating the arithmetic units included in the remaining lanes.

Therefore, the mixed arithmetic circuit 52 can perform operations by activating all or some of the plurality of lanes, which is configured to achieve both operation efficiency and power consumption optimization.

Figure 21:
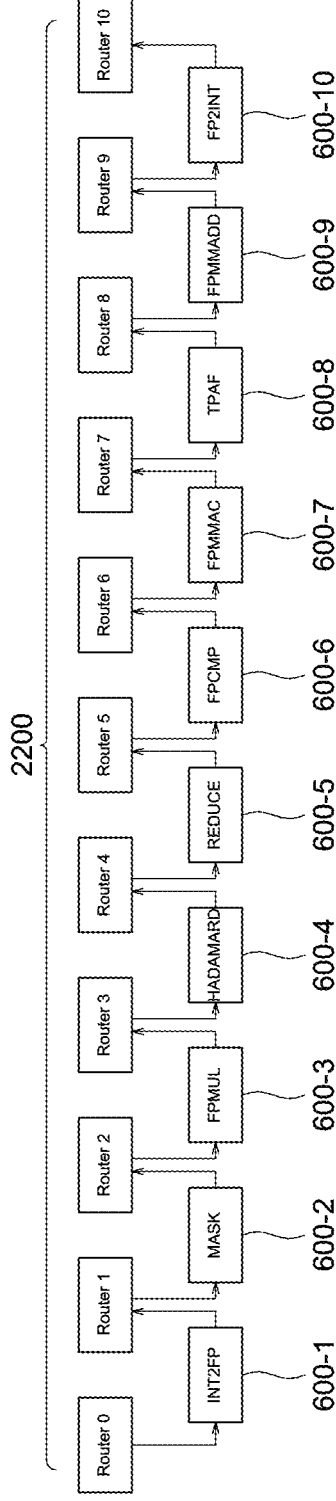
FIG. 21 is a block diagram illustrating a plurality of operational circuits connected to a plurality of buses and routers according to at least one embodiment of the present disclosure.

FIG. 21 is a block diagram for explaining a plurality of arithmetic circuits connected to a plurality of buses and routers according to at least one embodiment of the present disclosure.

Referring to FIG. 21, the special function unit 600 may include a bus formed to enable data transmission and reception with each of the plurality of arithmetic circuits, and a plurality of routers 2200 for routing the data transferred through the bus to one of the plurality of arithmetic circuits.

Figure 23:
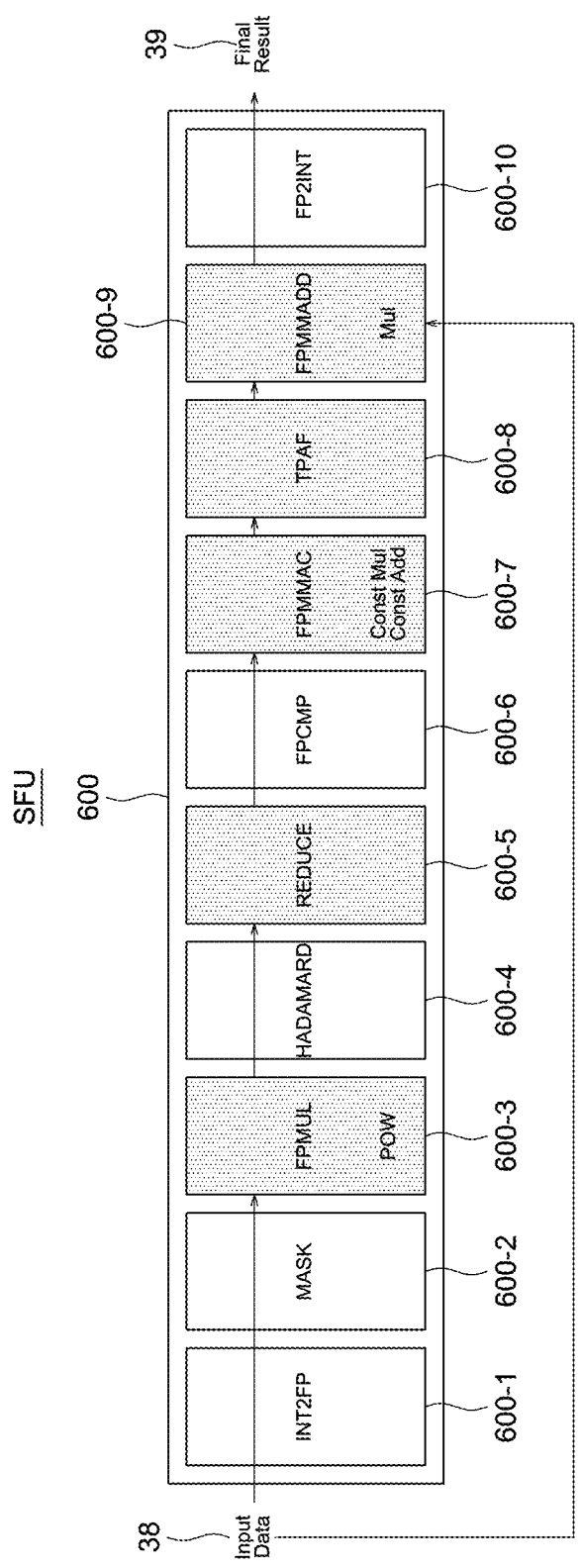
FIG. 23 is a diagram illustrating a method in which a special function unit performs an RIMS Norm operation in an on-the-fly operation manner according to at least one embodiment of the present disclosure.

In one embodiment, the plurality of arithmetic circuits 600-1~600-10 included in the special function unit 600 may each be connected to a plurality of buses and routers 2200. The bus may be a data transmission path that allows data to be transferred between arithmetic circuits. An arithmetic circuit can receive the data necessary for an operation through the bus and output the resulting data after performing the operation. In FIG. 23, the bus is not shown separately as a single line, but is conceptually represented by the arrows shown between each of the plurality of routers 2200 and the arithmetic circuits 600-1 to 600-10. That is, the arrows in the drawing represent the data path through which data is transferred via the bus.

The router 2200 may be a data transmission control circuit that controls the data flow between the arithmetic circuits and sets a path for transferring the operation result data transferred through the bus to the arithmetic circuit of the next stage.

Therefore, the special function unit 600 may be configured such that a plurality of arithmetic circuits perform operations by mutually transferring data through the bus and the router 2200.

In one embodiment, the special function unit 600 may perform an RMS normalization operation on an input vector. At this time, the input vector may be a vector calculated as a result of an attention operation, or it may be a token embedding vector provided to the input stage of a transformer block or an output vector of a previous block.

The special function unit 600 can adjust the scale of the input vector by performing normalization on the input vector.

For example, when the special function unit 600 according to the present disclosure receives an RMS normalization operation execution command, it may activate at least one of the plurality of arithmetic circuits to perform an operation of converting at least one of the operation result of the processing element core, such as an attention score, or the input data (e.g., a token embedding vector provided to the input stage of a transformer block or an output vector of a previous block) into a normalized vector whose magnitude is adjusted based on the root mean square (RMS). The operation of the special function unit 600 follows the RMS normalization formula of equation 8.

The operation of the special function unit 600 is controlled by the controller CTL. The controller CTL determines which circuits among the plurality of arithmetic circuits to activate and in what order based on an operation code, and stores the intermediate operation results in the internal memory I_MEM for each operation step or reads them again and provides them for subsequent operations. Therefore, the special function unit 600 can collectively perform the multi-step operations for RMS normalization to adjust the scale value of the input vector.

Figure 22A:
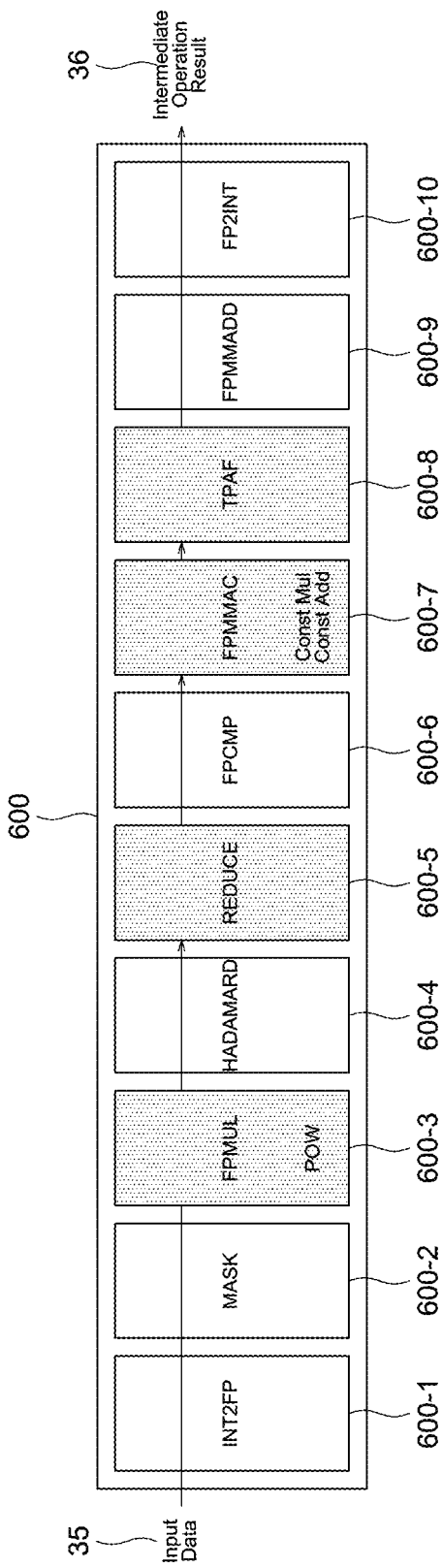
FIGS. 22$a$ to 22$b$ are diagrams illustrating a method of performing a 2-layer operation of RMS Norm using a special operation unit according to at least one embodiment of the present disclosure.
Figure 22B:
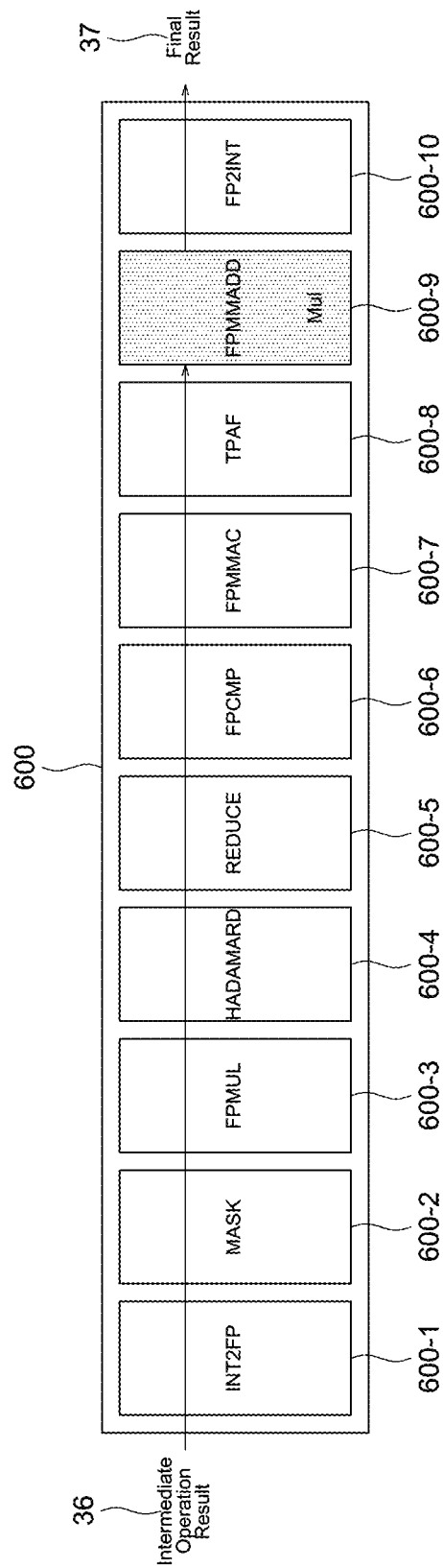

A specific description of the method by which the special function unit 600 performs the RMS normalization operation will be described later with reference to FIGS. 22a to 23. FIGS. 22a to 22b are diagrams for explaining a first embodiment in which the special function unit 600 performs an RMS operation according to at least one embodiment of the present disclosure, and FIG. 23 is a diagram for explaining a second embodiment in which the special function unit 600 performs an RMS operation according to at least one embodiment of the present disclosure.

The first and second embodiments are based on the same mathematical principle of the RMS normalization operation, but the order of operations activated according to the operation steps may be different. The types of operation blocks activated according to the present disclosure are not limited to the first and second embodiments, and the activation combination of operation blocks and the data processing pipeline can be flexibly configured according to the operation code.

FIGS. 22a and 22b are diagrams for explaining a method of performing a 2-layer operation of RMS Norm using a special operation unit according to at least one embodiment of the present disclosure.

In the neural processing unit according to various embodiments of the present invention, the special function unit 600 may perform an operation over a plurality of steps. For example, performing an operation in two steps may be expressed as performing the operation in 2 layers.

When performing an operation in 2 layers, a first operation code for performing the first operation step and a second operation code for performing the second operation step are respectively required. The controller 200 can control the special function unit to perform the two-step operation by selectively activating at least one of the arithmetic circuits including at least one vector-dedicated arithmetic circuit 51 and at least one mixed arithmetic circuit 52 by each of the two operation codes.

In one embodiment, the special function unit 600 according to the present disclosure may, by at least two operation codes, activate at least one of a plurality of arithmetic circuits, wherein an intermediate result value may be obtained by performing the operation of a first operation step by selectively activating at least one of the arithmetic circuits by a first operation code.

Furthermore, the special function unit 600 may obtain a final result value by performing the operation of a second operation step based on the intermediate result value by selectively activating at least one of the arithmetic circuits by a second operation code.

FIG. 22*a* is a block diagram for performing the operation of the first step among the two-layer operations. FIG. 22*b* is a block diagram for performing the operation of the second step among the two-layer operations.

The block diagram of the special function unit 600 in FIG. 22*a* and the block diagram of the special function unit 600 in FIG. 22*b* represent physically identical hardware components. However, over time, in order for the special function unit 600 to perform a specific type of completed operation, the operation described with reference to FIG. 22*a* may be performed, and the operation described with reference to FIG. 22*b* may be performed sequentially.

Referring to FIG. 22*a*, the special function unit 600 may perform a first operation step (the first operation step) for an RMS normalization operation based on a first operation code.

In one embodiment, based on one operation code, a first mixed arithmetic circuit (e.g., FPMUL 600-3) may perform an operation of squaring each element of the input data 35 in vector format. At this time, through the squaring operation, the magnitude of each input value is converted to a positive number, so that the magnitude of the data can be quantitatively compared in the subsequent summation step. The data operated on by the first mixed arithmetic circuit is transferred to a router via a bus, and the router can input it to the second-order arithmetic circuit (e.g., the REDUCE block 600-5, which is the first vector-dedicated arithmetic circuit). The first vector-dedicated arithmetic circuit (e.g., REDUCE 600-5) may perform an operation of summing each of the squared elements. The REDUCE block 600-5 can quickly sum the squared values of a large-scale vector using a parallel summation structure.

Subsequently, a second mixed arithmetic circuit (e.g., FPMMAC 600-7) calculates an average value based on the value summed by the REDUCE block 600-5, calculates a corrected average value by summing a correction constant to the average value, and a third mixed arithmetic circuit (e.g., TPAF 600-8) can calculate a normalization coefficient by performing an inverse square root (rsqrt) operation on the corrected average value.

Here, the correction constant may be a predetermined constant (e.g., $\varepsilon > 0$) to prevent the denominator from becoming 0 and to ensure numerical stability. Furthermore, the normalization coefficient may be a value multiplied to adjust the magnitude of the input data 35 in vector format. For example, the normalization coefficient may correspond to $$\frac{1}{\sqrt{\frac{1}{n}\sum_{i=1}^{n} a_i^2 + \varepsilon}}$$

in equation 8.

The calculated intermediate operation result 36 may be stored in the internal memory 500 and reused in the subsequent operation step according to the second operation code. Through such a two-step separated operation structure, the special function unit 600 can maximize processing efficiency by pipelining the complex RMS normalization process.

Referring to FIG. 22*b*, the special function unit 600 may perform a second operation step (the second operation step) for the RMS normalization operation based on a second operation code.

In the second operation step, the intermediate operation result 36 (e.g., normalization coefficient) pre-calculated and stored in the memory in the first operation step can be read from the memory and input to the arithmetic circuit through the bus and router.

In one embodiment, a fourth mixed arithmetic circuit (e.g., FPMMADD 600-9) is activated to calculate a normalized vector, which is the final operation result 37, by performing element-wise multiplication for each element included in the input data 35 in vector format, based on the intermediate operation result 36.

Additionally, the fourth mixed arithmetic circuit (e.g., FPMMADD 600-9) can also operate in a multiply-add (MADD) manner that adds a preset bias. The bias refers to a preset constant that is additionally added to the normalization result of equation 8, and performs the role of correcting the operation result by giving an offset to the normalized output value.

Through this, the normalization coefficient calculated in the first operation step is calculated as one common value for the entire input vector, so it can be equally multiplied to each element of the vector in the subsequent operation step. Thanks to this characteristic, parallel processing is possible by arranging a plurality of multipliers inside the special function unit 600 in parallel to perform multiplication for each element simultaneously, which can increase processing speed and efficiency.

Next, a method in which the special function unit 600 performs an RMS Norm operation in an on-the-fly operation method will be described with reference to FIG. 23.

The on-the-fly operation described with reference to FIG. 23 can use the same operation block as described above in FIGS. 22*a* and 22*b*. On the other hand, the 2-layer method described in FIGS. 22*a* and 22*b*, even if it uses the same operation block, follows a structure of writing the intermediate operation result to memory and reading it again for use in subsequent operations. This is useful in a conventional hardware architecture where a path for directly transferring the calculated normalization coefficient to the fourth mixed arithmetic circuit (e.g., FPMMADD block 600-9) is not provided. On the other hand, in the on-the-fly method of the present disclosure, to solve this limitation, a circuit may be additionally provided so that the normalization coefficient calculated by the third mixed arithmetic circuit (e.g., TPAF block) can be directly transferred to the fourth mixed arithmetic circuit (e.g., FPMMADD block 600-9) without going through memory. Thus, even if the same RMS normalization operation is performed, the 2-layer operation method is a structure for ensuring compatibility according to the limitations of the prior art, and the on-the-fly operation method can be a further improved implementation in terms of power efficiency and latency.

Referring to FIG. 23, when the input data 38 is input to the first mixed arithmetic circuit (e.g., FPMUL 600-3), the first mixed arithmetic circuit may perform an operation of squaring each element of the input data 38 in vector format. When the first vector-dedicated arithmetic circuit (e.g., REDUCE 600-5) receives the data operated on by the first mixed arithmetic circuit through the bus and router, it may perform an operation of summing each of the squared elements included in the data in vector format. Subsequently, a second mixed arithmetic circuit (e.g., FPMMAC 600-7) calculates an average value based on the value summed by the REDUCE block 600-5, calculates a corrected average value by summing a correction constant to the average value, and a third mixed arithmetic circuit (e.g., TPAF 600-8) can calculate a normalization coefficient by performing an inverse square root (rsqrt) operation on the corrected average value. The special function unit 600 can transfer the normalization coefficient directly to the fourth mixed arithmetic circuit (e.g., FPMMADD 600-9) without storing it in memory. The fourth mixed arithmetic circuit can calculate a normalized vector, which is the final operation result 39, by performing element-wise multiplication for each element included in the input data 38 based on the normalization coefficient.

Even during the on-the-fly operation, the fourth mixed arithmetic circuit (e.g., FPMMADD 600-9) can also operate in a multiply-add (MADD) manner that adds a preset bias. Since the specific operation process of each block in FIG. 23 is the same as that described above in FIGS. 22a and 23, a duplicate description is omitted.

The technical features of the examples of the present disclosure can be described as follows.

A neural processing unit for performing inference operations of a large-scale language model based on an artificial neural network is disclosed. The neural processing unit according to the present disclosure includes a processing element core configured to perform an attention mechanism-based operation based on input data in vector format to output an operation result, a special function unit including a plurality of arithmetic circuits including at least one vector-dedicated arithmetic circuit that exclusively performs vector operations and at least one mixed arithmetic circuit capable of performing both vector and scalar operations, and configured to perform a special function operation on the operation result, and a controller configured to, upon receiving an RMS normalization operation execution command, activate at least one of the plurality of arithmetic circuits to perform an operation of converting at least one of the operation result or the input data into a normalized vector whose magnitude is adjusted based on the root mean square (RMS), wherein the operation result may include an attention score for the input data.

The at least one vector-dedicated arithmetic circuit may be configured to sum the squared values of the input data in vector format or calculate an average.

The at least one mixed arithmetic circuit may be configured to calculate a normalization coefficient based on the sum or average of the squared values, or to normalize the input data based on the normalization coefficient.

Furthermore, the plurality of arithmetic circuits may be configured to be connected in series.

Furthermore, the controller may be configured to, by at least two operation codes, selectively activate some of the plurality of arithmetic circuits, wherein an intermediate result value is obtained by performing the operation of a first operation step by selectively activating at least one of the arithmetic circuits by a first operation code, and the RMS normalization operation is performed by performing the operation of a second operation step based on the intermediate result value by selectively activating at least one of the arithmetic circuits by a second operation code, thereby controlling the special function unit.

Furthermore, the controller may be configured to, in the first operation step, control the special function unit so that a first mixed arithmetic circuit squares each element of the input data based on the first operation code, a first vector-dedicated arithmetic circuit sums each of the squared elements, a second mixed arithmetic circuit calculates an average value for the summed value and then sums a correction constant, and a third mixed arithmetic circuit performs a square root operation on the value obtained by summing the correction constant to the average value and takes the reciprocal to store the intermediate operation values, which are normalization coefficients, in the memory of the neural processing unit.

Furthermore, the controller may be configured to, in the second operation step, control the special function unit so that a fourth mixed arithmetic circuit calculates a normalized vector by performing scaling for each element by multiplying each element of the input data and the intermediate operation values, based on the intermediate operation values, based on the second operation code.

Furthermore, the controller may be configured to control the special function unit to perform an RMS normalization operation based on one operation code.

Furthermore, the controller may be configured to, based on the one operation code, control the special function unit so that a first mixed arithmetic circuit squares each element of the input data, a first vector-dedicated arithmetic circuit sums each of the squared elements, a second mixed arithmetic circuit calculates an average value for the summed value and then sums a correction constant, a third mixed arithmetic circuit performs a square root operation on the value obtained by summing the correction constant to the average value and takes the reciprocal to calculate a normalization coefficient, and a fourth mixed arithmetic circuit calculates a normalized vector by performing scaling for each element by multiplying each element of the input data and the normalization coefficient.

A special function unit included in a neural processing unit that performs a special function operation and performs an inference operation of a large-scale language model based on an artificial neural network, wherein the special function unit includes a data input unit for reading data necessary for an operation from an external memory, and a plurality of arithmetic circuits including at least one vector-dedicated arithmetic circuit that exclusively performs vector operations and at least one mixed arithmetic circuit capable of performing both vector and scalar operations, wherein the special function unit may be configured to, upon receiving an RMS normalization operation execution command, perform an operation of converting at least one of the operation result or the input data into a normalized vector whose magnitude is adjusted based on the root mean square (RMS).

Furthermore, the at least one vector-dedicated arithmetic circuit may be configured to sum the squared values of the input data in vector format or calculate an average.

Furthermore, the at least one mixed arithmetic circuit may be configured to calculate a normalization coefficient based on the sum or average of the squared values, or to normalize the input data based on the normalization coefficient.

Furthermore, the plurality of arithmetic circuits may be configured to be connected in series.

Furthermore, the special function unit may be configured to, by at least two operation codes, selectively activate some of the plurality of arithmetic circuits, wherein an intermediate result value is obtained by performing the operation of a first operation step by selectively activating at least one of the arithmetic circuits by a first operation code, and the RMS normalization operation is performed by performing the operation of a second operation step based on the intermediate result value by selectively activating at least one of the arithmetic circuits by a second operation code.

Furthermore, the special function unit may be configured to, in the first operation step, based on the first operation code, have a first mixed arithmetic circuit square each element of the input data, a first vector-dedicated arithmetic circuit sum each of the squared elements, a second mixed arithmetic circuit calculate an average value for the summed value and then sum a correction constant, and a third mixed arithmetic circuit perform a square root operation on the value obtained by summing the correction constant to the average value and take the reciprocal to store the intermediate operation values, which are normalization coefficients, in the memory of the neural processing unit.

Furthermore, the special function unit may be configured to, in the second operation step, based on the second operation code, have a fourth mixed arithmetic circuit calculate a normalized vector by performing scaling for each element by multiplying each element of the input data and the intermediate operation values, based on the intermediate operation values.

Furthermore, the special function unit may be configured to perform an RMS normalization operation based on one operation code.

Furthermore, the special function unit may be configured to, based on the one operation code, have a first mixed arithmetic circuit square each element of the input data, a first vector-dedicated arithmetic circuit sum each of the squared elements, a second mixed arithmetic circuit calculate an average value for the summed value and then sum a correction constant, a third mixed arithmetic circuit perform a square root operation on the value obtained by summing the correction constant to the average value and take the reciprocal to calculate a normalization coefficient, and a fourth mixed arithmetic circuit calculate a normalized vector by performing scaling for each element by multiplying each element of the input data and the normalization coefficient.

Furthermore, the special function unit further includes a selector circuit, the mixed arithmetic circuit includes a plurality of lanes for performing an operation, the mixed arithmetic circuit identifies whether the operation to be currently processed is a vector operation or a scalar operation, and when the selector circuit outputs a lane activation signal corresponding to the identified operation type, at least one of the plurality of lanes is activated so that the mixed arithmetic circuit performs the vector or scalar operation, wherein the mixed arithmetic circuit is configured to activate only one of the plurality of lanes if the identified operation is a scalar operation, and to activate two or more of the plurality of lanes if the identified operation is a vector operation.

An arithmetic device including a plurality of arithmetic circuits including at least one vector-dedicated arithmetic circuit that exclusively performs vector operations and at least one mixed arithmetic circuit capable of performing both vector and scalar operations, wherein the device is configured to selectively activate the plurality of arithmetic circuits to perform a plurality of sets of operations by a combination of the activated arithmetic circuits, and the plurality of sets of operations may include an RMS normalization operation among attention operations, which are inference operations based on an artificial neural network.

The examples of the present disclosure disclosed in this specification and drawings are presented as specific examples to easily explain the technical content of the present disclosure and to help the understanding of the present disclosure, and are not intended to limit the scope of the present disclosure. It is apparent to those skilled in the art to which the present disclosure pertains that other modified examples based on the technical idea of the invention can be implemented in addition to the examples disclosed herein.

[National R&D Project Supporting This Invention]
[Project Identification Number]2710087558
[Task Number] II220957
[Name of Ministry] Ministry of Science and ICT
[Name of Task Management(Specialized) Institution] Institute of Information & Communications Technology Planning & Evaluation
[Research Project Title] PIM AI Semiconductor Core Technology Development (R&D)
[Research Task Name] Development of Distributed On-Chip Memory-Processor Integrated PIM Semiconductor Technology for Edge Applications
[Name of the organization performing the task] DEEPX CO., LTD.
[Research Period]2025 Jan. 1~2025 Dec. 31

What is claimed is:

1. A neural processing unit for performing inference operations of a large-scale language model based on an artificial neural network, the neural processing unit comprising:
a processing element core configured to perform an attention mechanism-based operation based on input data in vector format to output an operation result;
a special function unit comprising a plurality of arithmetic circuits including
at least one vector-dedicated arithmetic circuit that exclusively performs vector operations, the at least one vector-dedicated arithmetic circuit comprising a first vector-dedicated arithmetic circuits, and
at least one mixed arithmetic circuit capable of performing both vector and scalar operations, the at least one mixed arithmetic circuit comprising first and second mixed arithmetic circuits and being configured to perform a special function operation on the operation result; and
a controller configured to, upon receiving an RMS normalization operation execution command, activate at least one of the plurality of arithmetic circuits to control the special function unit to perform an operation of converting at least one of the operation result or the input data into a normalized vector whose magnitude is adjusted based on a root mean square (RMS),
wherein the operation result is an attention score for the input data, and
wherein the controller is further configured to control the special function unit to perform an RMS normalization operation based on one operation code so that
the first mixed arithmetic circuit squares each element of the input data,
the first vector-dedicated arithmetic circuit sums each of the squared elements to output a summed value, and
the second mixed arithmetic circuit calculates an average value for the summed value and outputs a value obtained by adding a correction constant to the average value.

2. The neural processing unit of claim 1, wherein the at least one mixed arithmetic circuit is further configured to calculate a normalization coefficient based on the sum or average of the squared values, or to normalize the input data based on the normalization coefficient.

3. The neural processing unit of claim 1, wherein the plurality of arithmetic circuits are configured to be connected in series.

4. The neural processing unit of claim 1, wherein the controller is further configured to, by at least two operation codes, selectively activate some of the plurality of arithmetic circuits, wherein an intermediate result value is obtained by performing an operation of a first operation step by selectively activating at least one of the arithmetic circuits by a first operation code, and wherein an RMS normalization operation is performed by performing an operation of a second operation step based on the intermediate result value by selectively activating at least one of the arithmetic circuits by a second operation code, thereby controlling the special function unit.

5. The neural processing unit of claim 4, wherein the at least one mixed arithmetic circuit of the special function unit further comprises a third mixed arithmetic circuit, and wherein the controller is further configured to, in the first operation step, based on the first operation code, control the special function unit so that the third mixed arithmetic circuit performs a square root operation on the value obtained by adding the correction constant to the average value and takes the reciprocal to store intermediate operation values, which are normalization coefficients, in a memory of the neural processing unit.

6. The neural processing unit of claim 5, wherein the at least one mixed arithmetic circuit of the special function unit further comprises a fourth mixed arithmetic circuit, and wherein the controller is further configured to, in the second operation step, based on the second operation code, control the special function unit so that the fourth mixed arithmetic circuit calculates a normalized vector by performing scaling for each element by multiplying each element of the input data and the intermediate operation values, based on the intermediate operation values.

7. The neural processing unit of claim 1, wherein the at least one mixed arithmetic circuit of the special function unit further comprises third and fourth mixed arithmetic circuits, and wherein the controller is further configured to, based on the one operation code, control the special function unit so that the third mixed arithmetic circuit performs a square root operation on the value obtained by adding the correction constant to the average value and takes the reciprocal to calculate a normalization coefficient, and the fourth mixed arithmetic circuit calculates a normalized vector by performing scaling for each element by multiplying each element of the input data and the normalization coefficient.

8. A special function unit included in a neural processing unit that performs a special function operation and performs an inference operation of a large-scale language model based on an artificial neural network, the special function unit comprising:

a data input unit for reading input data necessary for an operation from an external memory;

a plurality of arithmetic circuits including at least one vector-dedicated arithmetic circuit that exclusively performs vector operations and is configured to sum the squared values of the input data in vector format or calculate an average and at least one mixed arithmetic circuit capable of performing both vector and scalar operations, wherein the plurality of arithmetic circuits are configured to generate an operation result, wherein the special function unit is configured to, upon receiving an RMS normalization operation execution command, perform an operation of converting at least one of the operation result or the input data into a normalized vector whose magnitude is adjusted based on a root mean square (RMS), and wherein the at least one mixed arithmetic circuit comprises a plurality of lanes for performing an operation and is configured to identify an operation type of an operation to be currently processed, the identified operation type being a vector operation or a scalar operation, activate only one of the plurality of lanes if the identified operation type is a scalar operation, and activate two or more of the plurality of lanes if the identified operation type is a vector operation.

9. The special function unit of claim 8, wherein the at least one mixed arithmetic circuit is further configured to calculate a normalization coefficient based on the sum or average of the squared values, or to normalize the input data based on the normalization coefficient.

10. The special function unit of claim 8, wherein the plurality of arithmetic circuits are further configured to be connected in series.

11. The special function unit of claim 8, wherein the special function unit is further configured to, by at least two operation codes, selectively activate some of the plurality of arithmetic circuits, wherein an intermediate result value is obtained by performing an operation of a first operation step by selectively activating at least one of the arithmetic circuits by a first operation code, and wherein an RMS normalization operation is performed by performing an operation of a second operation step based on the intermediate result value by selectively activating at least one of the arithmetic circuits by a second operation code.

12. The special function unit of claim 11, wherein the special function unit is further configured to, in the first operation step, based on the first operation code, have a first mixed arithmetic circuit square each element of the input data, a first vector-dedicated arithmetic circuit sum each of the squared elements, a second mixed arithmetic circuit calculate an average value for the summed value and then sum a correction constant, and a third mixed arithmetic circuit perform a square root operation on the value obtained by summing the correction constant to the average value and take the reciprocal to store intermediate operation values, which are normalization coefficients, in a memory of the neural processing unit.

13. The special function unit of claim 12, wherein the special function unit is further configured to, in the second operation step, based on the second operation code, have a fourth mixed arithmetic circuit calculate a normalized vector by performing scaling for each element by multiplying each element of the input data and the intermediate operation values, based on the intermediate operation values.

14. The special function unit of claim 8, wherein the special function unit is further configured to perform an RMS normalization operation based on one operation code.

15. The special function unit of claim 14, wherein the special function unit is further configured to, based on the one operation code, have a first mixed arithmetic circuit square each element of the input data, a first vector-dedicated arithmetic circuit sum each of the squared elements, a second mixed arithmetic circuit calculate an average value for the summed value and then sum a correction constant, a third mixed arithmetic circuit perform a square root operation on the value obtained by summing the correction constant to the average value and take the reciprocal to calculate a normalization coefficient, and a fourth mixed arithmetic circuit calculate a normalized vector by performing scaling for each element by multiplying each element of the input data and the normalization coefficient.

16. The special function unit of claim 8, wherein the special function unit comprises a selector circuit configured to output a lane activation signal corresponding to the identified operation type, at least one of the plurality of lanes being activated by the lane activation signal, and wherein the at least one mixed arithmetic circuit performs the vector or scalar operation using the at least one of the plurality of lanes activated according to the lane activation signal.

17. An arithmetic device comprising:

a plurality of arithmetic circuits including at least one vector-dedicated arithmetic circuit that exclusively performs vector operations, the at least one vector-dedicated arithmetic circuit comprising first and second mixed arithmetic circuits, and at least one mixed arithmetic circuit capable of performing both vector and scalar operations, the at least one mixed arithmetic circuit comprising a first vector-dedicated arithmetic circuit, wherein the arithmetic device is configured to:

selectively activate the plurality of arithmetic circuits to perform a plurality of sets of operations by a combination of the activated arithmetic circuits, the plurality of sets of operations comprising an RMS normalization operation among attention operations, which are inference operations based on an artificial neural network, and perform an RMS normalization operation based on one operation code so that the first mixed arithmetic circuit squares each element of the input data, the first vector-dedicated arithmetic circuit sums each of the squared elements to output a summed value, and the second mixed arithmetic circuit calculates an average value for the summed value and outputs a value obtained by adding a correction constant to the average value.

\* \* \* \* \*